(12) United States Patent  
Ryan

(10) Patent No.: US 11,769,472 B2  
(45) Date of Patent: Sep. 26, 2023

(54) TUNING APPARATUS FOR STRINGED MUSICAL INSTRUMENTS WITH DUAL-ACTION CAM CLAMP ASSEMBLY AND EASY-TO-ADJUST ROCKER ARMS

(71) Applicant: Benjamin Ryan, Santa Barbara, CA (US)

(72) Inventor: Benjamin Ryan, Santa Barbara, CA (US)

( * ) Notice: Subject to any disclaimer, the term of this patent is extended or adjusted under 35 U.S.C. 154(b) by 0 days.

(21) Appl. No.: 17/848,992

(22) Filed: Jun. 24, 2022

(65) Prior Publication Data

US 2022/0415286 A1 Dec. 29, 2022

Related U.S. Application Data

(60) Provisional application No. 63/215,329, filed on Jun. 25, 2021.

(51) Int. Cl.
*G10D 3/053* (2020.01)
*F16B 2/18* (2006.01)

(52) U.S. Cl.
CPC ............... *G10D 3/053* (2020.02); *F16B 2/18* (2013.01)

(58) Field of Classification Search
CPC . G10D 3/053; G10D 1/08; G10D 3/00; F16B 2/18
See application file for complete search history.

(56) References Cited

U.S. PATENT DOCUMENTS

| | | |
|---|---|---|
| 1,094,038 A | 4/1914 | Weaver et al. |
| 1,219,884 A | 3/1917 | Thingstad |
| 1,553,057 A | 9/1925 | Weaver |
| 1,785,311 A | 12/1930 | Johnson |
| 1,823,683 A | 9/1931 | Gardner, Jr. |
| 1,871,021 A | 8/1932 | Zachrison |
| 2,669,151 A | 2/1954 | Maccaferri |
| 2,744,433 A | 5/1956 | Rooms |

(Continued)

FOREIGN PATENT DOCUMENTS

KR 10-2001-0086958 A 9/2001

OTHER PUBLICATIONS

"The Spider Capo by Creative Tunings", Apr. 18, 2010, retrieved at <<http://www.guitarlicksandtips.com/2010/04/18/the spider-capo/>>.

(Continued)

*Primary Examiner* — Kimberly R Lockett
(74) *Attorney, Agent, or Firm* — LYON & HARR, LLP; Richard T. Lyon

(57) ABSTRACT

A tuning apparatus for a stringed musical instrument is provided. The apparatus includes a dual-action cam clamp assembly and a plurality of string-contacting members with easy-to-adjust rocker arms. The dual-action cam clamp assembly removably attaches to a desired longitudinal position on the instrument's neck. Each of the string-contacting members is rotatably supported by a rocker arm shaft, and the easy-to-adjust rocker arms are adapted to rotate about the longitudinal axis of a two-part shaft of the clamp assembly independently of the other string-contacting members. Each member also adjustably impinges upon and urges a given string or course thereof on the instrument toward a user-selectable one of three different longitudinal positions on the neck's front surface, these positions including a home position, a home−1 position, and a home+1 position.

23 Claims, 43 Drawing Sheets

(56) References Cited

U.S. PATENT DOCUMENTS

| | | | |
|---|---|---|---|
| 3,446,108 | A | 5/1969 | Mitchell, Jr. |
| 3,680,427 | A | 8/1972 | Valentino |
| 3,704,646 | A | 12/1972 | Davis |
| 3,805,664 | A | 4/1974 | Starns |
| 3,818,793 | A | 6/1974 | Round |
| 3,915,051 | A | 10/1975 | Kincaid |
| 4,112,805 | A | 9/1978 | Carter |
| 4,183,279 | A | 1/1980 | Shabram, Jr. |
| 4,331,059 | A | 5/1982 | Marabotto |
| 4,334,457 | A | 6/1982 | Spoonts, III |
| 4,428,273 | A | 1/1984 | Favron |
| 4,622,880 | A | 11/1986 | Glemming |
| 4,926,732 | A | 5/1990 | Collins et al. |
| 5,101,706 | A | 4/1992 | Kilgore |
| 5,323,676 | A | 6/1994 | Kennedy |
| 5,497,690 | A | 3/1996 | Soupios |
| 5,623,110 | A | 4/1997 | Hoglund |
| 6,723,905 | B2 | 4/2004 | Gillis |
| 6,998,526 | B1 | 2/2006 | Sims |
| 7,012,181 | B2 | 3/2006 | Tran |
| 7,557,285 | B2 | 7/2009 | Ward |
| 7,563,969 | B2 | 7/2009 | Einhorn et al. |
| 7,812,233 | B1 | 10/2010 | Lee |
| D669,117 | S | 10/2012 | de Neufville |
| 8,618,389 | B2 | 12/2013 | Ryan |
| 8,962,958 | B2 | 2/2015 | Ryan |
| 9,257,102 | B2 | 2/2016 | Ryan |
| 2005/0145089 | A1 | 7/2005 | Davis |
| 2010/0077901 | A1 | 4/2010 | Artioli |

OTHER PUBLICATIONS

"SpiderCapo(TM)", Sep. 19, 2011, retrieved at <<http://spidercapo.com/>>.

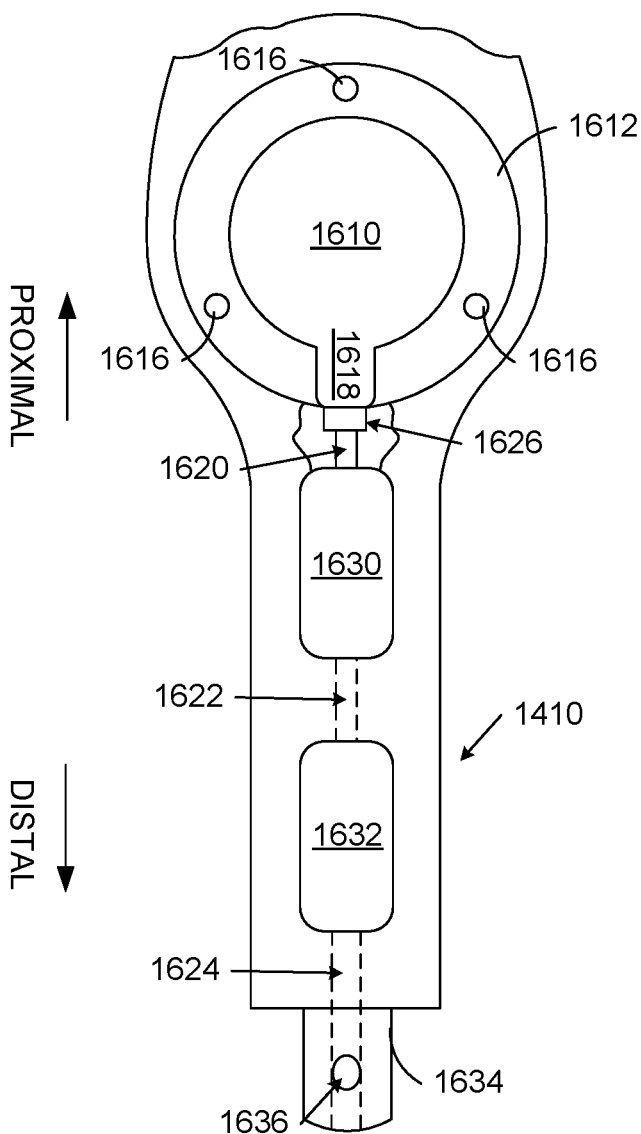 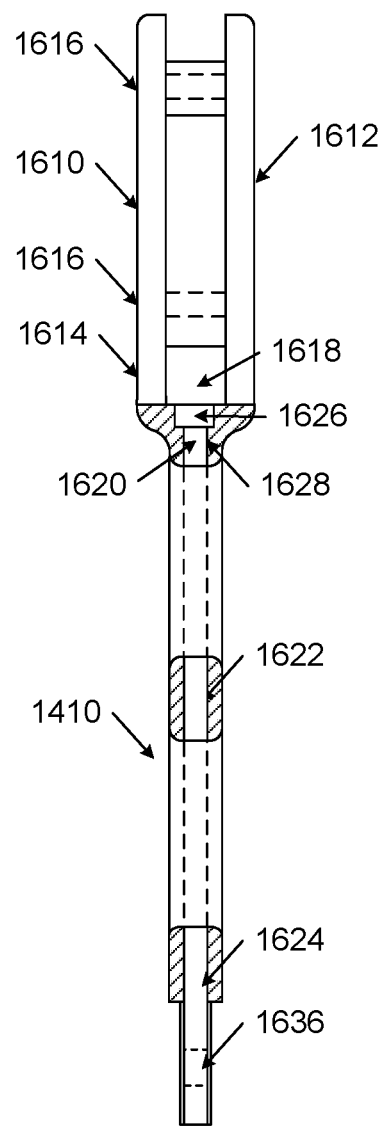
FIG. 16A  FIG. 16B
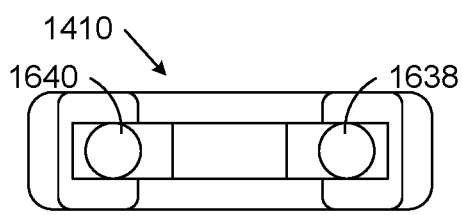 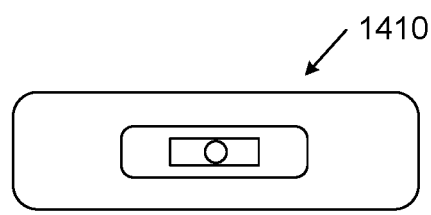
FIG. 16C  FIG. 16D

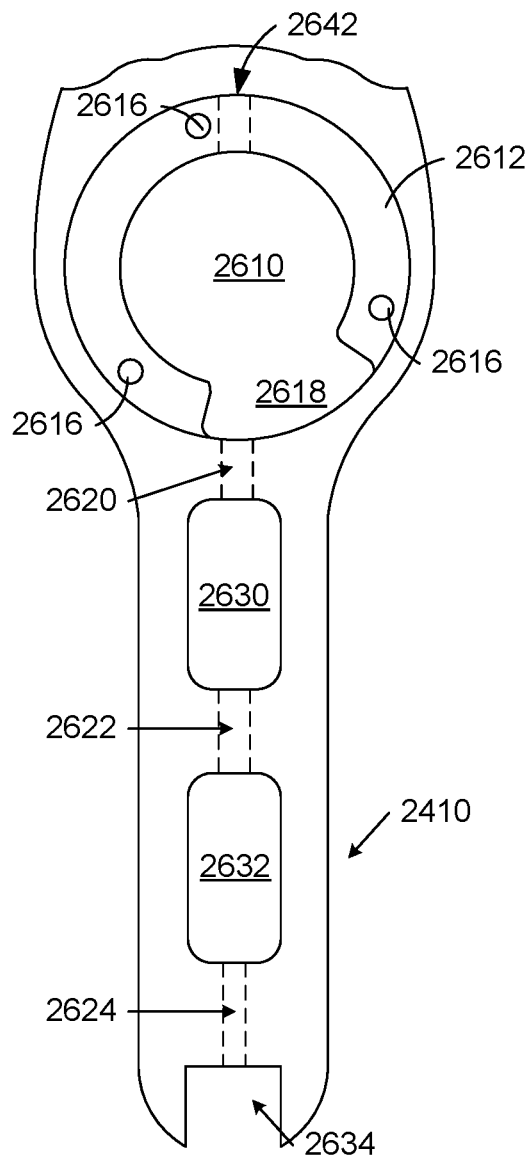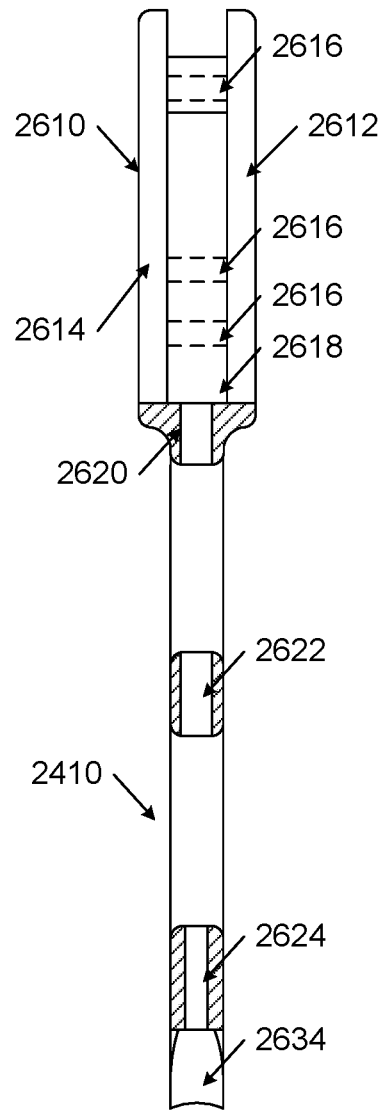
FIG. 26A  FIG. 26B
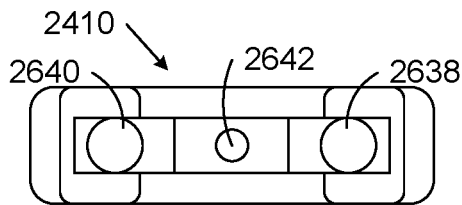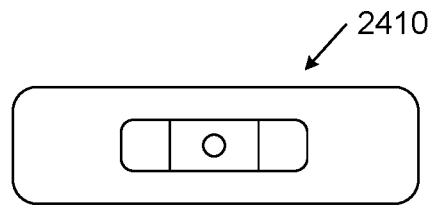
FIG. 26C  FIG. 26D

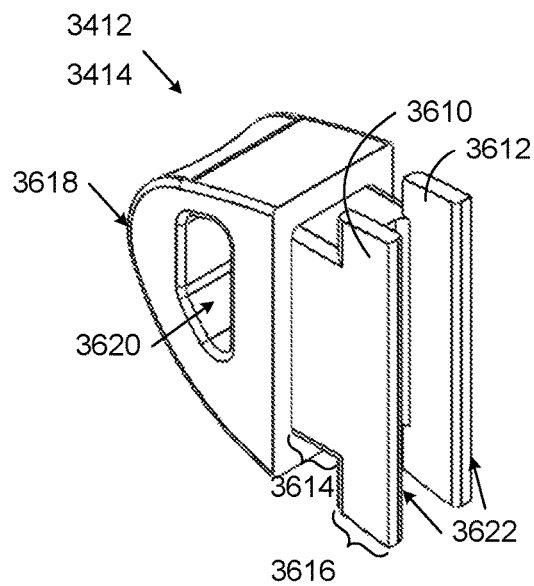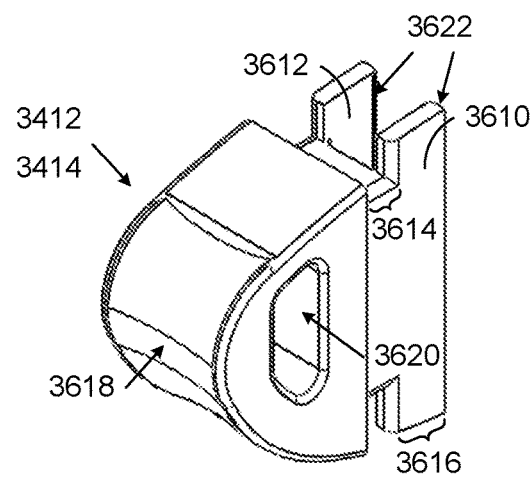
FIG. 36A  FIG. 36B
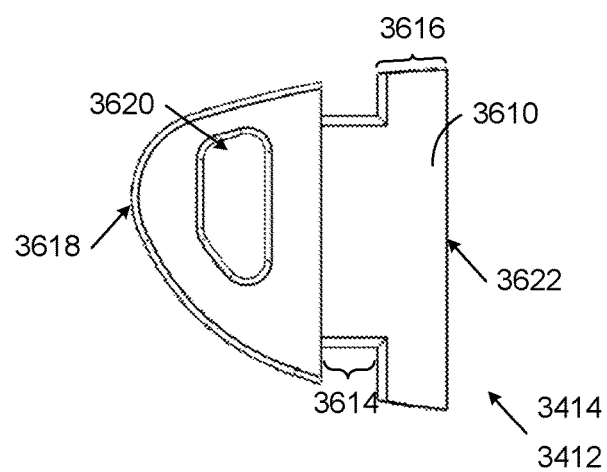
FIG. 36C

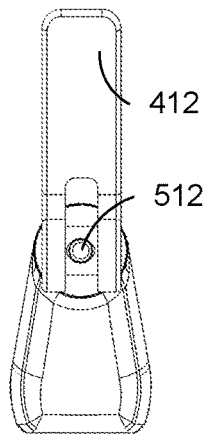
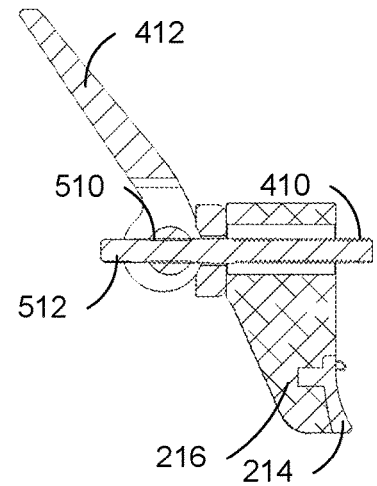
DISENGAGED POSITION
FIG. 39A
FIG. 39B
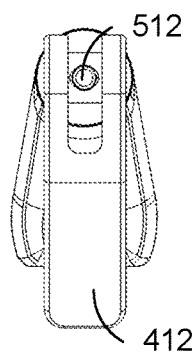
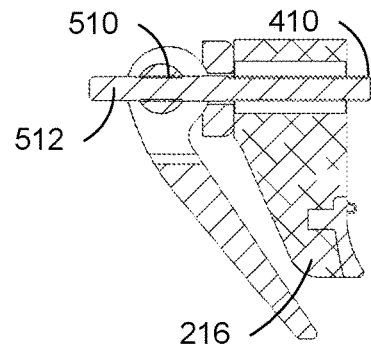
ENGAGED POSITION
FIG. 40A
FIG. 40B

TUNING APPARATUS FOR STRINGED MUSICAL INSTRUMENTS WITH DUAL-ACTION CAM CLAMP ASSEMBLY AND EASY-TO-ADJUST ROCKER ARMS

CROSS REFERENCE TO RELATED APPLICATION

This application claims the benefit of and priority to provisional U.S. patent application Ser. No. 63/215,329 filed Jun. 25, 2021.

BACKGROUND

As is appreciated in the art of musical instruments, a tuning apparatus such as a capo (also formally known as either a "capodastro" or a "capotasto") can be attached to the neck of a stringed musical instrument in order to shorten the playable length (e.g., the effective length) of selected strings of the instrument without a user having to apply finger pressure to the selected strings. A tuning apparatus can thus be used to alter the sound of selected strings of a stringed musical instrument by upwardly transposing the pitch of the sound the selected strings will generate whenever the user applies energy to them by either plucking them, or striking them, or strumming them, or bowing them, or the like.

SUMMARY

The tuning apparatus implementations for stringed musical instruments with a dual-action cam clamp assembly and easy-to-adjust rocker arms (or tuning apparatus implementations for short) described herein generally involve a tuning apparatus for a stringed musical instrument, where the instrument includes an elongated neck having a front surface over which a plurality of strings is stretched. In one exemplary implementation, the tuning apparatus includes a neck-gripping assembly that is adapted to removably attach to a desired longitudinal position on the neck of the musical instrument. This neck-gripping assembly includes a first clamp with a neck-protecting grip insert, a second clamp with a neck-protecting grip insert, and a dual action cam clamp assembly. In one version, the dual action cam clamp assembly includes a two-part shaft having a cam clamp screw shaft with a first threaded longitudinal section forming a distal portion and a rocker arm shaft with a longitudinal threaded hole in a proximal section thereof which interfaces with the first threaded longitudinal section of the cam clamp screw shaft. Whenever the cam clamp screw shaft is rotated in a first direction, a distal end of the rocker arm shaft extends away from the cam clamp screw shaft and whenever the cam clamp screw shaft is rotated in a second direction, the distal end of the rocker arm shaft retracts toward the cam clamp screw shaft. The first clamp is disposed onto a proximal section of the rocker arm shaft and does not extend or retract with the rocker arm shaft when the cam clamp screw shaft is rotated. The second clamp is disposed onto a distal section of the rocker arm shaft and does extend or retract with the rocker arm shaft when the cam clamp screw shaft is rotated. A cam handle is also included that when rotated in a plane perpendicular to a longitudinal axis of the two-part shaft causes the cam clamp screw shaft to rotate about its longitudinal axis, which extends or retracts the second clamp thereby increasing or decreasing the distance between the first and second clamps depending on the direction of rotation. Further, when the cam handle is rotated in a plane parallel to the longitudinal axis of the two-part shaft, this causes the first clamp to slide longitudinally along the two-part shaft, and increase or decrease the distance between the first and second clamps depending on the direction of rotation. The tuning apparatus also includes a plurality of string-contacting members. Each of the string-contacting members is rotatably supported by the rocker arm shaft, and each of the string-contacting members is adapted to rotate about the longitudinal axis of the two-part shaft independently of the other string-contacting members. In addition, each of the string-contacting members is adapted to impinge upon and urge either a different string or course of strings toward a user-selectable one of three different longitudinal impinging positions on the front surface of the neck of the stringed musical instrument, or not impinge upon and urge a string or course of strings whenever the string-contacting member is placed in user-selectable longitudinal open positions. The three different longitudinal impinging positions include a home position, a home−1 position that is closer to a headstock end of the neck than the home position, and a home+1 position that is farther from the headstock end of the neck than the home position, and the longitudinal open positions include longitudinal positions in-between the home−1 position and the home position or in-between the home position and the home+1 position.

In another exemplary implementation of the tuning apparatus for a stringed musical instrument having an elongated neck with a front surface over which a plurality of strings is stretched, the tuning apparatus includes a neck-gripping assembly that is adapted to removably attach to a desired longitudinal position on the neck of the musical instrument, and which includes a rocker arm shaft. The tuning apparatus also includes a plurality of string-contacting members. Each of the string-contacting members includes a rocker arm and rocker hammer, where the rocker arm is rotatably supported by the rocker arm shaft at a proximal portion of the rocker arm. The rocker arm also includes a string-contacting tip element disposed on a proximal end of the rocker arm and an elongated distal portion on which the rocker hammer is slidably disposed. The rocker hammer has a pair of string-contacting hammer elements that are on opposite sides of the rocker hammer and oriented in a traverse relationship to the elongated distal portion of the rocker arm. A release mechanism having a pull release is also included. The pull release is engaged by pulling a pull release button disposed at a distal end of the elongated distal portion of the rocker arm in a distal direction. In the engaged condition, the rocker arm can be rotated about a longitudinal axis of the rocker arm shaft independently of the other string-contacting members. The release mechanism is disengaged by releasing the pull release button. This results in the rocker arm being rotationally locked in place at its current rotational position. Each of the string-contacting members is adapted to impinge upon and urge either a different string or course of strings toward a user-selectable one of three different longitudinal impinging positions on the front surface of the neck of the stringed musical instrument, or not impinge upon and urge a string or course of strings whenever the string-contacting member is placed in user-selectable longitudinal open positions. The three different longitudinal impinging positions include a home position in which the string-contacting tip element is in contact with a string or course of strings, a home−1 position that is closer to a headstock end of the neck than the home position and in which one of the string-contacting hammer elements is in contact with the string or course of strings, and a home+1 position that is farther from the headstock end of the neck than the home position and in which the other string-contacting hammer element is in contact with the string or course of strings. The longitudinal open positions include longitudinal positions in-between the home−1 position and the home position, or in-between the home position and the home+1 position.

In yet another exemplary implementation of the tuning apparatus for a stringed musical instrument having an elongated neck with a front surface over which a plurality of strings is stretched, the tuning apparatus includes a neck-gripping assembly that is adapted to removably attach to a desired longitudinal position on the neck of the musical instrument, and which includes a rocker arm shaft. The tuning apparatus also includes a plurality of string-contacting members. Each of the string-contacting members includes a rocker arm and rocker hammer, where the rocker arm is rotatably supported by the rocker arm shaft at a proximal portion of the rocker arm. The rocker arm also includes a string-contacting tip element disposed on a proximal end of the rocker arm and an elongated distal portion on which the rocker hammer is slidably disposed. The rocker hammer has a pair of string-contacting hammer elements that are on opposite sides of the rocker hammer and oriented in a traverse relationship to the elongated distal portion of the rocker arm. In this implementation, a release mechanism having a push release is included. The push release is engaged by pushing a push release button disposed at a distal end of the elongated distal portion of the rocker arm in a proximal direction. In the engaged condition, the rocker arm can be rotated about a longitudinal axis of the rocker arm shaft independently of the other string-contacting members. The release mechanism is disengaged by releasing the push release button. This results in the rocker arm being rotationally locked in place at its current rotational position. Each of the string-contacting members is adapted to impinge upon and urge either a different string or course of strings toward a user-selectable one of three different longitudinal impinging positions on the front surface of the neck of the stringed musical instrument, or not impinge upon and urge a string or course of strings whenever the string-contacting member is placed in user-selectable longitudinal open positions. The three different longitudinal impinging positions include a home position in which the string-contacting tip element is in contact with a string or course of strings, a home−1 position that is closer to a headstock end of the neck than the home position and in which one of the string-contacting hammer elements is in contact with the string or course of strings, and a home+1 position that is farther from the headstock end of the neck than the home position and in which the other string-contacting hammer element is in contact with the string or course of strings. The longitudinal open positions include longitudinal positions in-between the home−1 position and the home position, or in-between the home position and the home+1 position.

The foregoing Summary is provided to introduce a selection of concepts, in a simplified form, that are further described hereafter in the Detailed Description. This Summary is not intended to identify key features or essential features of the claimed subject matter, nor is it intended to be used as an aid in determining the scope of the claimed subject matter. Its sole purpose is to present some concepts of the claimed subject matter in a simplified form as a prelude to the more detailed description that is presented below.

DESCRIPTION OF THE DRAWINGS

The specific features, aspects, and advantages of the tuning apparatus implementations described herein will become better understood with regard to the following description, appended claims, and accompanying drawings where:

FIGS. 16A-D are diagrams illustrating a plan front view with a partial cut-away section, plan side view with partial cut-away sections, plan top view and plan bottom view, respectively, in simplified form, of a rocker arm housing of the string-contacting member of FIG. 14.

FIGS. 26A-D are diagrams illustrating a plan front view with a partial cut-away section, plan side view with partial cut-away sections, plan top view and plan bottom view, respectively, in simplified form, of a rocker arm housing of the string-contacting member of FIG. 24.

FIGS. 36A-C are diagrams illustrating a perspective back view, perspective front view and plan side view, respectively, in simplified form, of hammer elements of the rocker hammer of FIGS. 34A-B.

FIG. 39A-B are diagrams illustrating a plan side view and cross-sectional front view, respectively, in simplified form, of the cam clamp assembly of the neck-gripping assembly of FIG. 2 placed in its disengaged position.

FIG. 40A-B are diagrams illustrating a plan side view and cross-sectional front view, respectively, in simplified form, of the cam clamp assembly of the neck-gripping assembly of FIG. 2 placed in its engaged position.

FIG. 41A shows a plan side view of the proximal portion of the rocker arm housing with a string-contacting member taking the form of a wheel mechanism, FIG. 41B shows a perspective exploded view of the proximal portion of the rocker arm housing with the string-contacting member taking the form of a wheel mechanism, and FIG. 41C shows a bottom view of the proximal portion of the rocker arm housing without the string-contacting member installed.

DETAILED DESCRIPTION

Figure 1A:
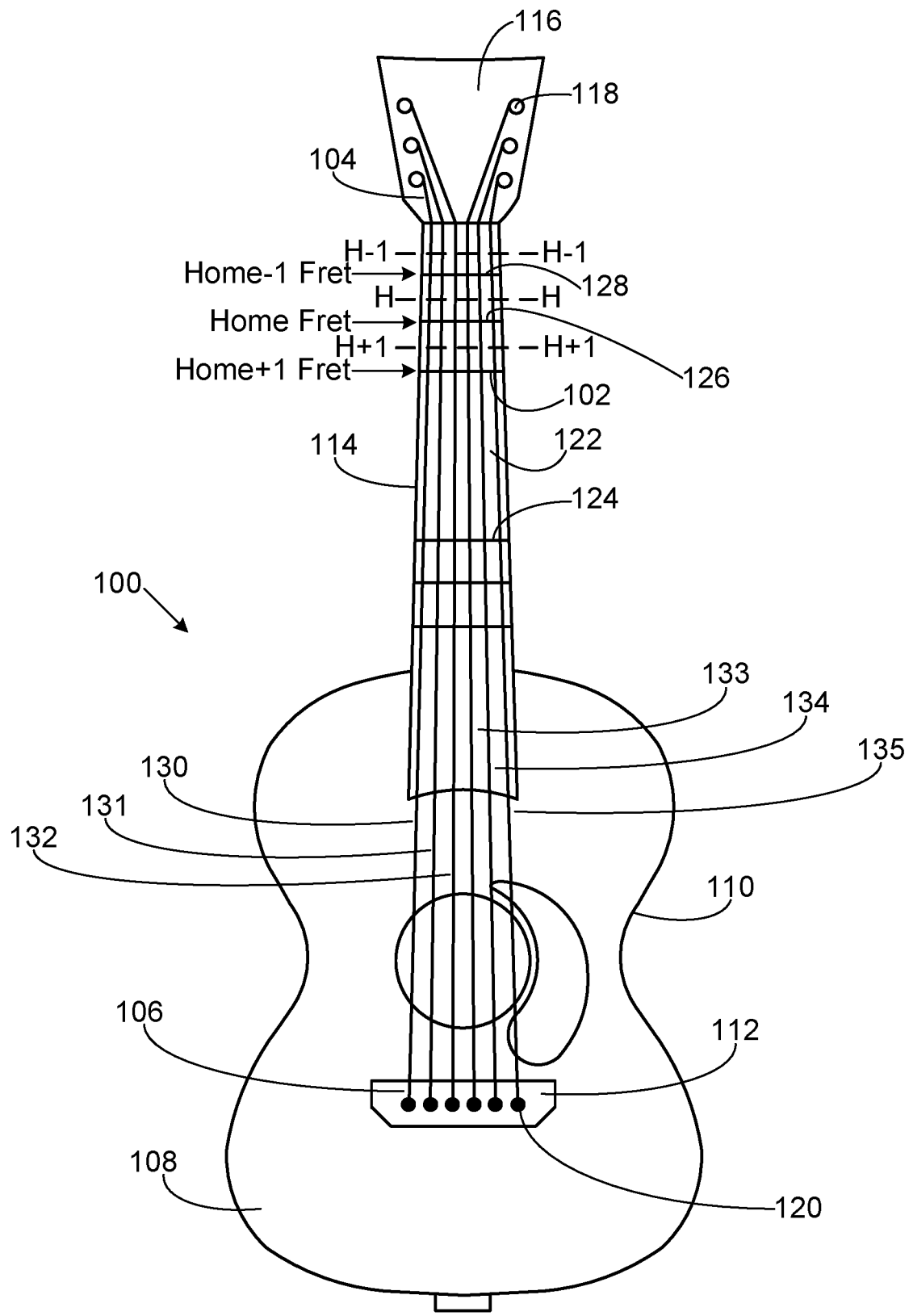
FIG. 1A is a diagram illustrating a front plan view, in simplified form, of an exemplary implementation of a stringed musical instrument to which the tuning apparatus implementations described herein can be removably attached by a user.

In the following description of the tuning apparatus implementations reference is made to the accompanying drawings which form a part hereof, and in which are shown, by way of illustration, specific implementations in which the tuning apparatus can be practiced. It is understood that other implementations can be utilized and structural changes can be made without departing from the scope of the tuning apparatus.

It is also noted that for the sake of clarity specific terminology will be resorted to in describing the tuning apparatus implementations and it is not intended for these implementations to be limited to the specific terms so chosen. Furthermore, it is to be understood that each specific term includes all its technical equivalents that operate in a broadly similar manner to achieve a similar purpose. Reference herein to "one implementation", or "another implementation", or an "exemplary implementation", or an "alternate implementation" means that a particular feature, a particular structure, or particular characteristics described in connection with the implementation or implementation can be included in at least one implementation of the tuning apparatus. The appearances of the phrases "in one implementation", "in another implementation", "in an exemplary implementation", "in an alternate implementation", "in one implementation", "in another implementation", "in an exemplary implementation", and "in an alternate implementation" in various places in the specification are not necessarily all referring to the same implementation or implementation, nor are separate or alternative implementations/implementations mutually exclusive of other implementations/implementations. Yet furthermore, the order of process flow representing one or more implementations or implementations of the tuning apparatus does not inherently indicate any particular order nor imply any limitations of the tuning apparatus.

The term "open position" is used herein to refer to a situation where a given string of a stringed musical instrument is not currently being impinged upon and urged (either by a user or by the tuning apparatus implementations described herein) toward a front surface of an elongated neck of the instrument (e.g., the string is in its natural state). Furthermore, to the extent that the terms "includes," "including," "has," "contains," variants thereof, and other similar words are used in either this detailed description or the claims, these terms are intended to be inclusive, in a manner similar to the term "comprising", as an open transition word without precluding any additional or other elements.

1.0 Stringed Musical Instruments

The term "stringed musical instrument" (hereafter sometimes simply referred to as an instrument) is used herein to refer to any type of musical instrument having an elongated neck which includes a longitudinal axis and a front surface over which a plurality of strings is stretched. As is appreciated in the art of musical instruments, the front surface of the neck commonly includes a plurality of frets. A user can use finger pressure to temporarily impinge upon and urge one or more selected strings toward selected points on the front surface of the neck. In the case where the front surface of the neck includes frets, this finger pressure will result in the selected strings being temporarily pressed onto the frets that are adjacent to these selected points, which serves to shorten the playable length (herein also referred to as the "effective length") of the selected strings. This finger pressure will thus serve to upwardly transpose the pitch of the sound the selected strings will generate whenever the user applies energy to them by either plucking them, or striking them, or strumming them, or bowing them, or the like.

As is also appreciated in the art of musical instruments, there are many different types of stringed musical instruments having various numbers of strings. Popular examples of stringed musical instruments include the following. Bass guitars commonly have either four, or five, or six strings. Electric guitars and acoustic guitars commonly have either six or 12 strings. Banjos commonly have either four, or five, or six strings. Mandolins commonly have eight strings. Lutes commonly have either 13, or 15, or 24 strings. As is also appreciated in the art of musical instruments, the strings of a given stringed musical instrument can also be arranged into a plurality of courses where each of the courses includes a different and non-overlapping subset of the strings. By way of example but not limitation, the strings of a 12-string electric or acoustic guitar are commonly arranged into six courses (e.g., the 12 strings are arranged as six pairs of strings) as follows. The first course includes the first and second strings, the second course includes the third and fourth strings, the third course includes the fifth and sixth strings, the fourth course includes the seventh and eighth strings, the fifth course includes the ninth and tenth strings, and the sixth course includes the eleventh and twelfth strings.

As is also appreciated in the art of musical instruments, the elongated necks of the different types of stringed musical instruments can have different widths, thicknesses and cross-sectional shapes. The location of the frets on the front surface of the neck and the spacing between the various frets can be different on the different types of instruments. The spacing in-between the strings can also be different on the different types of instruments. The spacing between the left/right edge of the neck and the leftmost/rightmost string can also be different on the different types of instruments. The distance between any given string and the front surface of the neck can also be different on the different types of instruments (e.g., different types of instruments can have different actions).

Figure 1B:
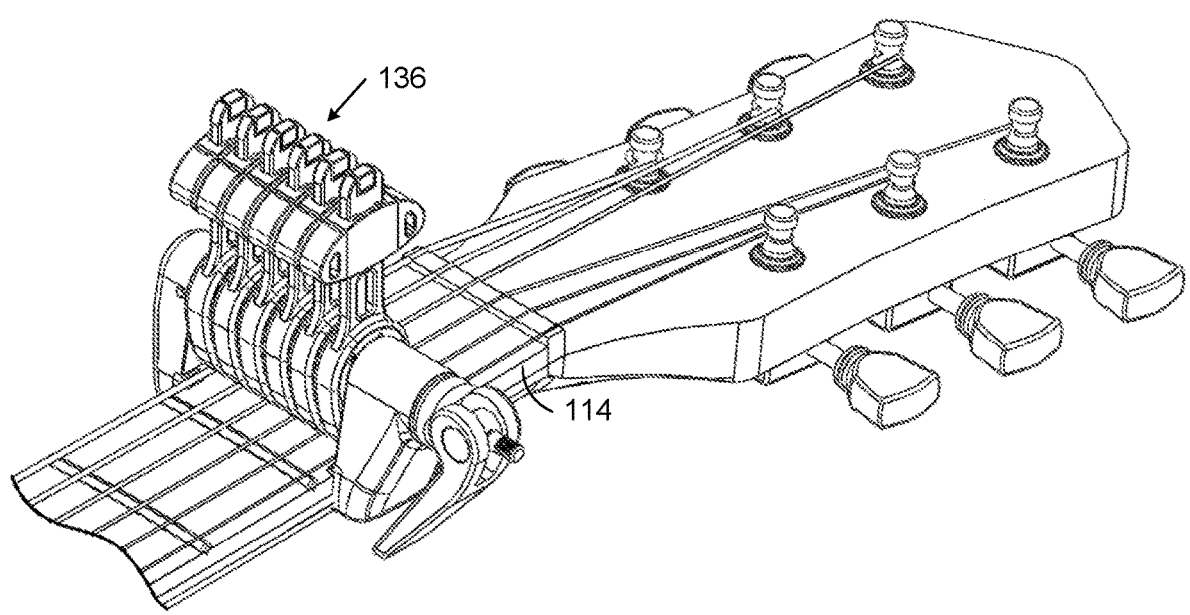
FIG. 1B is a diagram illustrating a perspective view, in simplified form, of an exemplary implementation of the tuning apparatus described herein removably attached to an elongated neck of a stringed musical instrument.

FIG. 1A illustrates a front plan view, in simplified form, of an exemplary implementation of a stringed musical instrument 100 to which the tuning apparatus implementations described herein can be removably attached by a user. FIG. 1B depicts one implementation of the tuning apparatus 136 installed on the neck 114 of a stringed musical instrument. The instrument exemplified in FIG. 1A is an acoustic guitar which is generally configured as follows. The guitar 100 includes a soundboard 108, a resonant chamber 110, a bridge 112, an elongated neck 114, a headstock 116, and a prescribed number of strings (six in the illustrated implementation, namely strings 130-135) each having a first end 104 and a second end 106. The bridge 112 is commonly rigidly attached to the soundboard 108. The soundboard 108 is rigidly attached to the resonant chamber 110. One end of the neck 114 is rigidly attached to the soundboard 108 and resonant chamber 110. The other end of the neck is rigidly attached to the headstock 116. The headstock 116 includes the prescribed number of tuning pegs 118, where each of the tuning pegs is rotatably attached to a different prescribed position on the headstock. The bridge 112 includes the prescribed number of anchor pegs 120 (or any like bridge fastening mechanisms), where each of the anchor pegs is rigidly attached to a different prescribed position on the bridge.

As exemplified in FIG. 1A, the first end 104 of each of the strings 130-135 on the acoustic guitar 100 is securely attached to a different tuning peg 118, and the second end 106 of each of the strings is securely attached to a different anchor peg 120. The user can rotate selected tuning pegs 118 in order to stretch each of the strings 130-135 to a prescribed tension between the bridge 112 and headstock 116. The user can thus individually tune the strings 130-135 of the guitar 100 by rotating the tuning peg 118 each string is attached to and thus adjusting the amount of tension that is applied to the string. The elongated neck 114 of the guitar 100 includes a front surface 122 which may include a plurality of frets (e.g., frets 124, 126, 128 and 102) each having a raised edge, where the frets are sequentially disposed in different prescribed positions along a longitudinal axis of the neck on the front surface of the neck, and each of the frets is substantially perpendicular to this axis. The frets 124, 126, 128 and 102 serve to divide the front surface 122 of the neck 114 into sections.

Referring again to FIG. 1A, the headstock 116, tuning pegs 118, elongated neck 114, frets (e.g., fret 124), bridge 112 and anchor pegs 120 are arranged such that the strings 130-135 have the following spatial relationships on the acoustic guitar 100. The strings 130-135 are disposed in substantially parallel spaced relation to the longitudinal axis of the neck 114. The strings 130-135 are also disposed in spaced relation to the front surface 122 of the neck 114. The distance between any given string and the front surface 122 of the neck 114 is known as the "action." The raised edge of each of the frets (e.g., fret 124) is in transverse relation to each of the strings 130-135. Each of the strings 130-135 is separated from the raised edge of each of the frets (e.g., fret 124) by a prescribed distance when each of the strings is in an open position (e.g., when none of the strings are currently being impinged upon and urged toward the front surface 122 of the neck 114). The user can change the note a given string (e.g., string 130) will generate by urging the string toward the front surface 122 of the neck 114 between a selected pair of adjacent frets (e.g., frets 126 and 102).

As is appreciated in the art of musical instruments, the strings of a stringed musical instrument are predominately tuned in what is known as a "standard tuning" where, generally speaking, the strings are individually tuned by rotating the tuning pegs as just described such that the sound generated by each of the strings is a prescribed tonal interval away from the sound generated by the adjacent strings. As such, the user of the instrument generally learns to play it using conventional fingering patterns to generate standard chords, standard scales and standard harmonic patterns. Whenever the instrument is tuned in the standard tuning, the user needs to use finger pressure to impinge upon and urge selected strings toward selected points on the front surface of the neck in order to play a specific chord or scale.

As is also appreciated in the art of musical instruments, the strings of a stringed musical instrument can also be tuned in various other ways such as what are commonly referred to as "alternative tunings" and "open tunings". Generally speaking, in the alternative and open tunings the tonal intervals between one or more pairs of adjacent strings are modified from the prescribed tonal intervals used in the standard tuning. Thus, the alternative and open tunings can be employed to produce noticeable variations in the sounds and harmonies that are generated by the instrument. Whenever the instrument is tuned in an alternative or open tuning, the user can play a specific chord with all the strings in the open position (e.g., the user does not need to use finger pressure to impinge upon and urge any of the strings toward the front surface of the neck in order to play a specific chord). However, since the tonal intervals between the various strings are modified from the prescribed tonal intervals used in the standard tuning, the user needs to use fingering patterns which are different from the conventional fingering patterns in order to generate the standard chords, standard scales and standard harmonic patterns. Additionally, different fingering patterns are associated with each of the different alternative and open tunings. In recent years there has been a substantial increase in the interest in alternative and open tunings from the perspective of both users of stringed musical instruments and listeners.

Various methods can be employed to change the tuning of the strings of an instrument from the standard tuning to a desired alternative or open tuning. One such method is to use the tuning pegs of the instrument to modify the amount of tension that is applied to selected strings as just described. Another such method is to employ the tuning apparatus implementations described herein. More particularly and as will be described in more detail hereafter, in the aforementioned case where the front surface of the elongated neck of the instrument includes frets, the tuning apparatus implementations can be removably attached to a desired longitudinal position on the elongated neck of the instrument such that a shaft of the tuning apparatus implementations is substantially parallel to and approximately midway between a selected pair of adjacent frets on this front surface. The particular fret in the selected pair that is closest to the bridge of the instrument is hereafter referred to as a "home fret." The other fret in the selected pair (e.g., the particular fret in the selected pair that is closest to the headstock of the instrument) is hereafter referred to as a "home−1 fret." The particular fret on this front surface that is adjacent to the home fret on a side thereof that is opposite the home−1 fret is hereafter referred to as a "home+1 fret." By way of example but not limitation and referring again to FIG. 1A, the tuning apparatus implementations (not shown) can be removably attached to the neck 114 of the acoustic guitar 100 such that the shaft of the tuning apparatus implementations is in the position indicated by line H—H. In this particular case fret 126 would be the home fret, fret 128 would be the home−1 fret, and fret 102 would be the home+1 fret.

2.0 Tuning Apparatus for Stringed Musical Instruments

The tuning apparatus implementations described herein generally involve an accessory/auxiliary tuning apparatus for a stringed musical instrument having a plurality of strings. The apparatus is generally applicable to either changing the tuning of any individual string on demand, or changing the tuning of any combination of two or more strings at the same time on demand, where these tuning changes occur without having to use the instrument's tuning pegs to modify the amount of tension that is applied to any of the strings (e.g., without having to modify the actual tuning of any of the strings).

More particularly and as will be described in more detail hereafter, once the tuning apparatus implementations described herein have been removably attached to a desired longitudinal position on the elongated neck of the instrument such that the shaft of the tuning apparatus implementations is substantially parallel to and approximately midway between a selected pair of adjacent frets on the front surface of the neck, the user of the instrument can configure the tuning apparatus implementations on demand to shorten the effective length of either any individual string, or any combination of two or more strings at the same time, where this shortening takes place on each of the strings independently and within a span of three contiguous frets. In other words, the user can configure the tuning apparatus implementations to adjustably and releasably depress any individual string onto any desired fret within the span of three contiguous frets. The user can also configure the tuning apparatus implementations to adjustably and releasably depress any combination of two or more strings at the same time either onto any desired single fret within the span of three contiguous frets, or onto any combination of desired frets within this span. This ability to shorten the effective length of any selected combination of two or more strings at the same time onto a plurality of different frets allows entire chords to be generated by the tuning apparatus implementations.

The tuning apparatus implementations described herein are advantageous for various reasons including, but not limited to, the following. As will be appreciated from the more detailed description that follows, the tuning apparatus implementations generally allow the user to enhance their musical performance and related enjoyment in various ways when playing the instrument. The tuning apparatus implementations ensure reliable and consistent positioning thereof on the instrument's neck, and against the instrument's strings and the front surface of the neck. The tuning apparatus implementations are cost effective, durable, and aesthetically pleasing. The tuning apparatus implementations are easy to use, and are effective in various instrument playing scenarios such as practicing, teaching, and live performance, among others. The tuning apparatus implementations can be repeatedly securely attached to and removed from the neck without damaging it or its finish (e.g., without scratching, nicking or denting the neck), and without damaging any other part of the instrument. Similarly, the tuning apparatus implementations can be repeatedly used to change the tuning of the strings without any wear or damage occurring to the instrument or strings.

As will also be appreciated from the more detailed description that follows, the user of a stringed musical instrument can quickly and securely attach the tuning apparatus implementations described herein to the instrument's neck with ease, simplicity and integrity whenever they want to change the tuning of the instrument's strings from the standard tuning to an alternate or open tuning. Once the tuning apparatus implementations have been attached to the neck, the user can use the tuning apparatus implementations to easily, reliably and quickly switch from the standard tuning to any one of a very large number of alternative and open tunings on demand, or switch from one particular alternative or open tuning to another on demand, or switch from a particular alternative or open tuning back to the standard tuning on demand, all without having to change the actual tuning of the strings. By way of example but not limitation, in an exemplary situation where the tuning apparatus implementations are attached to the neck of a six string guitar, the user can use the tuning apparatus implementations to easily, reliably and quickly switch between $2^{24}$=16,777,216 different possible tunings on the guitar. The user can also easily and quickly remove the tuning apparatus implementations from the neck at will.

As will also be appreciated from the more detailed description that follows, when the tuning apparatus implementations described herein are used to implement a selected alternative or open tuning on a stringed musical instrument, the user of the instrument can continue to play it in the selected tuning using the aforementioned conventional fingering patterns they already know (or using simple variations thereof). In other words, the tuning apparatus implementations eliminate the need for the user to have to learn new chord and scale fingering patterns for each of the different alternative or open tunings they are interested in using on the instrument. Thus, the tuning apparatus implementations allow the user to experiment with the instrument and easily generate a vast array of pleasing and harmonically complex new sounds and musical arrangements, which are quite different from the sounds and arrangements that can be generated using just the standard tuning, without having to change the actual tuning of the instrument's strings or learn new chord and scale fingering patterns. The tuning apparatus implementations thus allow the user to conveniently add new tonal dimensions to their existing musical repertoire and express new musical ideas.

As will also be appreciated from the more detailed description that follows, the tuning apparatus implementations described herein have an ergonomic design that maximizes the user's accessibility to the various strings and frets of their instrument, and minimizes any encumbrance the user might experience when the tuning apparatus implementations are attached to the instrument's neck. In other words, the tuning apparatus implementations do not impede or interfere with the user's hands or their ability to reach any desired fret (with the exception of the aforementioned home fret) on any string, regardless of which if any strings are currently being impinged upon and urged toward the front surface of the instrument's neck by the tuning apparatus implementations.

As will further be appreciated from the more detailed description that follows, the tuning apparatus implementations described herein are universally adjustable and universally configurable to accommodate a wide variety of different types of stringed musical instruments. Examples of this universal adjustability and configurability include, but are not limited to, the following. The tuning apparatus can be configured such that the number of string-contacting members equals the total number of strings on the instrument. For example, in the case where the instrument is a four-string bass guitar, the tuning apparatus would be configured with four string-contacting members. In the case where the instrument is a five-string bass guitar, the tuning apparatus would be configured with five string-contacting members. In the case where the instrument is either a six-string bass guitar or a six-string acoustic guitar, the tuning apparatus would be configured with six string-contacting members. In each of these cases a string-contacting member spacing mechanism is advantageously employed to substantially center the plane of rotation of each of the string-contacting members over a different string.

The strings of a given stringed musical instrument can also be arranged into a plurality of courses, where each of the courses includes a different and non-overlapping subset of the strings. In this situation the tuning apparatus can be configured such that the number of string-contacting members equals the total number of courses on the instrument. For example, in the case where the instrument is either a 12-string electric or acoustic guitar having six course of strings each of which includes a different and non-overlapping pair of strings, the tuning apparatus would be configured with six string-contacting members. Here again, a string-contacting member spacing mechanism is advantageously employed to substantially center the plane of rotation of each of the string-contacting members over a different course of strings.

The tuning apparatus implementations described herein can also be easily and quickly adjusted by the user to accommodate instruments having a variety of different neck shapes (e.g., V-shaped necks, C-shaped necks, and U-shaped necks), different neck widths and different neck radii. The tuning apparatus implementations can also be easily and quickly attached to different longitudinal positions on the instrument's neck to accommodate instruments having different fret locations and spacings. The user can also adjust the placement of the tuning apparatus implementations on the instrument's neck in relation to a home fret, home−1 fret, and home+1 fret.

Figure 2:
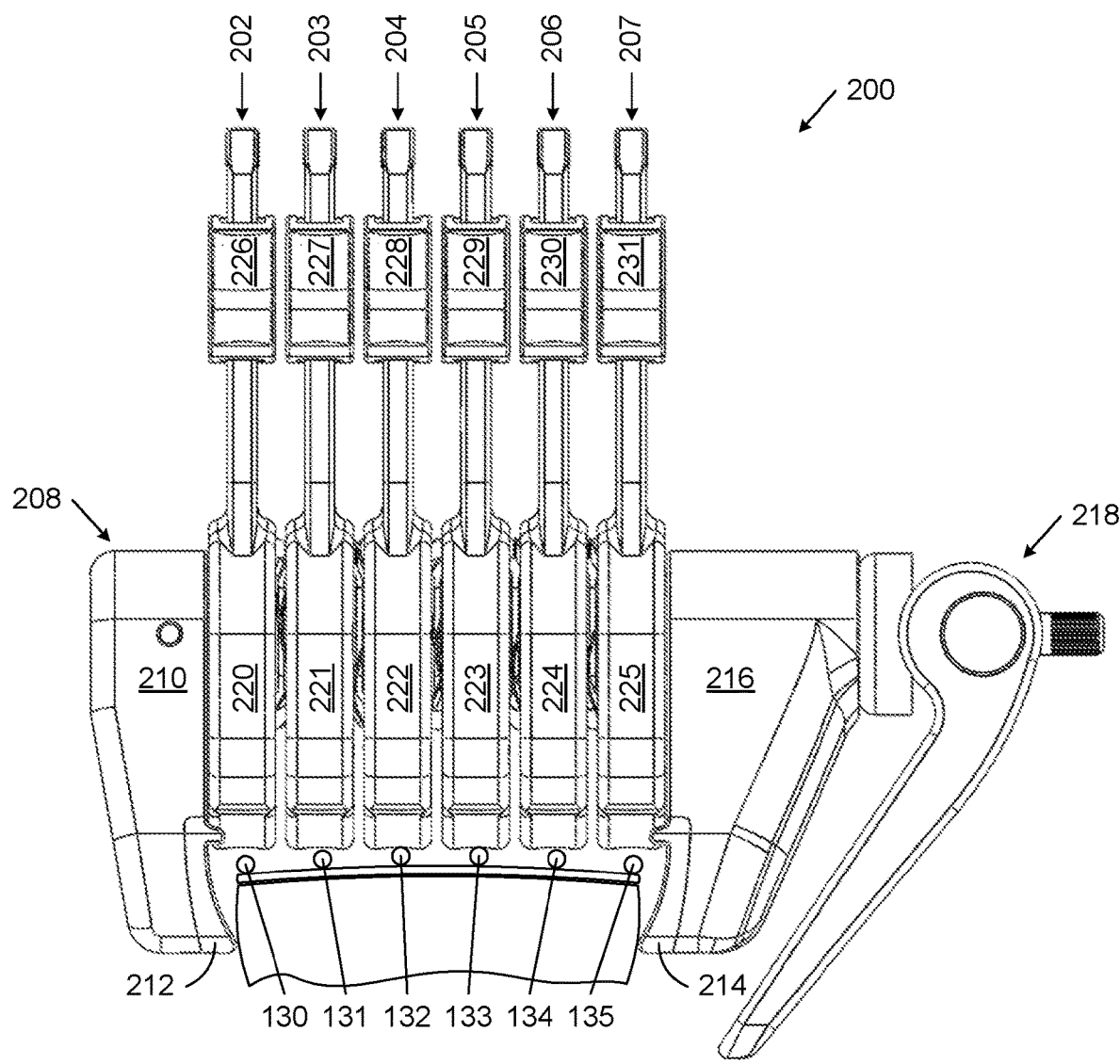
FIG. 2 is a diagram illustrating a front plan view, in simplified form, of one implementation of the tuning apparatus that includes a neck gripping assembly and a plurality of string-contacting members, where each of the string-contacting members is in a home rotational orientation and is impinging upon and urging a given string of the stringed musical instrument toward a home position on a front surface of an elongated neck of the instrument.

FIG. 2 illustrates one implementation, in simplified form, of the aforementioned tuning apparatus for a stringed musical instrument (hereafter simply referred to as a "tuning apparatus"). More particularly, FIG. 2 illustrates a front plan view, in simplified form, of one implementation of the tuning apparatus 200 that includes a neck-gripping assembly 208, a plurality of string-contacting members (six in the illustrated implementation, namely string-contacting members 202-207), and a string-contacting member spacing mechanism, where each of the string-contacting members is in a home rotational orientation and is impinging upon and urging a given string 130-135 of the instrument toward a home position on a front surface 122 of the elongated neck 114 of the instrument. In one implementation, the neck-gripping assembly 208 includes a distal clamp 210 with a grip insert 212, a proximal clamp 216 with a grip insert 214, and a cam clamp assembly 218. In one implementation, each of the string-contacting members 202-207 of the tuning apparatus 200 is slidably and rotatably disposed onto a distal longitudinal section of a multi-part shaft that is shared with the cam clamp assembly as will be described in more detail hereafter. Each of the string-contacting members 202-207 includes a rocker arm 220-225 and a rocker hammer 226-231, along with additional components which will be described in more detail hereafter. The neck-gripping assembly 208 is herein also referred to as a "neck-gripping means". Each of the string-contacting members 202-207 is herein also referred to as a "string-depressing means". The string-contacting member spacing adjustment mechanism is herein also referred to as a "string-contacting member spacing means".

Figure 3:
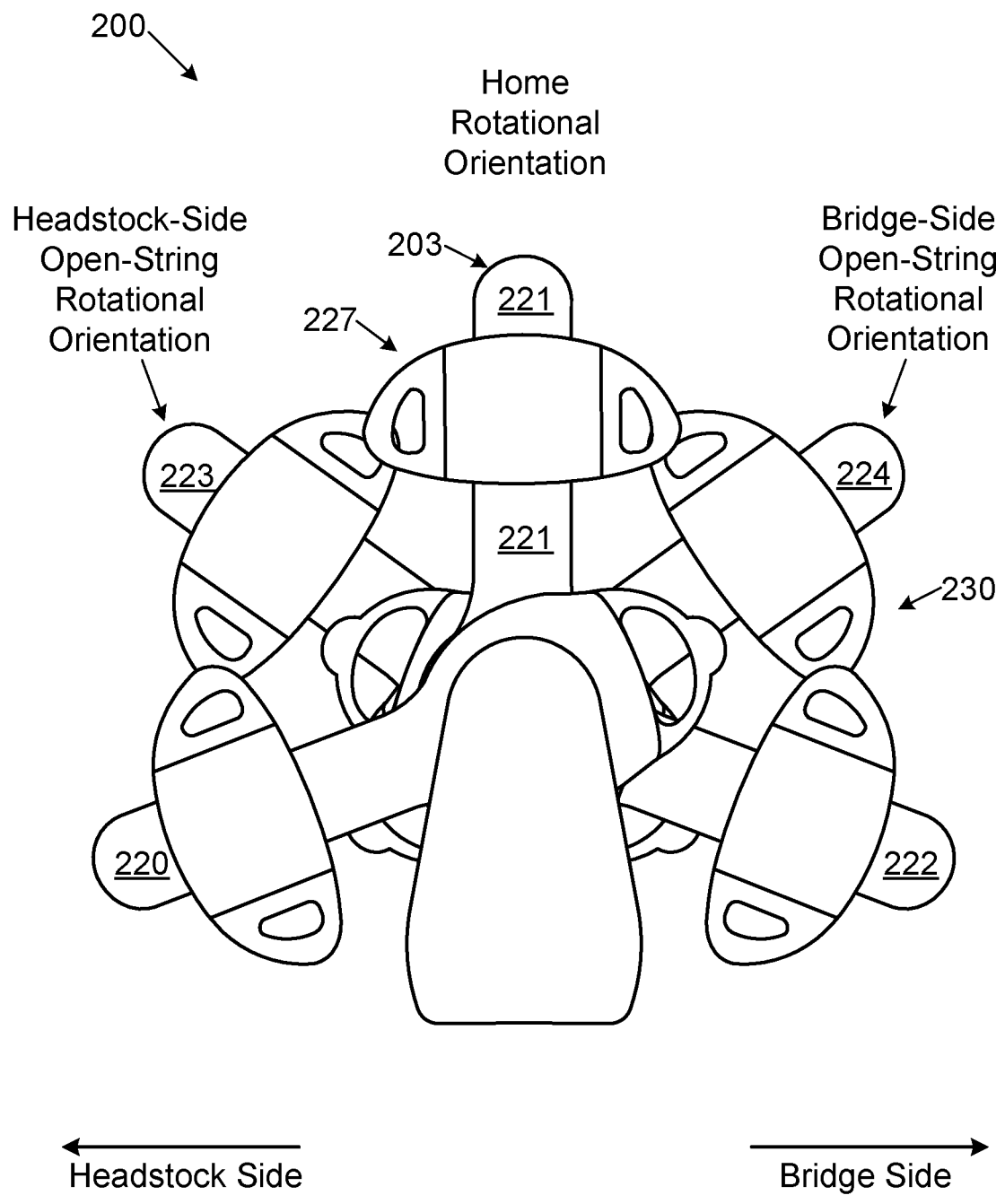
FIG. 3 is diagram illustrating a partially-transparent plan view, in simplified form, of the tuning apparatus of FIG. 2 rotated right 90 degrees, where some of the string-contacting members are in a home−1 rotational orientation, some of the string-contacting members are in a headstock-side open-string rotational orientation, some of the string-contacting members are in the home rotational orientation, some of the string-contacting members are in a bridge-side open-string rotational orientation, and some of the string-contacting members are in a home+1 rotational orientation.

As described heretofore and referring again to FIGS. 1A and 2, the front surface 122 of the elongated neck 114 can include a plurality of frets (e.g., frets 128, 126, 102 and 124) which are sequentially arranged on the front surface and are substantially perpendicular to the longitudinal axis of the neck. Generally speaking, in the tuning apparatus implementations described herein one of the frets is considered to be a home fret. Another one of the frets is considered to be a home−1 fret, where the home−1 fret is adjacent to the home fret on the headstock 116 end of the neck 114. Yet another one of the frets is considered to be a home+1 fret, where the home+1 fret is adjacent to the home fret on a side thereof that is opposite the home−1 fret. More particularly, in the exemplary implementation of the tuning apparatus 200 described herein where the tuning apparatus is removably attached to the longitudinal position on the neck indicated by line H—H, this position includes the multi-part shaft of the tuning apparatus (as will be described in more detail hereafter) being substantially parallel to and approximately midway between the home fret 126 and home−1 fret 128. Referring now to FIG. 3, a partially-transparent plan view, in simplified form, of the tuning apparatus 200 of FIG. 2 rotated right 90 degrees, illustrates the various rotational positions of the string-contacting members. In the depicted example, some of the string-contacting members are in a home−1 rotational orientation (e.g., member 202), some of the string-contacting members are in a headstock-side open-string rotational orientation (e.g., member 205), some of the string-contacting members are in the home rotational orientation (e.g., member 203), some of the string-contacting members are in a bridge-side open-string rotational orientation (e.g., member 206), and some of the string-contacting members are in a home+1 rotational orientation (e.g., member 204).

2.1 Cam Clamp Assembly

Figure 4A:
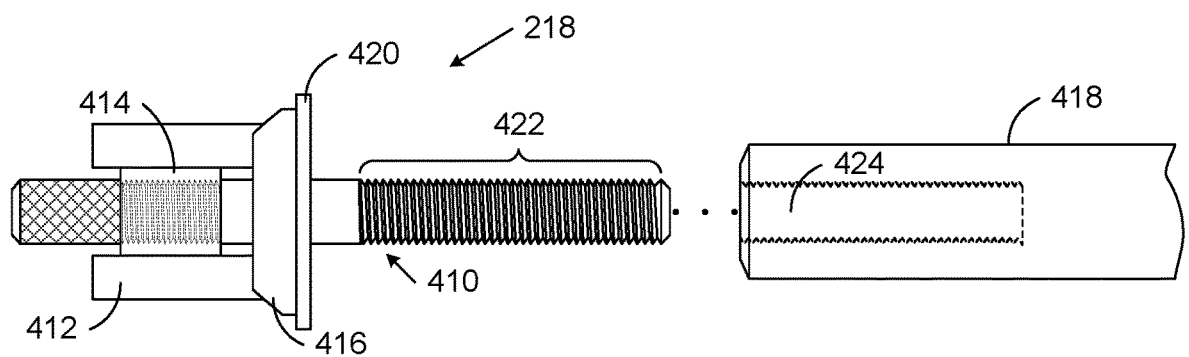
FIGS. 4A-B are diagrams illustrating a plan top view and a plan side view, respectively, in simplified form, of a cam clamp assembly of the neck-gripping assembly of FIG. 2.
Figure 4B:
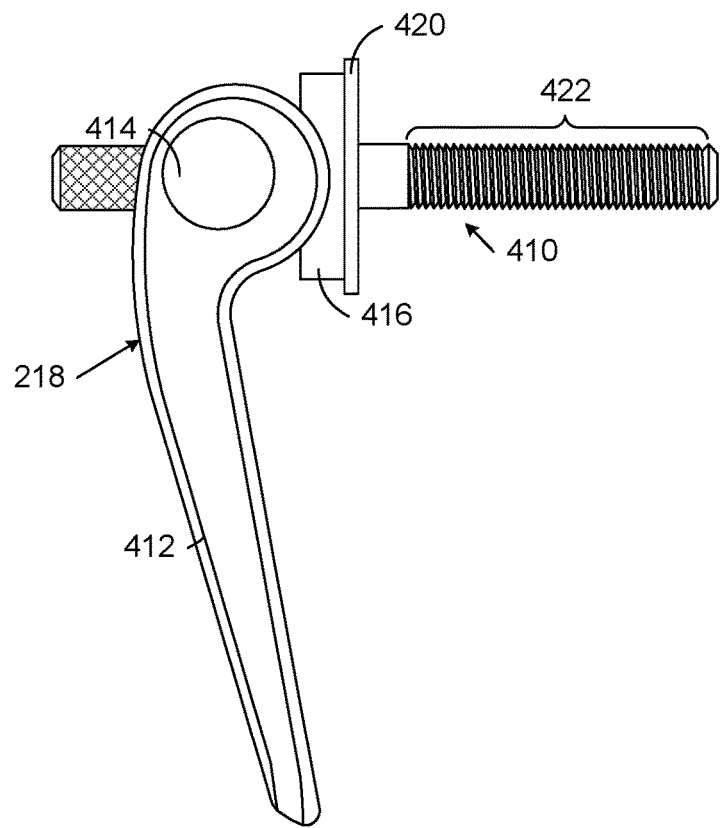

Referring to FIGS. 4A-B, two standalone views (plan top and plan side views, respectively) illustrate, one implementation of a cam clamp assembly 218 of the neck-gripping assembly. The cam clamp assembly 218 includes a cam clamp screw shaft 410 and cam handle 412, which are interfaced via cam clamp shaft 414 and cam clamp seat 416. There is also a rocker arm shaft 418 that interfaces with the distal end of the cam clamp screw shaft 410, and there can be an optional cam clamp washer 420 that is disposed adjacent to a back side of the cam clamp seat 416 to facilitate rotation of the cam handle 412 as will be described hereafter.

Figure 5:
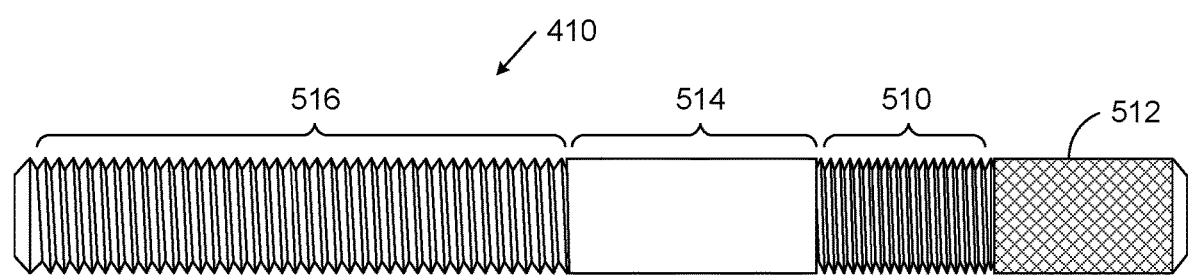
FIG. 5 is a diagram illustrating a plan front view, in simplified form, of a cam clamp screw shaft of the cam clamp assembly of FIGS. 4A-B.

FIG. 5 illustrates a standalone front plan view, in simplified form, of an exemplary implementation of the cam clamp screw shaft 410 of the cam clamp assembly 218 of FIGS. 4A-B. The cam clamp screw shaft 410 includes a fine-threaded longitudinal section 510 and a fine adjustment stub 512 which forms the proximal end, a middle longitudinal section 514, and a distal longitudinal section 516. The distal longitudinal section 516 is threaded with a more course thread than the fine-threaded longitudinal section 510. In one implementation, the threads of the distal longitudinal section 516 are #8-32 threads. The middle longitudinal section 514 is not threaded and has a circular cross-section with diameter approximately the same as the outer diameter of the fine-threaded longitudinal section 510 and the course-threaded longitudinal section 516. The proximal fine-threaded longitudinal section 510 has threads that are finer (i.e., more threads per inch) than the distal course-threaded longitudinal section 516 of the cam clamp screw shaft 410. In one implementation, the threads of the fine-threaded longitudinal section 510 are #8-80 threads. As will be described in more detail hereafter, the finer threads of the fine-threaded longitudinal section 510 of the cam clamp screw shaft 410 are employed to fine tune the action of the clamp handle. In one implementation, the outside surface of the fine adjustment stub 512 has a knurled pattern to facilitate a user gripping the stub with their fingers. It is also noted that alternate implementations of the cam clamp screw shaft (not shown) are also possible where the diameters of the proximal, middle and distal sections are different for that described above.

Figure 6A:
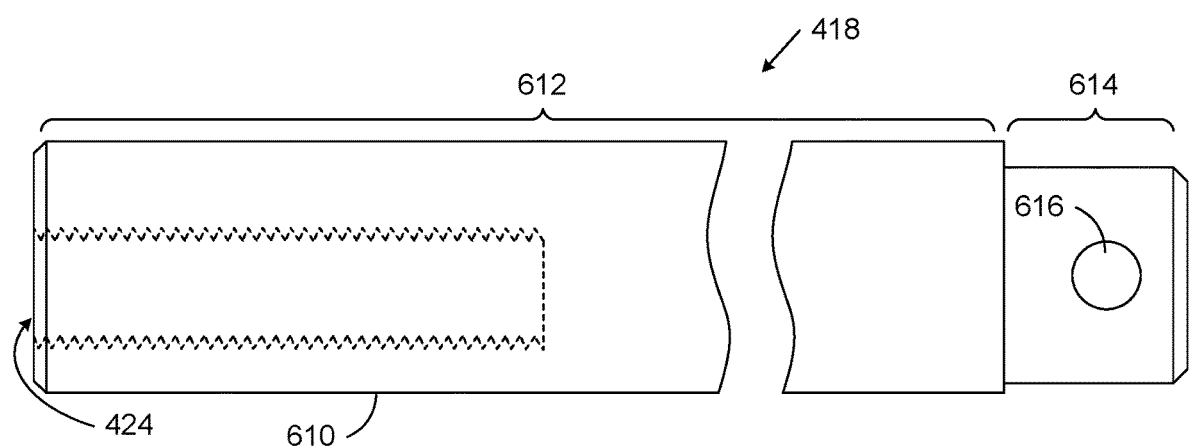
FIGS. 6A-B are diagrams illustrating a plan front view and a plan end view, respectively, in simplified form, of a rocker arm shaft of the cam clamp assembly of FIGS. 4A-B.
Figure 6B:
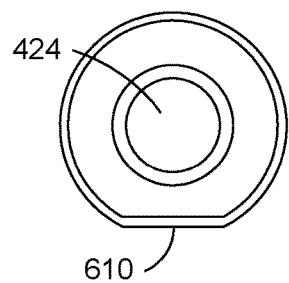

Referring again to FIGS. 4A-B, the distal course-threaded longitudinal section 422 of the cam clamp screw shaft 410 is threaded into a longitudinal threaded hole 424 in a proximal portion of the rocker arm shaft 418. The threads in the longitudinal threaded hole 424 are sized to mesh with the threads of the distal threaded longitudinal section 422 of the cam clamp screw shaft 410. In one implementation, the threads of longitudinal threaded hole 424 are #8-32 threads. As will be described in more detail hereafter, the course-threaded longitudinal section 422 of the cam clamp screw shaft 410 and the longitudinal threaded hole 424 in the rocker arm shaft 418 permits the cam clamp screw shaft 410 to be rotated in one direction to extend the rocker arm shaft away from the cam clamp screw shaft or rotated in the other direction to retract the rocker arm shaft toward the cam clamp screw shaft. Referring now to FIGS. 6A-B (plan front view and end view, respectively), the rocker arm shaft 418 also has a longitudinal flattened area 610 that runs the entire length of its proximal portion 612 and which when installed in the tuning apparatus faces toward the neck of the stringed musical instrument. In addition to the longitudinal threaded hole 424 in a proximal portion of the rocker arm shaft 418, the rocker arm shaft has a smaller diameter distal portion 614 that has a through-hole 616 located adjacent its distal end. The purpose of the longitudinal flattened area 610 and the through-hole 616 will be described in more detail hereafter.

Figure 7A:
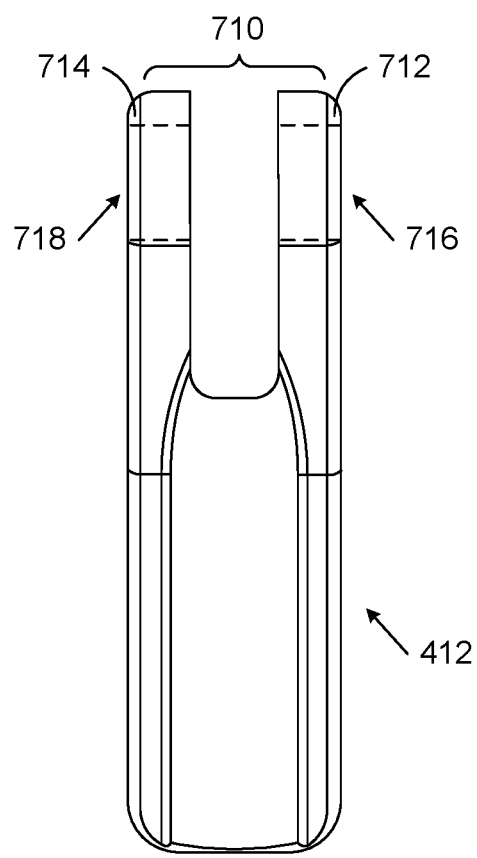
FIGS. 7A-B are diagrams illustrating a plan front view and a plan side view, respectively, in simplified form, of a cam handle of the cam clamp assembly of FIGS. 4A-B.
Figure 7B:
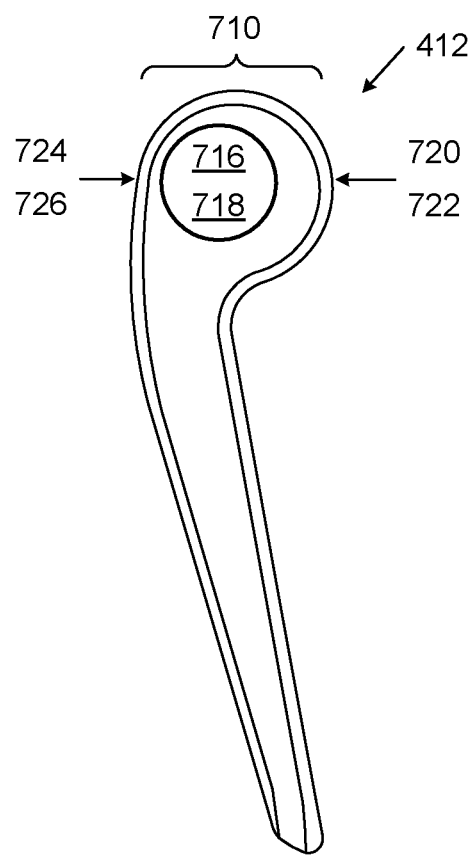
Figure 8A:
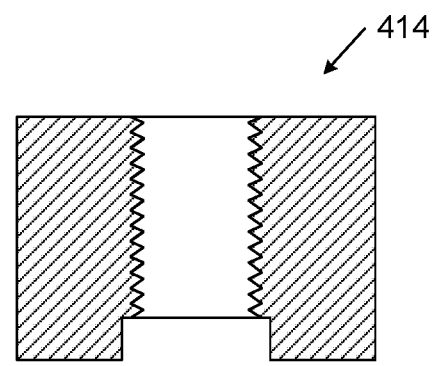
FIGS. 8A-C are diagrams illustrating a cross-sectional top view, plan front view and cross-sectional side view, respectively, in simplified form, of a cam clamp shaft of the cam clamp assembly of FIGS. 4A-B.
Figure 8B:
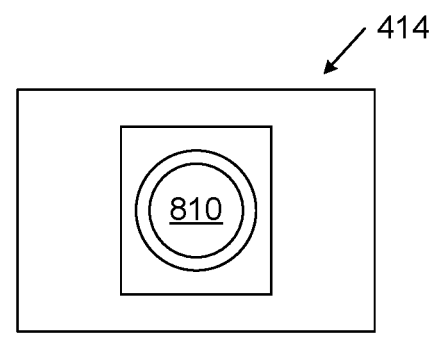
Figure 8C:
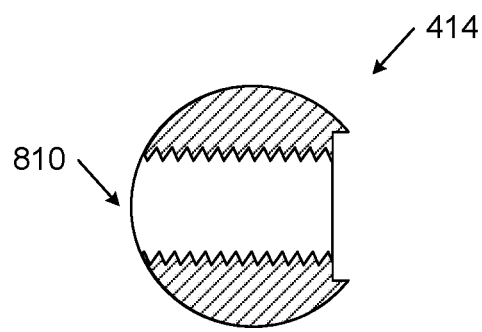
Figure 9A:
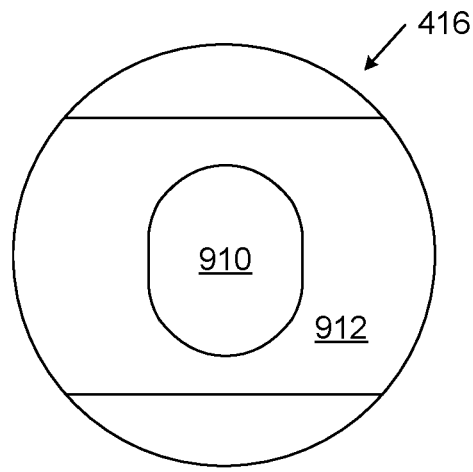
FIGS. 9A-B are diagrams illustrating a plan front view and cross-sectional side view, respectively, in simplified form, of a cam clamp seat of the cam clamp assembly of FIGS. 4A-B.
Figure 9B:
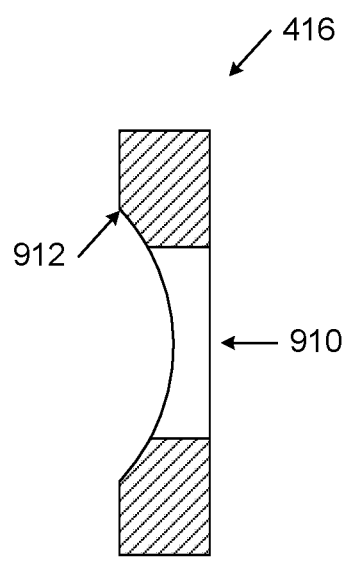
Figure 10A:
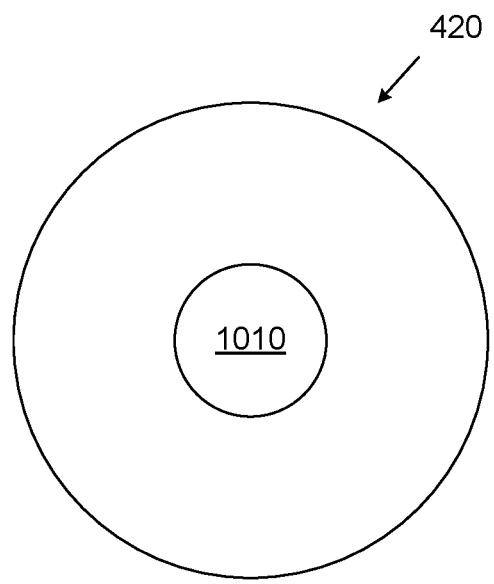
FIGS. 10A-B are diagrams illustrating a plan front view and cross-sectional side view, respectively, in simplified form, of an optional cam clamp washer of the cam clamp assembly of FIGS. 4A-B.
Figure 10B:
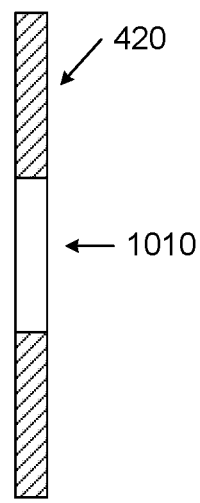

FIGS. 7A-B illustrates a standalone plan front view and plan side view, respectively, in simplified form, of an exemplary implementation of the cam handle 412 of the cam clamp assembly (218 of FIGS. 4A-B). The depicted cam handle 412 has a two-pronged fork-like structure 710 at its proximal end, each prong 712, 714 of which is disk-shaped with a circular aperture 716, 718 that interfaces with the cam clamp shaft (414 of FIGS. 4A-B) as will be described in more detail hereafter. As best seen in FIG. 7B, the apertures 716, 718 are offset within the substantially circular two-pronged fork-like structure 710. This results in the distance from the center of each aperture 716, 718 being further away from a front face 720, 722 of the associated prongs 712, 714 than a back face 724, 726 of the associated prongs. FIGS. 8A-C illustrate three standalone views (cross-sectional top, plan front, and cross-sectional side views respectively) of an exemplary implementation of the cam clamp shaft 414 of the cam clamp assembly (218 of FIGS. 4A-B). The depicted cam clamp shaft 414 has a threaded through-hole 810 that extends through the cam clamp shaft and has a central axis that intersects and is perpendicular to the longitudinal axis of the cam clamp shaft. The threaded through-hole 810 interfaces with the proximal fine-threaded longitudinal section (510 of FIG. 5) of the cam clamp screw shaft, as will be described in more detail hereafter. The threads of the threaded through-hole 810 are made to mesh with the proximal fine-threaded longitudinal section (510 of FIG. 5) of the cam clamp screw shaft. In one implementation, the threads of threaded through-hole 810 are #8-80 threads. FIGS. 9A-B illustrate two standalone views (plan front and cross-sectional side views respectively) of an exemplary implementation of the cam clamp seat 416 of the cam clamp assembly (218 of FIGS. 4A-B). The depicted cam clamp seat 416 has a through-hole 910 which slidably interfaces with the cam clamp screw shaft (410 of FIGS. 4A-B) as will be described in more detail hereafter. The depicted cam clamp seat 416 also has a cutout 912 with a circular curved surface that slidably interfaces with the faces of the associated prongs (712, 714 of FIGS. 7A-B), as will be described in more detail hereafter. FIGS. 10A-B illustrate two standalone views (plan front, and cross-sectional side views respectively) of an exemplary implementation of the optional cam clamp washer 420 of the cam clamp assembly (218 of FIGS. 4A-B). The depicted cam clamp washer 420 has a central hole 1010 which slidably interfaces with the cam clamp screw shaft 410 as will be described in more detail hereafter.

Figure 11A:
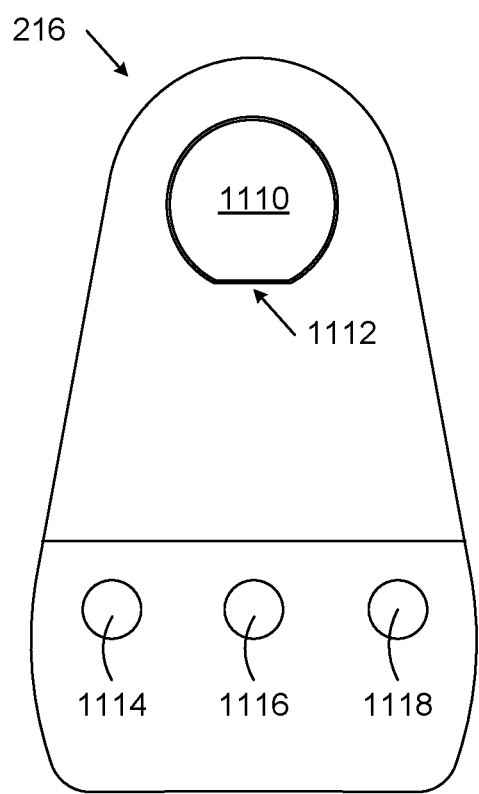
FIGS. 11A-B are diagrams illustrating a plan front view and partially cross-sectional side view, respectively, in simplified form, of a proximal clamp of the neck-gripping assembly of FIG. 2.
Figure 11B:
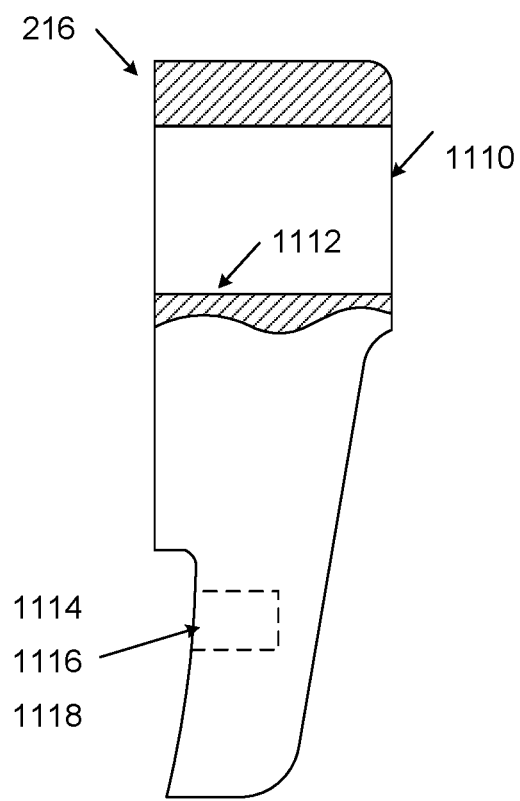
Figure 12A:
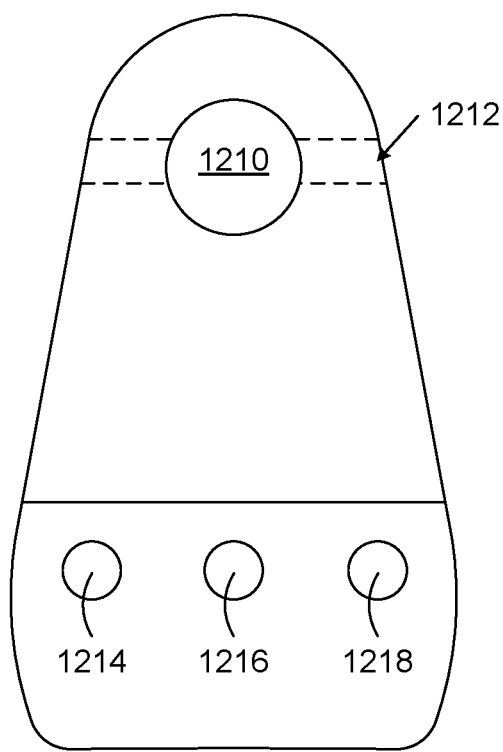
FIGS. 12A-B are diagrams illustrating a plan front view and partially cross-sectional side view, respectively, in simplified form, of a distal clamp of the neck-gripping assembly of FIG. 2.
Figure 12B:
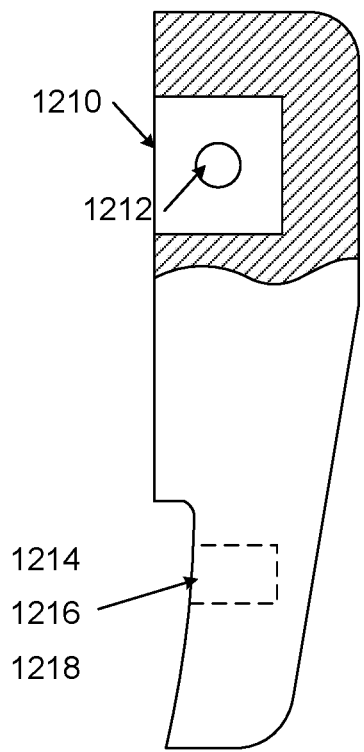
Figure 13A:
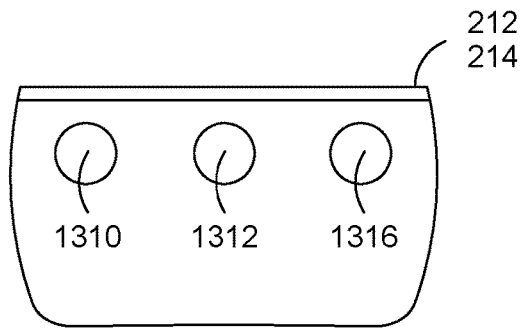
FIGS. 13A-D are diagrams illustrating a plan front view, plan side view, plan bottom view and perspective back view, respectively, in simplified form, of a grip insert which is installed on the proximal and distal clamps of FIGS. 11A-B and 12A-B.
Figure 13B:
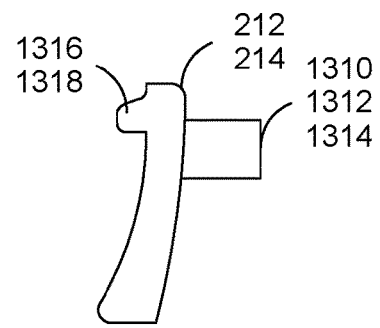
Figure 13C:
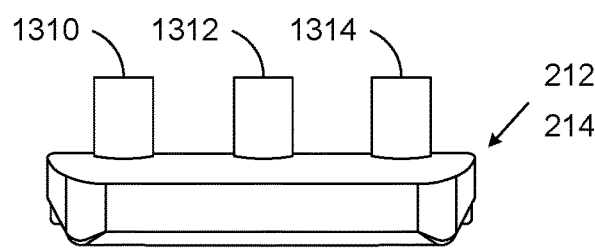
Figure 13D:
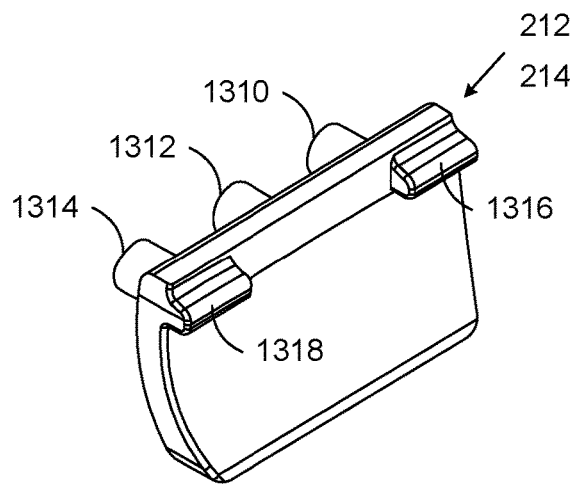

Referring to FIGS. 11A-B, two standalone views (plan front and partially cross-sectional side views, respectively) illustrate, in simplified form, an exemplary implementation of the proximal clamp 216 of the neck-gripping assembly of FIG. 2. The depicted proximal clamp 216 has a through-hole 1110 with a longitudinal flattened area 1112 that runs its length and is sized to slidably interface with the rocker arm shaft (418 of FIGS. 4A-B). The depicted proximal clamp 216 also has three blind holes 1114, 1116, 1118 whose purpose will be described hereafter. FIGS. 12A-B illustrate two standalone views (plan front and partially cross-sectional side views, respectively) of the distal clamp 210 of the neck-gripping assembly of FIG. 2. The depicted distal clamp 210 has two intersecting holes 1210, 1212. The larger-diameter blind hole 1210 interfaces with the distal end of the rocker arm shaft (418 of FIGS. 4A-B and FIG. 6) and the smaller-diameter through-hole 1212 interfaces with a clamp pin (not shown), as will be described in more detail hereafter. The depicted distal clamp 210 also has three blind holes 1214, 1216, 1218 whose purpose will be described hereafter. FIGS. 13A-D illustrate various standalone views (plan front, plan side, plan bottom, and perspective back views) of a grip insert 212, 214 of FIG. 2. The grip insert 212, 214 includes three cylindrical projections 1310, 1312, 1314 that project from the front side of the insert, and which are insertable into the previously-described blind holes (1112, 1114, 1116 of FIGS. 11A-B and 1214, 1216, 1218 of FIGS. 12A-B), respectively, in the proximal and distal clamps 216, 210. The grip insert 212, 214 also has a pair of shelf-like projections 1316, 1318 that project from the neck-contacting surface of the insert. These projections 1316, 1318 extend over and rest on the front surface of the neck of the stringed musical instrument when the tuning apparatus is in place on the instrument, as shown in FIG. 2. It is noted that while two projections 1316, 1318 are included on each grip insert 212, 214 in the implementation shown in FIGS. 13A-D, the length, location and number of the projection can vary. For example, a single, more centrally located, projection could be employed. In one implementation, the grip insert 212, 214 is made from resiliently flexible but relatively stiff materials such as EPDM (ethylene propylene diene monomer) rubber, or nitrile butadiene rubber (NBR), or the like, so as to conform to the shape of and snugly grip the neck of the stringed musical instrument while still protecting it and preventing the tuning apparatus from slipping. The grip inserts 212, 214 operate cooperatively to maintain the rocker arm shaft (418 of FIGS. 4A-B) in substantially parallel spaced relation to the front surface of the neck 114 of the stringed musical instrument, and maintain the rocker arm shaft in substantially perpendicular spaced relation to the plurality of strings, thus maintaining the plane of rotation of each of the string-contacting members in substantially perpendicular relation to the front surface of the neck.

2.2 String Contacting Member With Pull Button Release

Figure 14:
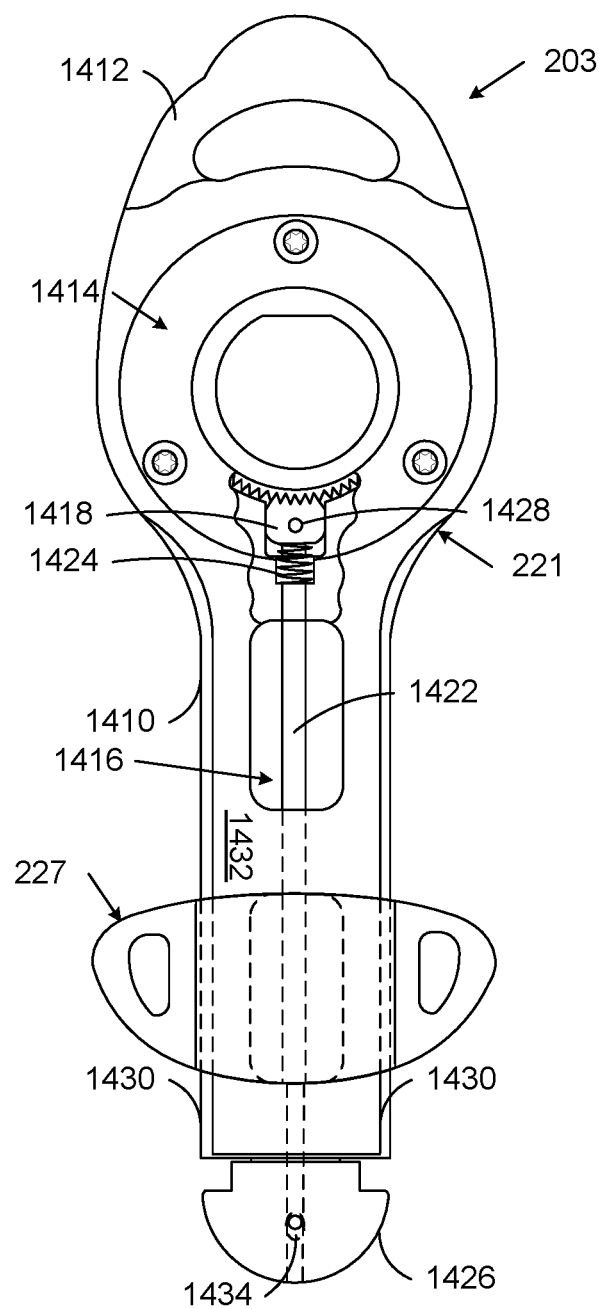
FIG. 14 is a diagram illustrating a standalone plan front view, in simplified form, of a pull release implementation of one of the plurality of string-contacting members of FIG. 2.
Figure 15:
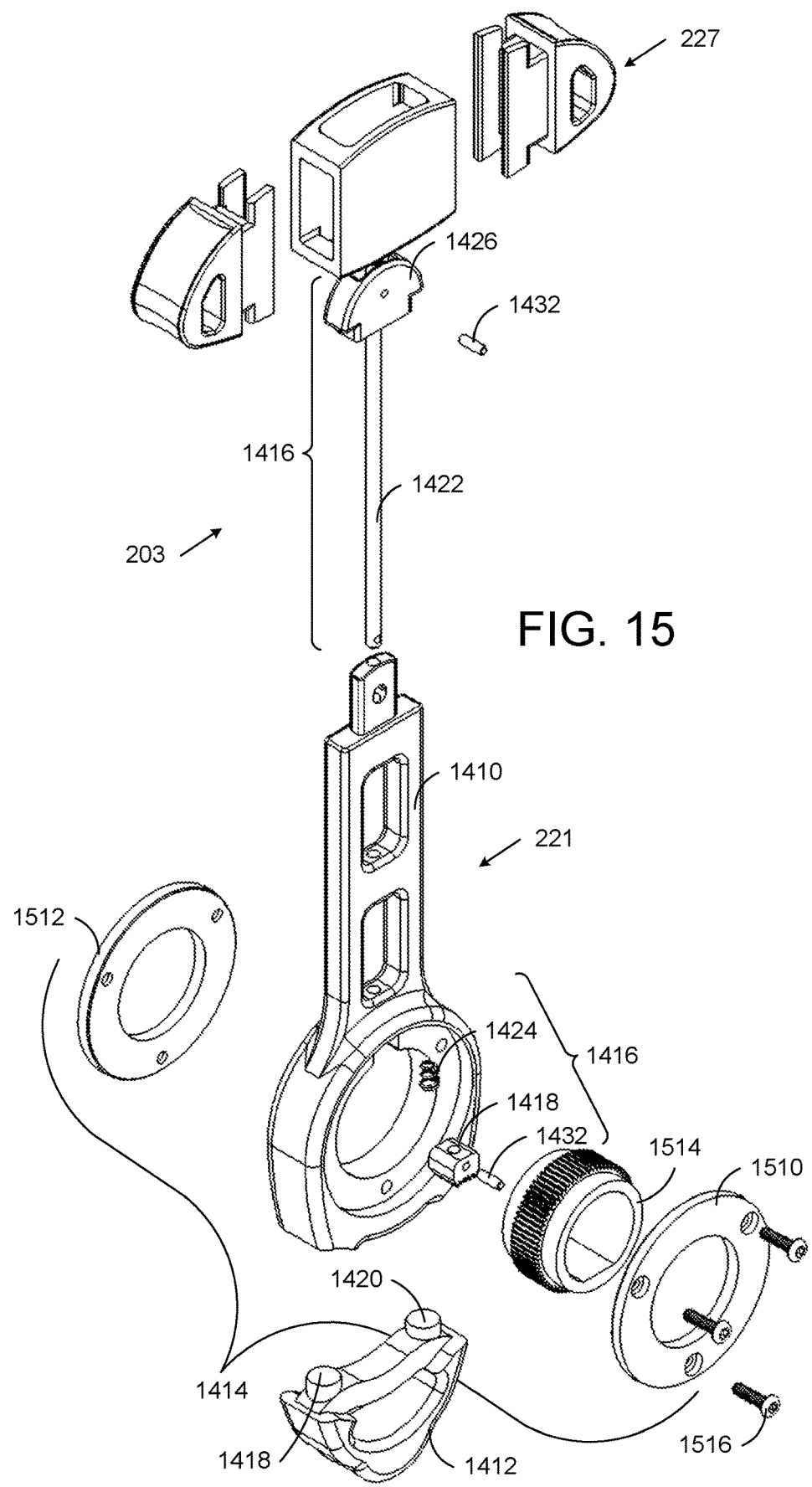
FIG. 15 is a diagram illustrating a standalone partially-exploded perspective view, in simplified form, of the pull release implementation of the of string-contacting member of FIG. 14.

FIG. 14 illustrates a standalone plan front view, in simplified form, of one implementation of a string-contacting member (e.g., member 203 of FIG. 2) that employs a pull release. FIG. 15 illustrates a partially-exploded perspective view, in simplified form, of the string-contacting member 203 of FIG. 14, where this string-contacting member 203 includes a rocker arm 221 and a rocker hammer 227. With regard to the rocker arm 221, it includes a rocker arm housing 1410 with string-contacting tip element 1412, along with an indexing mechanism 1414 and a release mechanism 1416 that are installed within the rocker arm housing.

FIGS. 16A-D illustrate a series of standalone views (plan front view with a partial cutaway section, plan side view with partial cutaway sections, plan top view and plan bottom view, respectively) of an exemplary implementation of the rocker arm housing 1410 of FIGS. 14 and 15. The aperture 1610 in the wider portion of the rocker arm housing 1410 at its proximal end houses the indexing mechanism 1414 (not shown), as will be described in more detail hereafter. Surrounding the aperture 1610 on both faces of the wider portion of the rocker arm housing 1410 is a circular recess 1612, 1614, and three equidistant through-holes 1616, which accommodate fasteners that hold the indexing mechanism in place once it is installed. Additionally, there is a notch 1618 with a rectangular cross-section located at the distal end of the wider portion of the rocker arm housing 1410. A series of longitudinal through-holes 1620, 1622, 1624 within the elongated section of the rocker arm housing 1410 form a channel through which a pull shaft (not shown) of the release mechanism is slidably disposed. The first of these through-holes 1620 includes a larger proximal section 1626 that opens into the notch 1618 and a smaller distal section 1628 that opens into a first slot-shaped opening 1630 in the rocker arm housing 1410. In the depicted implementation, the larger proximal section 1626 and smaller distal section 1628 are cylindrical in shape. The second longitudinal through-hole 1622 opens into the distal end of the slot-shaped opening 1630 and opens into the proximal end of a second slot-shaped opening 1632 in the rocker arm housing 1410. The third longitudinal through-hole 1624 opens into the distal end of the second slot-shaped opening 1632 and exits the rocker arm housing 1410 at the distal end of a tab section 1634 of the housing. A through-hole 1636, which has a central axis that is parallel to the central axis of the aperture 1610, and perpendicular to and intersecting the through-hole 1624, is located in the tab section 1634 of the rocker arm housing 1410 adjacent its distal end. This through-hole 1636 has an oval shape with its longer axis aligned longitudinally with the rocker arm housing 1410. The through-hole 1636 interfaces with a pull button (not shown) that is part of the release mechanism, as will be described in more detail hereafter. There are also a pair of blind holes 1638, 1640, which extend into the proximal end of the rocker arm housing 1410. These blind holes 1638, 1640 interface with corresponding projections of the string-contacting tip element (1412 of FIGS. 14 and 15). More particularly, in the exemplary implementation of the string-contacting tip element 1412 that is illustrated in FIGS. 14 and 15, the end of the string-contacting tip element that is attached to the rocker arm housing 1410 includes two posts 1418, 1420. This number equals the number of post-accepting blind holes 1638, 1640 projecting into the proximal end of the rocker arm housing 1410, and the size, shape, location and longitudinal orientation of these posts 1418, 1420 is adapted to allow them to mate with the post-accepting blind holes 1638, 1640. It is noted that the existence of these blind holes 1638, 1640 and their corresponding posts 1418, 1420 is advantageous since they enhance the strength of the attachment between the rocker arm housing 1410 and the string-contacting tip element 1412. However, an alternate implementation (not shown) of the rocker arm housing and the string-contacting tip element is also possible where the housing includes less or more post-accepting holes and correspondingly, the string-contacting tip element includes a like number of posts. Still further, any other appropriate means for attaching the string-contacting tip element to the rocker arm housing can be employed as desired. In an exemplary implementation of the tuning apparatus described herein, the string-contacting tip element is realized as a conventional overmold that is securely disposed onto the rocker arm housing using a conventional overmolding process.

Figure 17A:
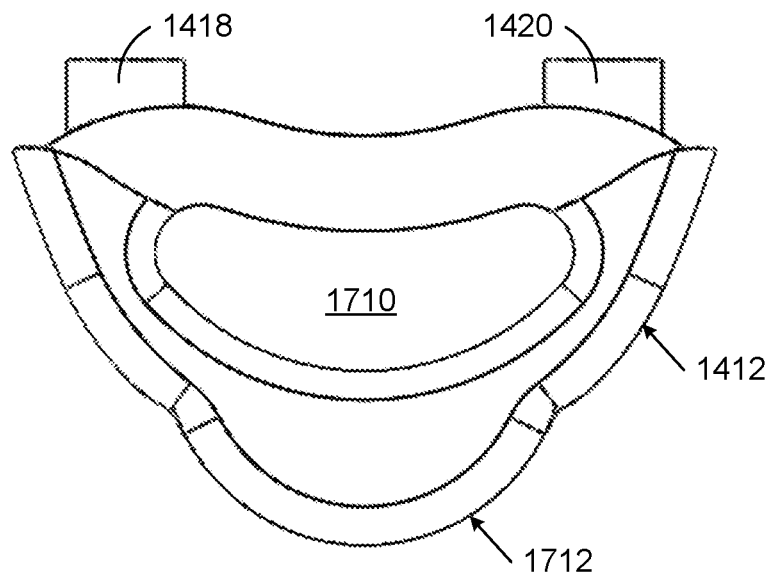
FIGS. 17A-B are diagrams illustrating a plan front view and perspective bottom view, respectively, in simplified form, of a string-contacting tip element of the string-contacting member of FIG. 14.
Figure 17B:
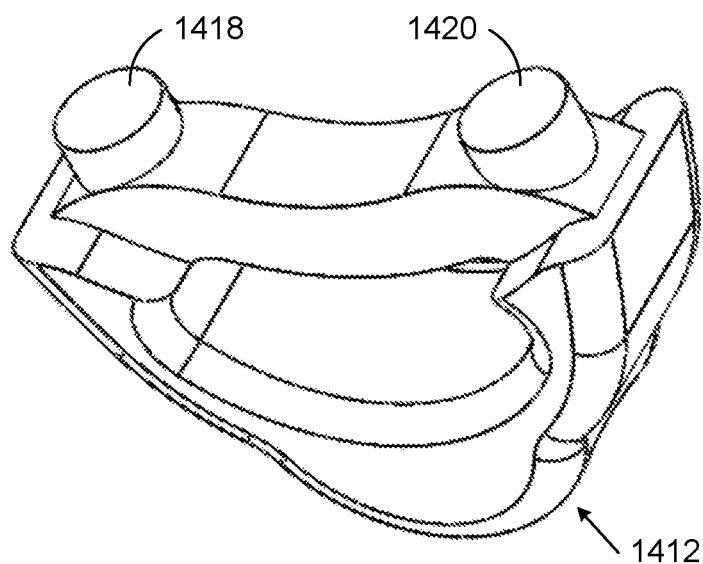

FIGS. 17A-B illustrate two standalone views (plan front and perspective bottom views, respectively) of the string-contacting tip element 1412. The string-contacting tip element 1412 that is securely disposed onto the proximal end of the rocker arm housing 1410 of each of the string-contacting members (e.g., member 203 of FIG. 14) is durable and resiliently flexible, and forms a home string-contacting surface which is pressure-sensitive and is adapted to impinge upon the aforementioned given string or course of strings and adjustably urge this string or course toward the home position on the front surface of the elongated neck (e.g., the position indicated by line H—H in FIG. 1A) whenever the string-contacting member is in the home rotational orientation so as to depress the string or course onto the home fret (e.g., fret 126 in FIG. 1A). By way of example but not limitation, in FIG. 3 string-contacting member 203 is illustrated to be in the home rotational orientation. By way of further example, in FIG. 2 all six of the string-contacting members 202-207 are illustrated to be in the home rotational orientation, where the home string-contacting surface of the string-contacting member of the rocker arm 220 of string-contacting member 202 is impinging upon string 130 and adjustably urging it toward the home position on the front surface of the neck 114, and similarly for the other string-contacting members. Referring again to FIGS. 17A-B, in one implementation, in addition to posts 1418, 1420, the string-contacting tip element 1412 includes an aperture 1710 that passes completely through a middle portion of the string-contacting tip element. The existence of aperture 1710 in the string-contacting tip element 1412 is advantageous in that it at least partially collapses whenever a force is applied to the home string-contacting surface 1712, thereby enhancing the pressure sensitivity of the home string-contacting surface and the ability of this surface to apply an appropriate amount of pressure to a given string or course of strings whenever a given string-contacting member is in the home rotational orientation.

Figure 18A:
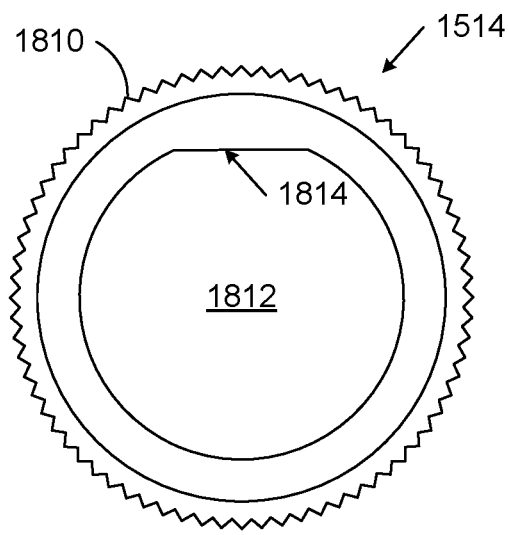
FIGS. 18A-B are diagrams illustrating a plan front view and cross-sectional side view, respectively, in simplified form, of a gear hub of an indexing mechanism of the string-contacting member of FIG. 14.
Figure 18B:
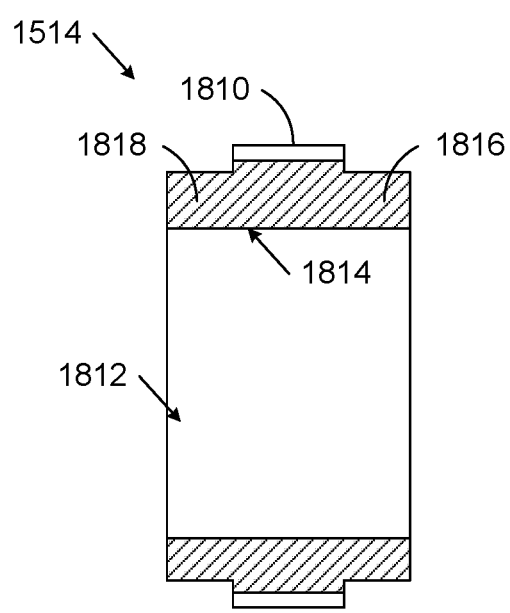
Figure 19A:
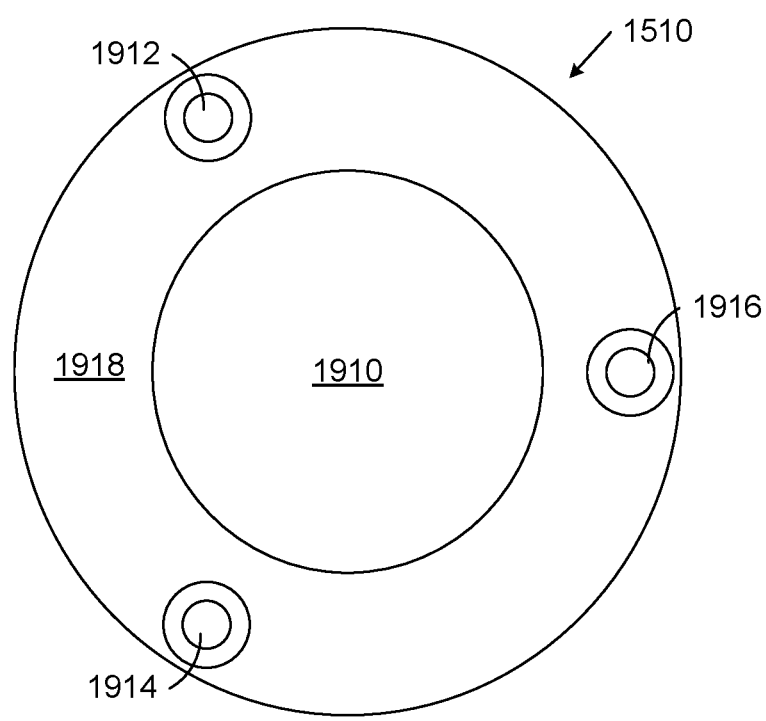
FIGS. 19A-B are diagrams illustrating a plan front view and plan side view, respectively, in simplified form, of a right-side retaining plate of the indexing mechanism of the string-contacting member of FIG. 14.
Figure 19B:
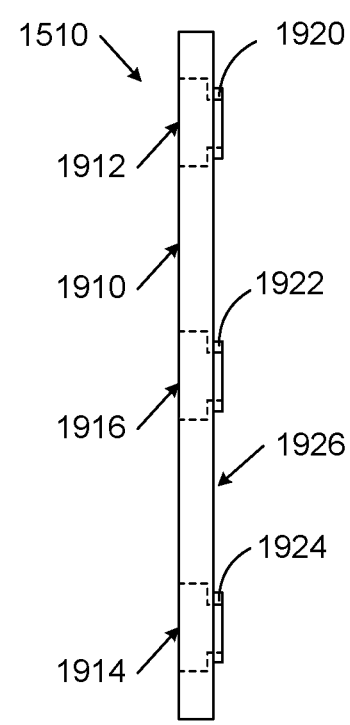
Figure 20A:
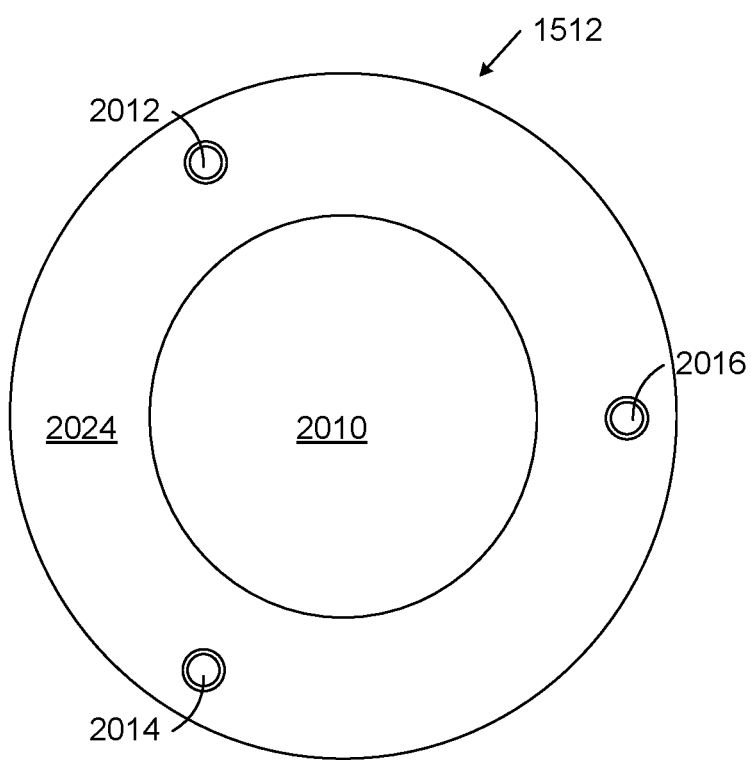
FIGS. 20A-B are diagrams illustrating a plan front view and plan side view, respectively, in simplified form, of a left-side retaining plate of the indexing mechanism of the string-contacting member of FIG. 14.
Figure 20B:
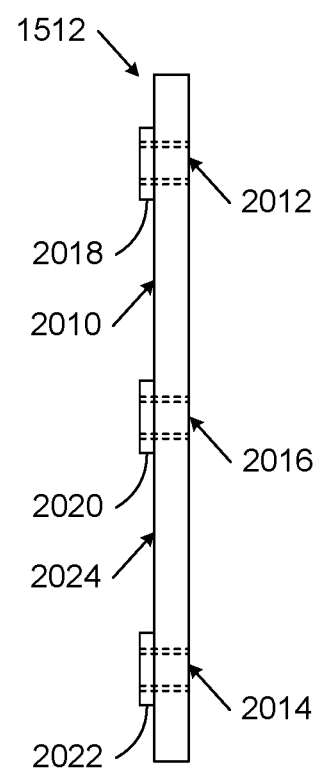

Referring again to FIG. 15, an exemplary implementation of the pieces that make up the indexing mechanism 1414 are shown. The indexing mechanism 1414 includes a right-side retaining plate 1510, a left side retaining plate 1512, a gear hub 1514, and three retaining plate fasteners 1516. FIGS. 18A-B illustrates standalone plan views (plan front and cross-sectional side views), in simplified form, of an exemplary implementation of the gear hub 1514. The gear hub 1514 is disk-shaped with gear teeth 1810 on its peripheral surface and an aperture 1812 with a flat section 1814. In one exemplary implementation, there are 72 gear teeth around the peripheral surface of the gear hub that are equally spaced (i.e., each tooth covers 5 degrees). Each gear tooth in this implementation has a generally triangular cross-sectional shape with a rounded tip and exhibits a 37.6 degree angle. The generally triangular gap between each gear tooth has a rounded bottom and exhibits a 42.6 degree angle. The gear teeth have a depth of about 0.019 inches in the exemplary implementation. The outer diameter of the portion of the gear hub 1514 having gear teeth is slightly less than the diameter of the aperture (1610 of FIGS. 16A-D) in the wider portion of the rocker arm housing 1410. This facilitates the rotation of the gear hub 1514 within the rocker arm housing aperture (1610 of FIGS. 16A-D), as will be described in more detail hereafter. The width of the portion of the gear hub 1514 having gear teeth is slightly less that the width of the rocker arm housing aperture (1610 of FIGS. 16A-D) between the two circular recess 1612, 1614. This also facilitates the rotation of the gear hub 1514 within the rocker arm housing aperture (1610 of FIGS. 16A-D). The diameter of the aperture 1812 through the gear hub 1514 is slightly larger than the diameter of the rocker arm shaft (418 of FIGS. 4A-B and FIGS. 6A-B) so that the gear hub is slidably disposed onto the rocker arm shaft. In addition, tube-shaped projections 1816, 1818 extend outward from each face of the portion of the gear hub 1514 having gear teeth. In one version, the projections extend approximately 0.073 inches from each gear hub face. FIGS. 19A-B illustrates standalone plan views (plan front and plan side views), in simplified form, of an exemplary implementation of the right-side retaining plate 1510. The right-side retaining plate 1510 is disc-shaped with a circular central aperture 1910. Referring also to FIGS. 15 and 16A-D, the diameter of the plate 1510 corresponds to the diameter of the circular recess 1612 in the right-side face of the of the wider portion of the rocker arm housing 1410, and the thickness of the plate 1510 corresponds to the depth of the circular recess 1612. Referring to FIGS. 18A-B and 19A-B, the diameter of the circular central aperture 1910 of the right-side retaining plate 1510 corresponds to the exterior diameter of the tube-shaped projections 1816, 1818 of the gear hub 1514. Referring to FIGS. 16A-D and 19A-B, there are also three stepped fastener through-holes 1912, 1914, 1916 equidistantly located around the periphery of the right-side retaining plate 1510, that match up in no particular order with the location of the three equidistant through-holes 1616 in the rocker arm housing 1410. The stepped fastener through-holes 1912, 1914, 1916 have a larger-diameter head portion starting at the exterior face 1918 of the right-side retaining plate 1510 with a diameter and depth corresponding to the head of the retaining plate fasteners (1516 in FIG. 15) and a smaller-diameter tail portion with a diameter corresponding to the diameter of the shank (e.g., threaded) portion of the retaining plate fasteners. In one implementation, the tail portion of the stepped fastener through-holes 1912, 1914, 1916 extends not only through the right-side retaining plate 1510, but also through an annular projection 1920, 1922, 1924 that surrounds the stepped fastener through-holes and extends away from the interior face 1926 of the right-side retaining plate. The outside diameter of the annular projections 1920, 1922, 1924 corresponds with the diameter of the rocker arm housing through-holes (1616 in FIGS. 16A-D). The annular projections 1920, 1922, 1924 are used to seat the right-side retaining plate 1510 into the rocker arm housing (1410 in FIG. 14). FIGS. 20A-B illustrates standalone views (plan front and plan side views), in simplified form, of an exemplary implementation of the left-side retaining plate 1512. The left-side retaining plate 1512 is disc-shaped with a circular central aperture 2010. Referring also to FIGS. 15 and 16A-D, the diameter of the plate 1512 corresponds to the diameter of the circular recess 1614 in the left-side face of the of the wider portion of the rocker arm housing 1410, and the thickness of the plate 1512 corresponds to the depth of the circular recess 1614. Referring to FIGS. 18A-B and 20A-B, the diameter of the circular central aperture 2010 of the left-side retaining plate 1512 corresponds to the exterior diameter of the tube-shaped projections 1816, 1818 of the gear hub 1514. Referring to FIGS. 16A-D and 20A-B, there are also three fasteners through-holes 2012, 2014, 2016 equidistantly located around the periphery of the right-side retaining plate 1512, that match up in no particular order with the location of the three equidistant through-holes 1616 in the rocker arm housing 1410. In one implementation, the fastener through-holes 2012, 2014, 2016 are threaded and have a diameter that interfaces with threads on the retaining plate fasteners (1516 in FIG. 15). In one implementation, the fastener through-holes 2012, 2014, 2016 extend not only through the left-side retaining plate 1512, but also through an annular projection 2018, 2020, 2022 that surrounds the fastener through-holes 2012, 2014, 2016 and extends away from the interior face 2024 of the left-side retaining plate 1512. The outside diameter of the annular projections 2018, 2020, 2022 corresponds with the diameter of the rocker arm housing through-holes (1616 in FIGS. 16A-D). The annular projections 2018, 2020, 2022 are used to seat the left-side retaining plate 1512 into the rocker arm housing (1410 in FIG. 14).

Referring again to FIGS. 14, 15, 16A-B and 18, when installed in the rocker arm housing 1410, the gear hub 1514 of the indexing mechanism 1414 is positioned within the aperture 1610 in the wider portion of the rocker arm housing, such that the centers of the aperture 1610 of the rocker arm housing and the aperture 1812 of the gear hub 1514 are coplanar and concentric. The gear hub 1514 is held in this position by the right-side and left-side retaining plates 1510, 1512. More particularly, the left and right-side retaining plates 1510, 1512 are placed within the left and right-side circular recesses 1612, 1614 in the rocker arm housing 1410 such that the annular projections 1920, 1922, 1924 (if any) in the right-side plate 1510 are each seated into a different one of the rocker arm housing through-holes 1616, and the annular projections 2018, 2020, 2022 (if any) in the left-side plate 1512 are each seated into a different one of the rocker arm housing through-holes 1616. In this position, the tube-shaped projections 1816, 1818 of the gear hub 1514 extend through the central apertures 1910, 2010 of the right and left-side retaining plates 1510, 1512, respectively. A retaining plate fastener 1516 is installed shank first into each of the stepped through-holes 1912, 1914, 1916 of the right-side retaining plate 1510, through the rocker arm housing through-holes 1616 and then screwed into the threaded through-holes 2012, 2014, 2016 in the left-side retaining plate 1512. This results in the gear hub 1514 being secured within the rocker arm housing's central aperture 1610, but still being able to freely rotate about the aperture's central axis. It is noted that in the foregoing description of the right and left-side retaining plates, the right-side and left-side designation is arbitrary in that these retaining plates can be reversed on the rocker arm housing as desired.

Figure 21A:
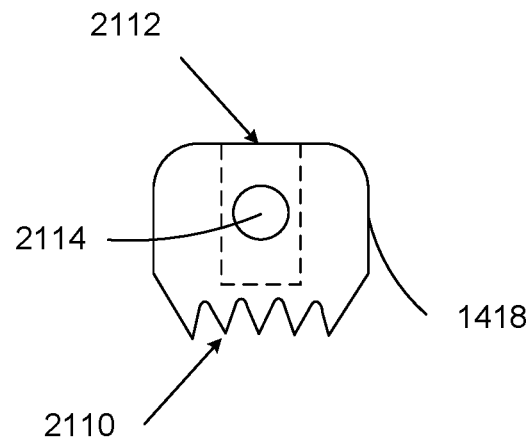
FIGS. 21A-B are diagrams illustrating a plan front view and plan top view, respectively, in simplified form, of a pull pawl of a pull release mechanism of the string-contacting member of FIG. 14.
Figure 21B:
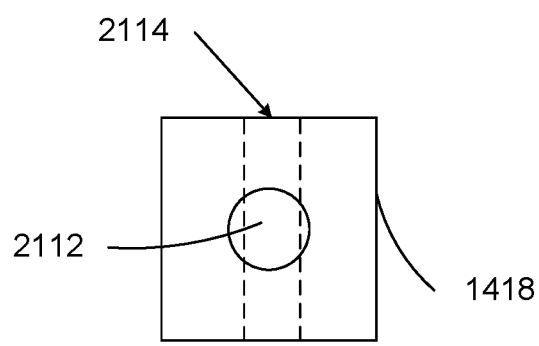
Figure 22:
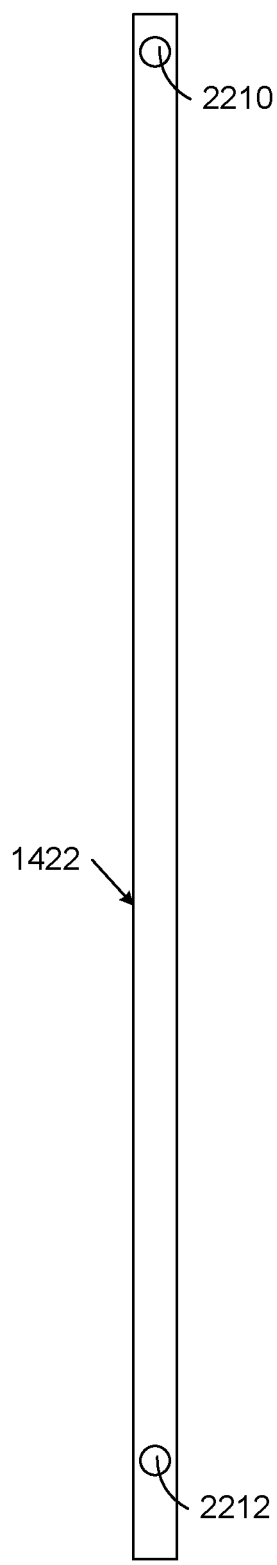
FIG. 22 is a diagram illustrating a standalone plan front view, in simplified form, of a pull shaft of the pull release mechanism of the string-contacting member of FIG. 14.
Figure 23A:
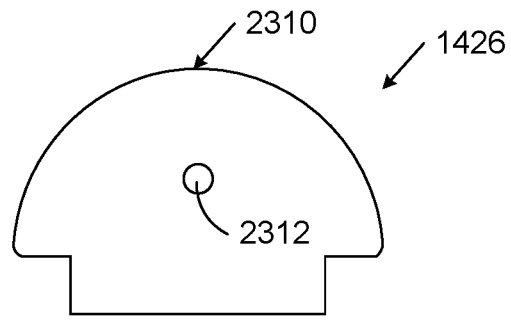
FIGS. 23A-C are diagrams illustrating a plan front view, plan side view and plan bottom view, respectively, in simplified form, of a pull button of the pull release mechanism of the string-contacting member of FIG. 14.
Figure 23B:
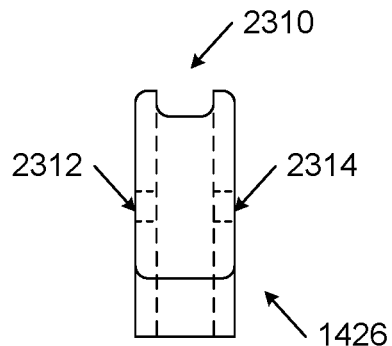
Figure 23C:
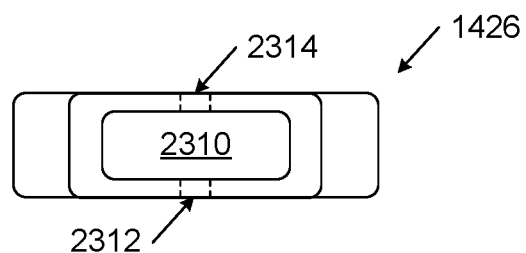

Referring again to FIGS. 14 and 15, the depicted implementation of the pull-type release mechanism 1416 includes a pull pawl 1418, pawl dowel pin 1428, pull shaft 1422, compression spring 1424, pull button 1426 and pull button dowel pin 1432. FIGS. 21A-B illustrate standalone views (plan front and plan top) of the pull pawl 1418. The pull pawl 1418 is generally a rectangular piece with gear teeth 2110 on its distal end that interface with the gear teeth (1810 in FIGS. 18A-B) of the gear hub (1514 in FIGS. 18A-B). In one exemplary implementation the pull pawl has five gear teeth equally spaced 5 degrees apart around the periphery of a concave surface of the distal end of the pull pawl. Each gear tooth in this implementation has a generally triangular cross-sectional shape with a rounded tip and exhibits a 37.6 degree angle. The generally triangular gap between each gear tooth has a rounded bottom and exhibits a 42.6 degree angle. The gear teeth have a depth of about 0.019 inches in the exemplary implementation. The pull pawl 1418 has a width and depth that allow it to fit securely within the notch (1618 in FIGS. 16A-D) located at the distal end of the wider portion of the rocker arm housing (1410 in FIGS. 16A-D), but not so tightly that it cannot readily slide longitudinally within the notch. In addition, the pull pawl 1418 has a length in the longitudinal direction of the rocker arm that when engaged with the (1810 in FIGS. 18A-B) of the gear hub (1514 in FIGS. 18A-B) leaves just enough room within the notch (1618 in FIGS. 16A-D) in the rocker arm housing (1410 in FIGS. 16A-D) to allow the pull pawl to be pulled toward the distal end of the rocker arm a distance that completely disengages it from the gear teeth (1810 in FIGS. 18A-B) of the gear hub (1514 in FIGS. 18A-B) before it bottoms out on the distal end of the notch. The pull pawl 1418 also has a blind hole 2112 oriented in the longitudinal direction of the rocker arm starting from the distal end of the pawl. A through-hole 2114, which is perpendicular to and intersecting the blind hole 2112 extends through the pull pawl 1418. FIG. 22 illustrates a standalone front view of the pull shaft 1422 of FIGS. 14 and 15. In the depicted implementation, the pull shaft 1422 is a cylindrical rod having a first traversing through-hole 2210 near its proximal end and a second traversing through-hole 2212 near its distal end. The proximal end of the pull shaft 1422 is disposed within blind hole (2112 in FIGS. 21A-B) of the pull pawl (1418 in FIGS. 21A-B) and oriented so that its first traversing through-hole 2210 is aligned with the through-hole (2112 in FIGS. 21A-B) of the pull pawl. The pawl dowel pin (1428 in FIGS. 14 and 15) traverses through the pull pawl's through-hole (2114 in FIGS. 21A-B) and the pull shaft's first traversing through-hole 2210. The pawl dowel pin (1428 in FIGS. 14 and 15) has a diameter that creates a jam fit in the pull pawl's through-hole (2114 in FIGS. 21A-B) and the pull shaft's first traversing through-hole 2210. Referring again to FIGS. 14 and 15, a compression spring 1424 surrounds the section of the pull shaft 1422 within the larger proximal section (1626 in FIGS. 16A-D) of the longitudinal through-hole (1620 in FIGS. 16A-D) in the rocker arm housing 1410. The proximal end of the compression spring 1424 abuts the distal end of the pull pawl 1418 and abuts the distal end of the larger proximal section (1626 in FIGS. 16A-D) of the longitudinal through-hole (1620 in FIGS. 16A-D) on the spring's distal end. Thus, the compression spring 1424 is mostly confined within larger proximal section (1626 in FIGS. 16A-D) of the longitudinal through-hole (1620 in FIGS. 16A-D). The compression spring 1424 exerts a sufficient force in the longitudinal direction to ensure the gear teeth (2110 in FIGS. 21A-B) of the pull pawl 1418 remain enmeshed with the teeth (1810 in FIGS. 18A-B) of the gear hub 1514 whenever the string-contacting tip element 1412 or the rocker hammer 227 is engaged with a string of a stringed musical instrument and the release mechanism 1416 is in its disengaged position (as shown in FIG. 14). Still referring to FIGS. 14 and 15, the pull shaft 1422 also extends through the smaller distal section (1628 in FIGS. 16A-D) of the longitudinal through-hole (1620 in FIGS. 16A-D), the first slot-shaped opening (1630 in FIGS. 16A-D) in the rocker arm housing 1410, the second longitudinal through-hole (1622 in FIGS. 16A-D), the second slot-shaped opening (1632 in FIGS. 16A-D) in the rocker arm housing, and the third longitudinal through-hole (1624 in FIGS. 16A-D) into the tab section (1634 in FIGS. 16A-D) of the rocker arm housing. The second traversing through-hole (2212 in FIG. 22) adjacent the distal end of the pull shaft 1422 is aligned with the oval through-hole (1636 in FIGS. 16A-D) of the tab section (1634 in FIGS. 16A-D) of the rocker arm housing 1410. FIGS. 23A-C illustrate standalone views (plan front, plan side and plan bottom views) of the pull button 1426 of FIGS. 14 and 15. In one implementation, the pull button 1426 includes a rectangular cross-sectional, longitudinal through-hole 2310 that is sized to snuggly fit onto the tab section (1634 in FIGS. 16A-D) of the rocker arm housing. There are also a pair of through-holes 2312, 2314 having a common central axis. The through-hole 2312 extends from the "left" exterior side of the pull button 1426 to its longitudinal through-hole 2310. The through-hole 2314 extends from the "right" exterior side of the pull button 1426 to its longitudinal through-hole 2310. The common central axis of the through-holes 2312, 2314 intersects and is perpendicular to the central axis of the pull button's rectangular, longitudinal through-hole 2310. When the pull button 1426 is installed onto the tab section (1634 in FIGS. 16A-D) of the rocker arm housing, the through-holes 2312, 2314 in the button are aligned with the oval through-hole (1636 in FIGS. 16A-D) of the tab section (1634 in FIGS. 16A-D) of the rocker arm housing and the second traversing through-hole (2212 in FIG. 22) adjacent the distal end of the pull shaft (1422 in FIG. 22). The positioning of the second traversing through-hole (2212 in FIG. 22) in the pull shaft (1422 in FIG. 22) and the positioning of the through-holes 2312, 2314 in the pull button 1426 are made so that they align near the proximate end of the oval through-hole (1636 in FIGS. 16A-D) of the tab section (1634 in FIGS. 16A-D) of the rocker arm housing whenever the release mechanism (1416 in FIGS. 14 and 15) is in its engaged position. The pull button dowel pin (1432 in FIGS. 14 and 15) traverses through the pull button through-holes 2312, 2314, the oval through-hole (1636 in FIGS. 16A-D), and the pull shaft's second traversing through-hole (2212 in FIG. 22). The pull button dowel pin (1432 in FIGS. 14 and 15) has a diameter that creates a jam fit in the pull buttons through-holes 2312, 2314 and the pull shaft's second traversing through-hole (2212 in FIG. 22). The longer axis of the oval through-hole (1636 in FIGS. 16A-D) in the tab section (1634 in FIGS. 16A-D) of the rocker arm housing is at least long enough that when the pull button 1426 is pulled away from the distal end of the housing (1410 in FIGS. 14 and 15) it does not contact the distal end of the oval through-hole until the gear teeth (2110 in FIGS. 21A-B) of the pull pawl (1418 in FIGS. 21A-B) have been fully retracted from the teeth (1810 in FIGS. 18A-B) of the gear hub (1514 in FIGS. 18A-B). The shorter axis of the oval through-hole (1636 in FIGS. 16A-D) in the tab section (1634 in FIGS. 16A-D) of the rocker arm housing is wide enough to allow the pull button dowel pin (1432 in FIGS. 14 and 15) to move freely in the longitudinal direction within the oval through-hole.

2.3 String Contacting Member With Push Button Release

Figure 24:
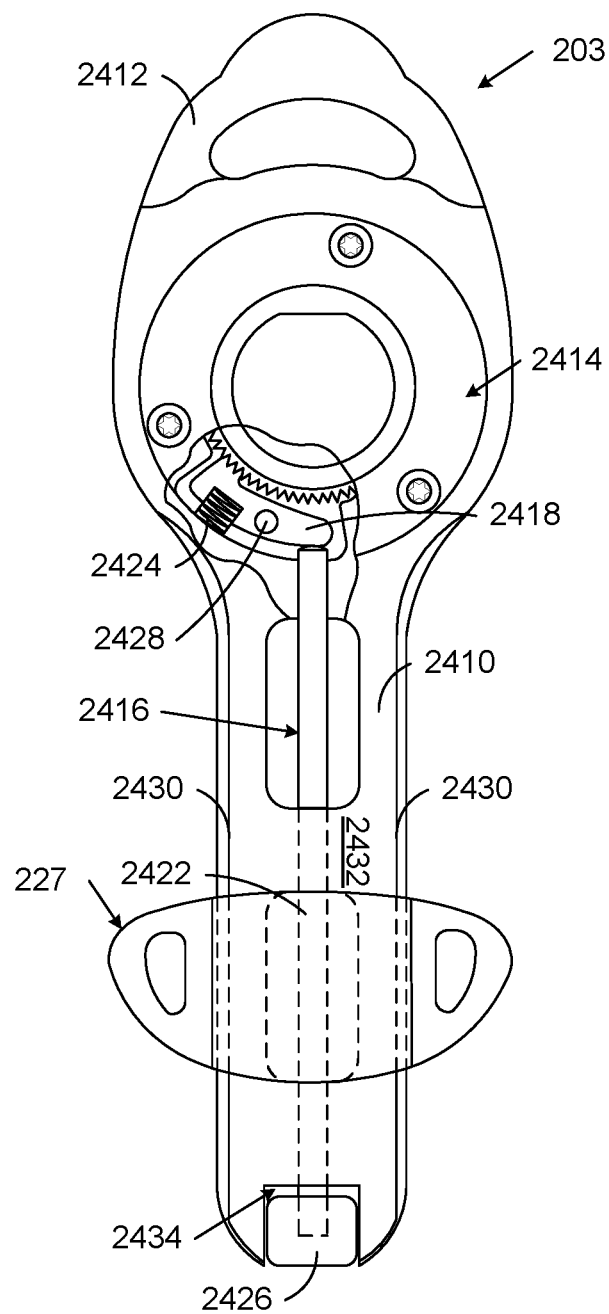
FIG. 24 is a diagram illustrating a standalone plan front view, in simplified form, of a push release implementation of one of the plurality of string-contacting members of FIG. 2.
Figure 25:
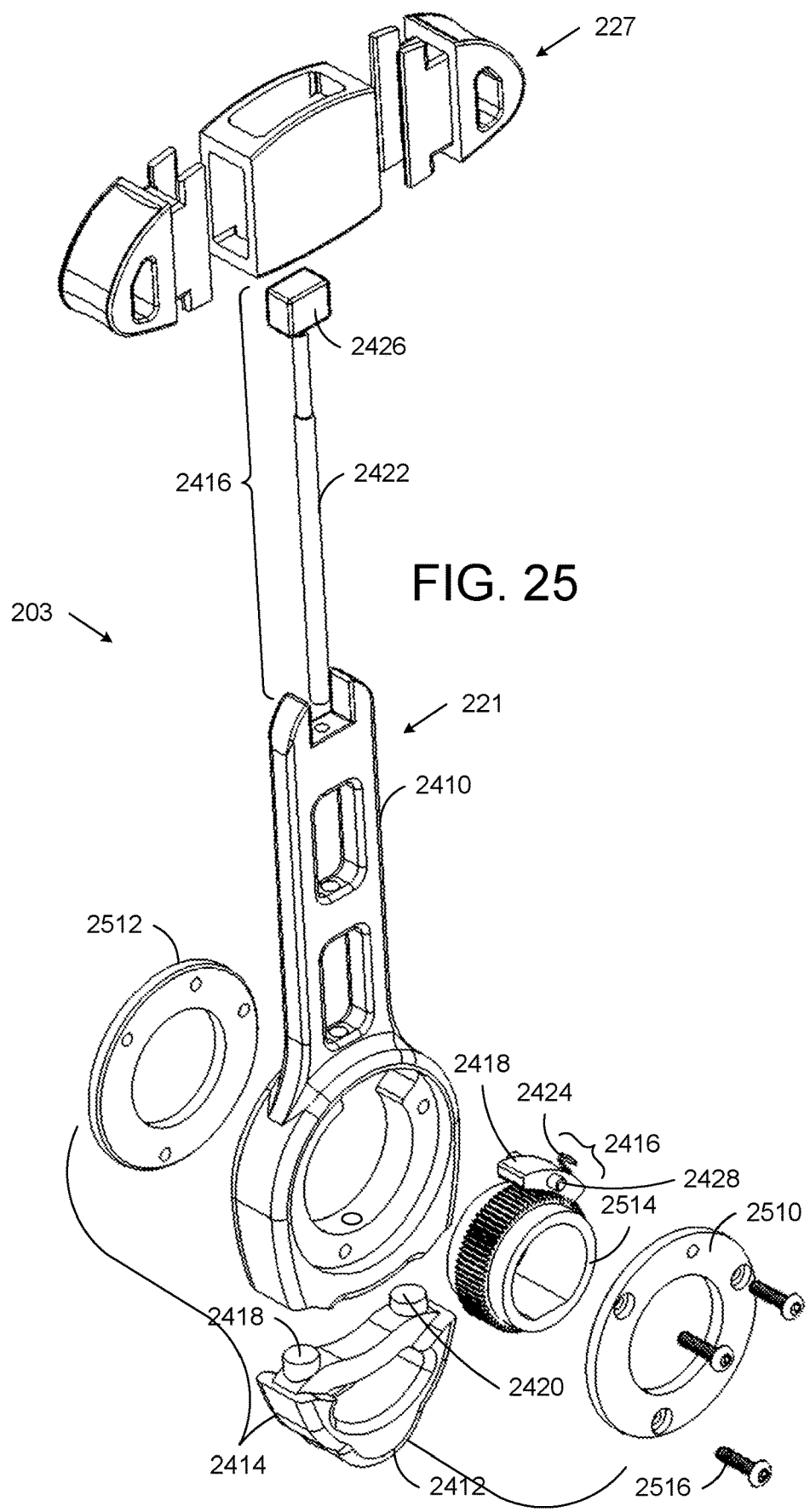
FIG. 25 is a diagram illustrating a standalone partially exploded perspective view, in simplified form, of the push release implementation of the string-contacting member of FIG. 24.

FIG. 24 illustrates a standalone plan front view, in simplified form, of one implementation a string-contacting member (e.g., member 203 of FIG. 2) that employs a push release. FIG. 25 illustrates a partially exploded perspective view, in simplified form, of the string-contacting member 203, where this string-contacting member includes a rocker arm 221 and a rocker hammer 227. With regard to the rocker arm 221, it includes a rocker arm housing 2410 with string-contacting tip element 2412, along with an indexing mechanism 2414 and a release mechanism 2416 that are installed within the rocker arm housing.

FIG. 26A-D illustrates a series of standalone views (plan front view with a partial cut-away section, plan side view with partial cut-away sections, plan top view and plan bottom view, respectively) of an exemplary implementation of the rocker arm housing 2410 of FIGS. 24 and 25. The aperture 2610 in the wider portion of the rocker arm housing 2410 at its proximal end houses the indexing mechanism 2414, as will be described in more detail hereafter. Surrounding the aperture 2610 on both faces of the wider portion of the rocker arm housing 2410 is a circular recess 2612, 2614, and three equidistant through-holes 2616, which accommodate fasteners that hold the indexing mechanism in place once it is installed. Additionally, there is a curved notch 2618 located on the distal end of the wider portion of the rocker arm housing 2410. A series of cylindrical longitudinal through-holes 2620, 2622, 2624 within the elongated section of the rocker arm housing 2410 form a channel through which a push shaft (not shown) of the release mechanism is slidably disposed. The first of these through-holes 2620 opens into a first side the notch 2618 and opens into a first slot-shaped opening 2630 in the rocker arm housing 2410. The second longitudinal through-hole 2622 opens into the slot-shaped opening 2630 on its distal end and opens into the proximal end of a second slot-shaped opening 2632 in the rocker arm housing 2410. The third longitudinal through-hole 2624 opens into the distal end of the second slot-shaped opening 2632 and exits the rocker arm housing 2410 at the proximal end of a rectangular notch 2634 at the distal end of the housing. This third longitudinal through-hole 2624 has a smaller diameter than the first and second longitudinal through-holes 2620, 2622 for reasons that will be described in more detail hereafter. The notch 2634 interfaces with a push button (not shown) that is part of the release mechanism, as will be described in more detail hereafter. There are also a pair of blind holes 2638, 2640, which extend into the proximal end of the rocker arm housing 2410. These blind holes 2638, 2640 interface with corresponding projections of the string-contacting tip element (2412 of FIGS. 24 and 25). More particularly, in the exemplary implementation of the string-contacting tip element 2412 that is illustrated in FIGS. 24 and 25, the end of the string-contacting tip element that is attached to the rocker arm housing 2410 includes two posts 2418, 2420. This number equals the number of post-accepting blind holes 2638, 2640 projecting into the proximal end of the rocker arm housing 2410, and the size, shape, location and longitudinal orientation of these posts 2418, 2420 is adapted to allow them to mate with the post-accepting blind holes 2638, 2640. It is noted that the existence of these blind holes 2638, 2640 and their corresponding posts 2418, 2420 is advantageous since they enhance the strength of the attachment between the rocker arm housing 2410 and the string-contacting tip element 2412. However, an alternate implementation (not shown) of the rocker arm housing and the string-contacting tip element is also possible where the housing includes less or more post-accepting apertures and correspondingly, the string-contacting tip element includes a like number of posts. Still further, any other appropriate means for attaching the string-contacting tip element to the rocker arm housing can be employed as desired. In an exemplary implementation of the tuning apparatus described herein the string-contacting tip element is realized as a conventional overmold that is securely disposed onto the rocker arm housing using a conventional overmolding process. There is also a through-hole 2642 that extends from the proximal end of the rocker arm housing 2410 to the aperture 2610. This through-hole 2642 is used during assembly of the rocker arm 221 to install a push shaft, as will be described in more detail hereafter.

Figure 27A:
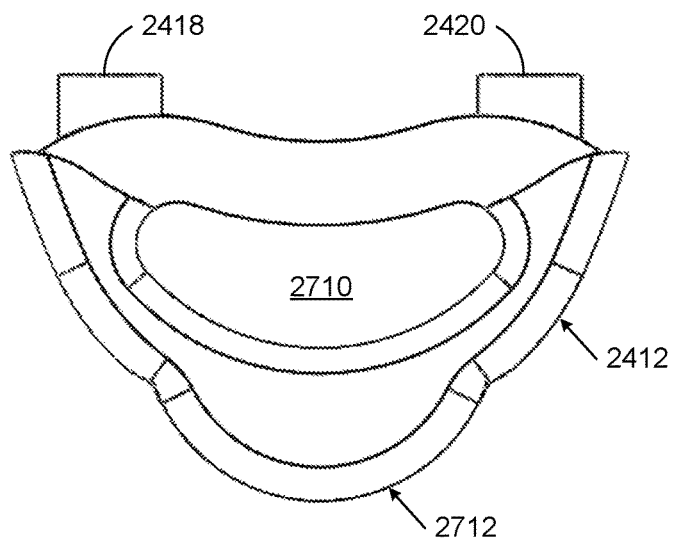
FIGS. 27A-B are diagrams illustrating a plan front view and perspective bottom view, respectively, in simplified form, of a string-contacting tip element of the string-contacting member of FIG. 24.
Figure 27B:
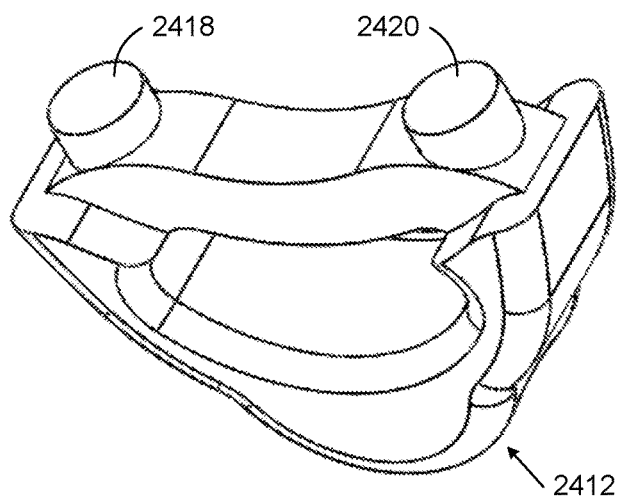

FIGS. 27A-B illustrate two standalone views (plan front and perspective bottom views) of the string-contacting tip element 2412. The string-contacting tip element 2412 that is securely disposed onto the proximal end of the rocker arm housing of each of the string-contacting members (e.g., member 203 of FIG. 24) is durable and resiliently flexible, and forms a home string-contacting surface which is pressure-sensitive and is adapted to impinge upon the aforementioned given string or course of strings and adjustably urge this string or course toward the home position on the front surface 122 of the elongated neck (e.g., the position indicated by line H—H in FIG. 1A) whenever the string-contacting member is in the home rotational orientation so as to depress the string or course onto the home fret (e.g., fret 126 in FIG. 1A). By way of example but not limitation, in FIG. 3 string-contacting member 203 is illustrated to be in the home rotational orientation. By way of further example, in FIG. 2 all six of the string-contacting members 202-207 are illustrated to be in the home rotational orientation, where the home string-contacting surface of the string-contacting member of the rocker arm 220 of string-contacting member 202 is impinging upon string 130 and adjustably urging it toward the home position on the front surface of the neck 114, and similarly for the other string-contacting members. Referring again to FIGS. 27A-B, in one implementation, in addition to posts 2418, 2420, the string-contacting tip element 2412 includes an aperture 2710 that passes completely through a middle portion of the string-contacting tip element. The existence of aperture 2710 in the string-contacting tip element 2412 is advantageous in that it at least partially collapses whenever a force is applied to the home string-contacting surface 2712, thereby enhancing the pressure sensitivity of the home string-contacting surface and the ability of this surface to apply an appropriate amount of pressure to a given string or course of strings whenever a given string-contacting member is in the home rotational orientation.

Figure 28A:
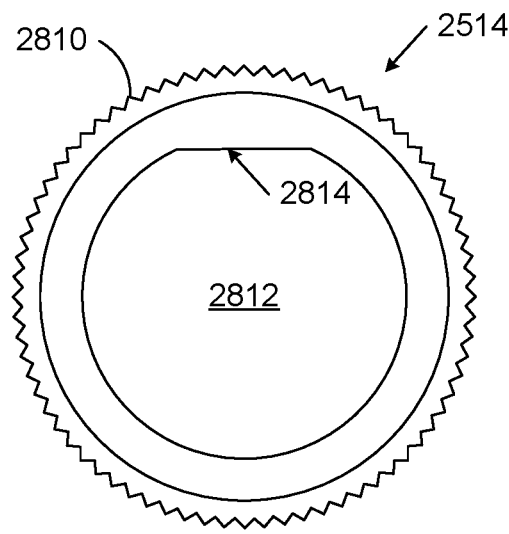
FIGS. 28A-B are diagrams illustrating a plan front view and cross-sectional side view, respectively, in simplified form, of a gear hub of an indexing mechanism of the string-contacting member of FIG. 24.
Figure 28B:
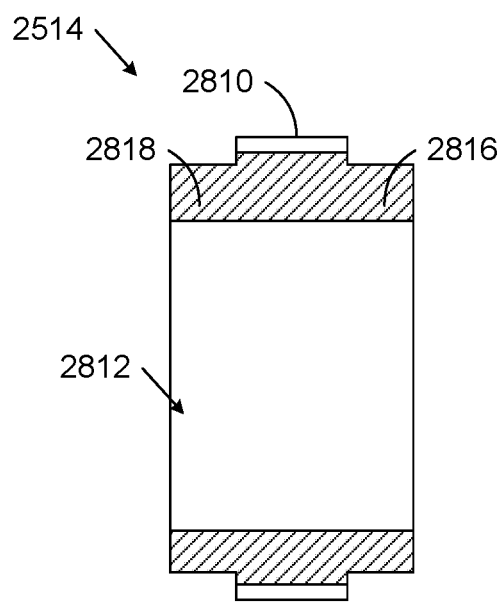
Figure 29A:
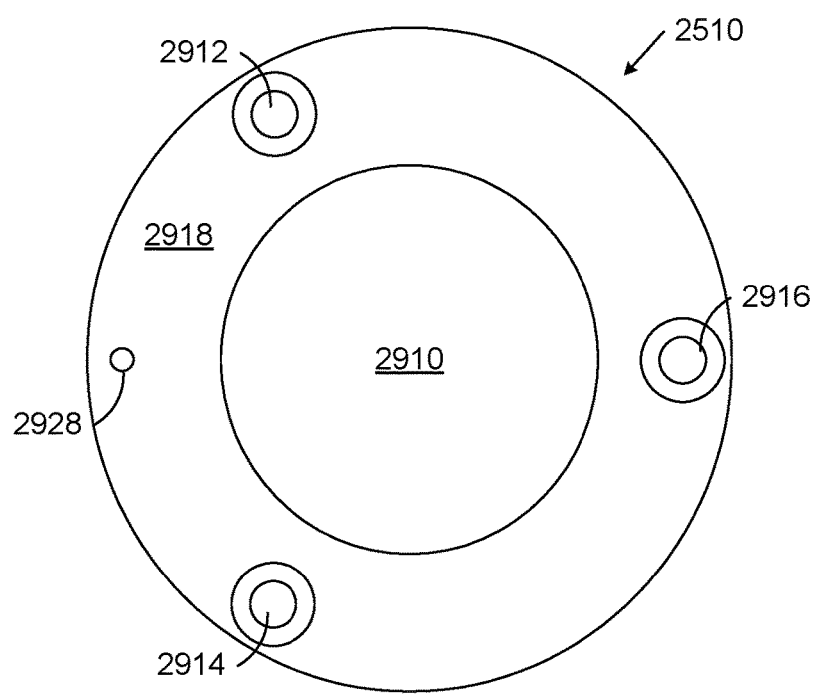
FIGS. 29A-B are diagrams illustrating a plan front view and plan side view, respectively, in simplified form, of a right-side retaining plate of the indexing mechanism of the string-contacting member of FIG. 24.
Figure 29B:
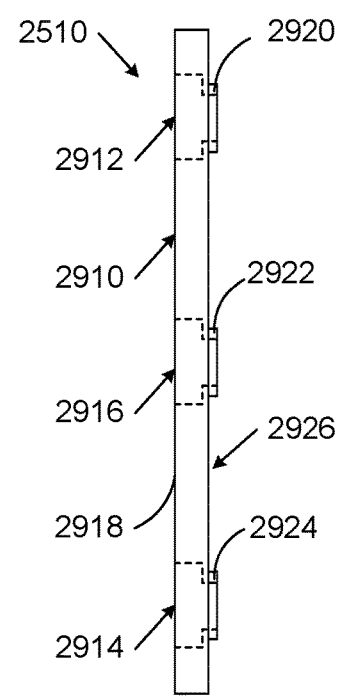
Figure 30A:
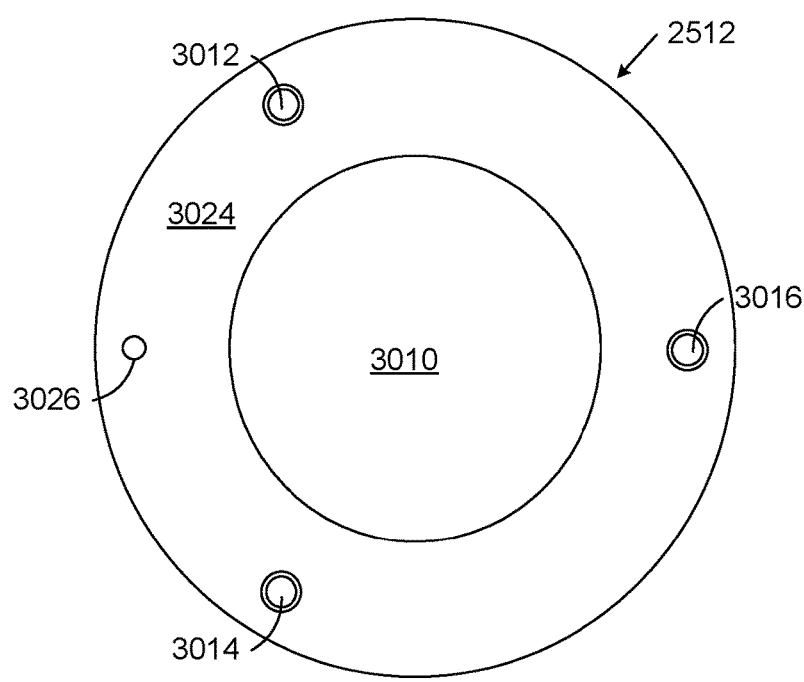
FIGS. 30A-B are diagrams illustrating a plan front view and plan side view, respectively, in simplified form, of a left-side retaining plate of the indexing mechanism of the string-contacting member of FIG. 24.
Figure 30B:
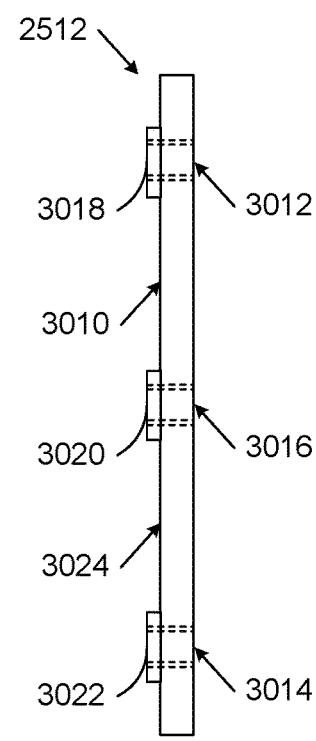

Referring again to FIG. 25, an exemplary implementation of the pieces that make up the indexing mechanism 2414 are shown. The indexing mechanism 2414 includes a right-side retaining plate 2510, a left side retaining plate 2512, a gear hub 2514, and three retaining plate fasteners 2516. FIGS. 28A-B illustrates standalone plan views (plan front and cross-sectional side views), in simplified form, of an exemplary implementation of the gear hub 2514. The gear hub 2514 is disk-shaped with gear teeth 2810 on its peripheral surface and an aperture 2812 with a flat section 2814. In one exemplary implementation, there are 72 gear teeth around the peripheral surface of the gear hub that are equally spaced (i.e., each tooth covers 5 degrees). Each gear tooth in this implementation has a generally triangular cross-sectional shape with a rounded tip and exhibits a 37.6 degree angle. The generally triangular gap between each gear tooth has a rounded bottom and exhibits a 42.6 degree angle. The gear teeth have a depth of about 0.019 inches in the exemplary implementation. The outer diameter of the portion of the gear hub 2514 including gear teeth is slightly less than the diameter of the aperture (2610 of FIGS. 26A-D) in the wider portion of the rocker arm housing. This facilitates the rotation of the gear hub 2514 within the rocker arm housing aperture (2610 of FIGS. 26A-D), as will be described in more detail hereafter. The width of the portion of the gear hub 2514 having teeth is slightly less that the width of the rocker arm housing aperture (2610 of FIGS. 26A-D) between the two circular recess 2612, 2614. This also facilitates the rotation of the gear hub 2514 within the rocker arm housing aperture (2610 of FIGS. 26A-D). The diameter of the aperture 2812 through the gear hub 2514 is slightly larger than the diameter of the rocker arm shaft (418 of FIGS. 4A-B and FIGS. 6A-B) so that the gear hub is slidably disposed onto the rocker arm shaft. In addition, tube-shaped projections 2816, 2818 extend outward from each face of the portion of the gear hub 2514 having teeth. In one version, the projections extend approximately 0.073 inches from each gear hub face. FIGS. 29A-B illustrate standalone plan views (plan front and plan side views), in simplified form, of an exemplary implementation of the right-side retaining plate 2510. The right-side retaining plate 2510 is disc-shaped with a circular central aperture 2910. Referring also to FIGS. 15 and 16A-D, the diameter of the plate 2510 corresponds to the diameter of the circular recess 2612 in the right-side face of the of the wider portion of the rocker arm housing 2410, and the thickness of the plate 2510 corresponds to the depth of the circular recess 2612. Referring to FIGS. 28A-B and 29A-B, the diameter of the circular central aperture 2910 of the right-side retaining plate 2510 corresponds to the exterior diameter of the tube-shaped projections 2816, 2818 of the gear hub 2514. Referring to FIGS. 26A-D and 19A-B, there are also three stepped fastener through-holes 2912, 2914, 2916 equidistantly located around the periphery of the right-side retaining plate 2510, that match up in a particular order with the location of the three equidistant through-holes 2616 in the rocker arm housing 2410. The stepped fastener through-holes 2912, 2914, 2916 have a larger-diameter head portion starting at the exterior face 2918 of the right-side retaining plate 2510 with a diameter and depth corresponding to the head of the retaining plate fasteners (2516 in FIG. 25) and a smaller-diameter tail portion with a diameter corresponding to the diameter of the shank (e.g., threaded) portion of the retaining plate fasteners. In one implementation, the tail portion of the stepped fastener through-holes 2912, 2914, 2916 extends not only through the right-side retaining plate 2510, but also through an annular projection 2920, 2922, 2924 that surrounds the stepped fastener through-holes and extends away from the interior face 2926 of the right-side retaining plate. The outside diameter of the annular projections 2920, 2922, 2924 corresponds with the diameter of the rocker arm housing through-holes (2616 in FIGS. 26A-D). The annular projections 2920, 2922, 2924 are used to seat the right-side retaining plate 2510 into the rocker arm housing (2410 in FIGS. 24). FIGS. 30A-B illustrates standalone plan views (plan front and plan side views), in simplified form, of an exemplary implementation of the left-side retaining plate 2512. The left-side retaining plate 2512 is disc-shaped with a circular central aperture 3010. Referring also to FIGS. 25 and 26A-D, the diameter of the plate 2512 corresponds to the diameter of the circular recess 2614 in the left-side face of the of the wider portion of the rocker arm housing 2410, and the thickness of the plate 2512 corresponds to the depth of the circular recess 2614. Referring to FIGS. 28A-B and 30A-B, the diameter of the circular central aperture 3010 of the left-side retaining plate 2512 corresponds to the exterior diameter of the tube-shaped projections 2816, 2818 of the gear hub 2514. Referring to FIGS. 26A-D and 30A-B, there are also three fastener through-holes 3012, 3014, 3016 equidistantly located around the periphery of the left-side retaining plate 2512, that match up in a particular order with the location of the three equidistant through-holes 2616 in the rocker arm housing 2410. In one implementation, the fastener through-holes 3012, 3014, 3016 are threaded and have a diameter that interfaces with threads on the retaining plate fasteners (2516 in FIG. 25). In one implementation, the fastener through-holes 3012, 3014, 3016 extend not only through the left-side retaining plate 2512, but also through an annular projection 3018, 3020, 3022 that surrounds the fastener through-holes 3012, 3014, 3016 and extends away from the interior face 3024 of the left-side retaining plate 2512. The outside diameter of the annular projections 3018, 3020, 3022 correspond with the diameter of the rocker arm housing through-holes (2616 in FIGS. 26A-D). The annular projections 3018, 3020, 3022 are used to seat the left-side retaining plate 2512 into the rocker arm housing (2410 in FIGS. 24).

Referring again to FIGS. 24-25, 26A-D, 28A-B, 29A-B and 30A-B, when installed in the rocker arm housing 2410, the gear hub 2514 of the indexing mechanism 2414 is positioned within the aperture 2610 in the wider portion of the rocker arm housing, such that the centers of the aperture 2610 of the rocker arm housing and the aperture 2812 of the gear hub 2514 are coplanar and concentric. The gear hub 2514 is held in this position by the right-side and left-side retaining plates 2510, 2512. More particularly, the left and right-side retaining plates 2510, 2512 are placed within the left and right-side circular recesses 2612, 2614 in the rocker arm housing 2410 such that the annular projections 2920, 2922, 2924 (if any) in the right-side plate 2510 are each seated into a different one of the rocker arm housing through-holes 2616, and the annular projections 3018, 3020, 3022 (if any) in the left-side plate 2512 are each seated into a different one of the rocker arm housing through-holes 2616. In this position, the tube-shaped projections 2816, 2818 of the gear hub 2514 extend through the central apertures 2910, 3010 of the right and left-side retaining plates 2510, 2512, respectively. A retaining plate fastener 2516 is installed shank first into each of the stepped through-holes 2012, 2014, 2016 of the right-side retaining plate 2510, through the rocker arm housing through-holes 2616 and then screwed into the threaded through-holes 3012, 3014, 3016 in the left-side retaining plate 2512. This results in the gear hub 2514 being secured within the rocker arm housing's central aperture 2610, but still being able to freely rotate about the aperture's central axis. It is noted that in the foregoing description of the right and left-side retaining plates, the right-side and left-side designation is arbitrary in that these retaining plates can be reversed on the rocker arm housing if desired.

It is noted that the right and left-side retaining plates 2510, 2512 are installed such that an axis through the centers of a through-hole 2928, 3026 in each plate is parallel to the an axis through the centers of the central apertures 2910, 3010 of the right and left-side retaining plates, and such that the through-holes 2928, 3026 each open into the notch 2618 located on the distal end of the wider portion of the rocker arm housing 2410. The purpose of the through-holes 2928, 3026 will be described in more detail hereafter.

Figure 31A:
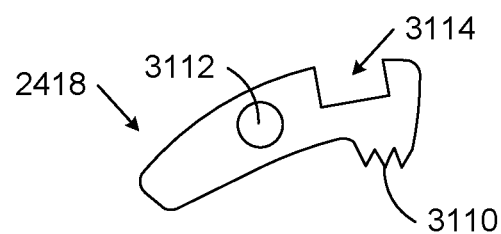
FIGS. 31A-B are diagrams illustrating a plan front view and plan top view, respectively, in simplified form, of a push pawl of a push release mechanism of the string-contacting member of FIG. 24.
Figure 31B:
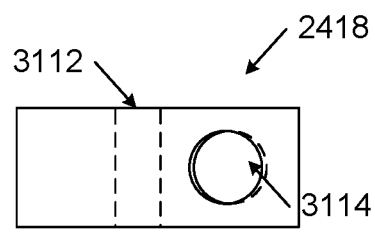
Figure 32:
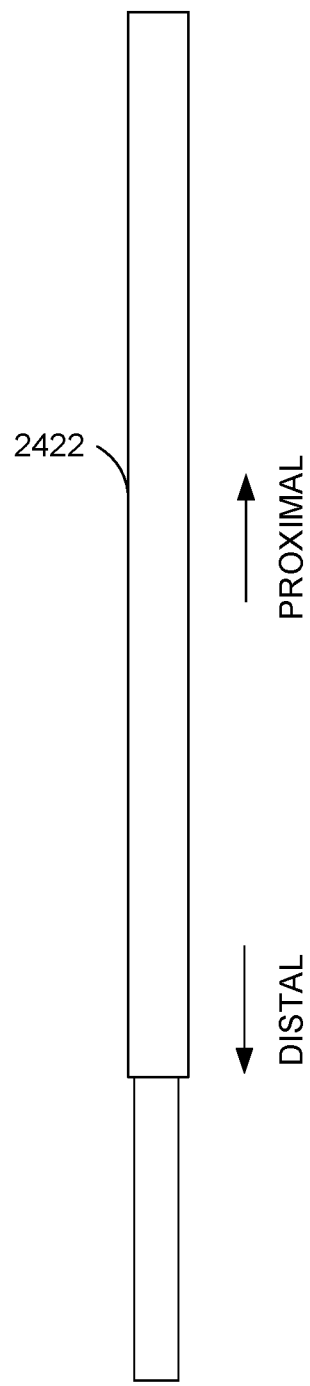
FIG. 32 is a diagram illustrating a standalone plan front view, in simplified form, of a push shaft of the push release mechanism of the string-contacting member of FIG. 24.
Figure 33A:
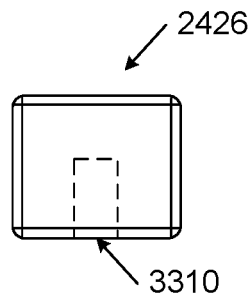
FIGS. 33A-C are diagrams illustrating a plan front view, plan side view and plan bottom view, respectively, in simplified form, of a push button of the push release mechanism of the string-contacting member of FIG. 24.
Figure 33B:
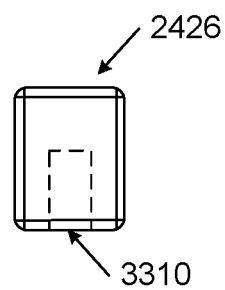
Figure 33C:
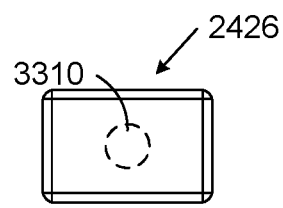

Referring again to FIGS. 24 and 25, the depicted implementation of the push-type release mechanism 2416 includes a push pawl 2418, pawl dowel pin 2428, push shaft 2422, compression spring 2424 and push button 2426. FIGS. 31A-B illustrate standalone views (plan front and plan top views) of the push pawl 2418. The push pawl 2418 is generally an elongated piece with gear teeth 3110 at one end of an inward facing surface that interface with the gear teeth (2810 in FIGS. 28A-B) of the gear hub (2514 in FIGS. 28A-B). In one exemplary implementation the push pawl has three gear teeth equally spaced 5 degrees apart around the periphery of a concave surface of the end of the inward facing surface that interface with the gear teeth (2810 in FIGS. 28A-B) of the gear hub (2514 in FIGS. 28A-B). Each gear tooth in this implementation has a generally triangular cross-sectional shape with a rounded tip and exhibits a 37.6 degree angle. The generally triangular gap between each gear tooth has a rounded bottom and exhibits a 42.6 degree angle. The gear teeth have a depth of about 0.019 inches in the exemplary implementation. The push pawl 2418 has a width that allows it to fit securely within the notch (2618 in FIGS. 26A-D) located on the distal end of the wider portion of the rocker arm housing (2410 in FIGS. 26A-D), but not so tightly that it cannot readily pivot within the notch. The push pawl 2418 also includes a through-hole 3112 in its middle section having an axis through its center which when the push pawl is installed in the notch (2618 in FIGS. 26A-D) located on the distal end of the wider portion of the rocker arm housing (2410 in FIGS. 26A-D) is coincident with the axis through the centers of the through-holes 2928, 3026 of the right and left-side retaining plates 2510, 2512. The pawl dowel pin 2428 is installed through the through-holes 2928, 3026 of the right and left-side retaining plates 2510, 2512 and the push pawl's through-hole 3112. The pawl dowel pin 2428 has a diameter that creates a jam fit in the retaining plate through-holes 2928, 3026. However, the push pawl's through-hole 3112 has a larger diameter which allows the push pawl 2418 to rotate about the pawl dowel pin 2428. Still further, the push pawl 2418 has a blind hole 3114 that extends from its outward facing surface into the body of the push pawl on the end of the push pawl also having the gear teeth 3110. When the push pawl 2418 is installed in the notch (2618 in FIGS. 26A-D) located on the distal end of the wider portion of the rocker arm housing (2410 in FIGS. 26A-D), the compression spring (2424 in FIGS. 24 and 25) is disposed within the blind hole 3114. One end of the compression spring (2424 in FIGS. 24 and 25) abuts the bottom of the blind hole 3114, and the other end extends out of the blind hole 3114 and abuts the wall of the rocker arm housing notch (2618 in FIGS. 26A-D). The compression spring (2424 in FIGS. 24 and 25) is mostly confined within the push pawl's blind hole 3114, and exerts a sufficient force to ensure the gear teeth 3110 of the push pawl 2418 remain enmeshed with the gear teeth (2810 in FIGS. 28A-B) of the gear hub (2514 in FIGS. 28A-B)

whenever the string-contacting tip element (2412 of FIGS. 24 and 25) or the rocker hammer (227 in FIG. 25) is engaged with a string of a stringed musical instrument and the release mechanism (2416 in FIGS. 24 and 25) is in its disengaged position (as shown in FIG. 24). FIG. 32 illustrates a standalone plan front view of the push shaft 2422 seen in FIGS. 24 and 25. In the depicted implementation, the push shaft 2422 is a cylindrical rod having a stepped configuration. More particularly, a distal portion of the push shaft 2422 has a smaller diameter than its proximal portion. This smaller diameter allows the distal portion of the push shaft 2422 to slide longitudinally in the smaller diameter longitudinal through-hole 2624 in the rocker arm housing 2410. However, the larger diameter of the proximal portion of the push shaft 2422 is too large to enter the smaller diameter longitudinal through-hole 2624 in the rocker arm housing 2410, thus preventing the push shaft from being pulled out of the rocker arm housing in the distal direction. As such, the push shaft 2422 is installed during assembly via the through-hole 2642 at the proximal end of the rocker arm housing 2410. In addition, in one implementation the tip of the push shaft 2422 on its proximal end is rounded. As best seen in FIG. 24, when installed in the in the rocker arm housing 2410, the rounded tip of the push shaft 2422 is in contact with the outward facing surface of the push pawl 2418 on the end of the push pawl opposite that having the gear teeth (3110 in FIGS. 31A-B). As such, the rounded tip of the push shaft 2422 contacts the push pawl 2418 on one side of the pawl dowel pin 2428, and the compression spring 2424 and gear teeth (3110 in FIGS. 31A-B) are on the other side of the pawl dowel pin. Thus, when the push pawl 2418 is pushed by the push shaft 2422, the push pawl pivots on the pawl dowel pin 2428, the force exerted by the compression spring 2424 keeping the push pawl gear teeth (3110 in FIGS. 31A-B) enmeshed with the gear teeth (2810 in FIGS. 28A-B) of the gear hub (2514 in FIGS. 28A-B) is overcome, the spring is compressed, and the push pawl gear teeth are disengaged from the gear teeth of the gear hub. The push shaft 2422 extends away from its rounded tip through the longitudinal through-hole (2620 in FIGS. 26A-D), the first slot-shaped opening (2630 in FIGS. 26A-D) in the rocker arm housing (2410 in FIGS. 26A-D), the second longitudinal through-hole (2622 in FIGS. 26A-D), the second slot-shaped opening (2632 in FIGS. 26A-D) in the rocker arm housing, the third longitudinal through-hole (2624 in FIGS. 26A-D), and partially into the rectangular notch (2634 in FIGS. 26A-D) at the distal end of the housing where it is connected to the push button (2426 in FIGS. 24 and 25). FIGS. 33A-C illustrate standalone views (plan front, plan side and plan bottom views) of the push button 2426 as seen in FIGS. 24 and 25. In one implementation, the push button 2426 is generally a rectangular cuboid in shape with dimensions that allow it to slidably fit into the rectangular notch (2634 in FIGS. 26A-D) at the distal end of the rocker arm housing (2410 in FIGS. 26A-D). The push button 2426 has a blind hole 3310 that extends from the center of the proximal end of the push button into the body of the button. The blind hole 3310 has a diameter that allows it to be securely press fit onto the distal end of the push shaft (2422 in FIG. 32). When press fit onto the push shaft, in one implementation, the push button's distal end is even with the distal end of the rocker arm housing for aesthetic purposes. However, when the push button 2426 is press fit onto the push shaft (2422 in FIG. 32) and the release mechanism (2414 in FIGS. 24 and 25) is in its disengaged position (i.e., when the gear teeth of the push pawl are fully enmeshed with the gear teeth of the gear hub), a functional gap (2434 in FIG. 24) exists between the proximal end of the push button and the proximal end of the rectangular notch (2634 in FIGS. 26A-D) at the distal end of the rocker arm housing (2410 in FIGS. 26A-D). The width of the gap (2434 in FIG. 24) in the longitudinal direction of the rocker arm is made to be sufficient to cause the push pawl gear teeth (3110 in FIGS. 31A-B) to full disengage from the gear teeth (2810 in FIGS. 28A-B) of the gear hub (2514 in FIGS. 28A-B) when the push button 2426 is fully depressed into the rectangular notch (2634 in FIGS. 26A-D) at the distal end of the rocker arm housing (2410 in FIGS. 26A-D). It is noted that the size of the rocker arm housing rectangular notch (2634 in FIGS. 26A-D) and the push pawl (2418 in FIGS. 24 and 25) is made so that the inward facing surface of the push pawl on the other side of the dowel pin (2428 in FIGS. 24 and 25) from the push pawl gear teeth (3110 in FIGS. 31A-B) does not impinge on the gear teeth (2810 in FIGS. 28A-B) of the gear hub (2514 in FIGS. 28A-B) and the outward facing surface of the push pawl on the other side of the dowel pin from location where the push shaft (2422 in FIGS. 24 and 25) contacts the push pawl does not impinge on the proximal surface of the rocker arm housing rectangular notch, when the push button is fully depressed.

2.4 Rocker Hammer

Figure 34A:
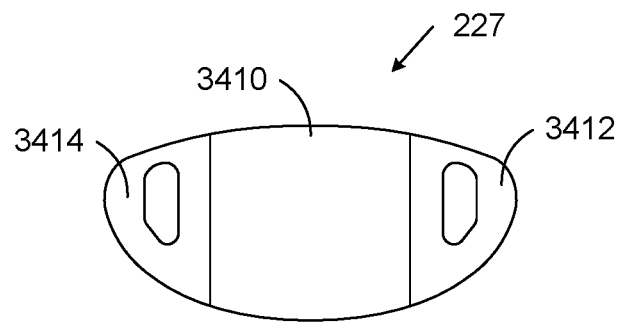
FIGS. 34A-B are diagrams illustrating a plan front view and plan top view, respectively, in simplified form, of a rocker hammer of the string-contacting member of FIGS. 14 and 24.
Figure 34B:
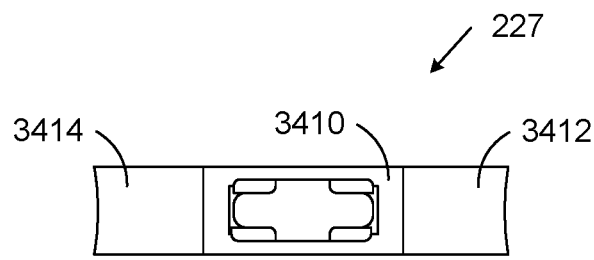
Figure 35A:
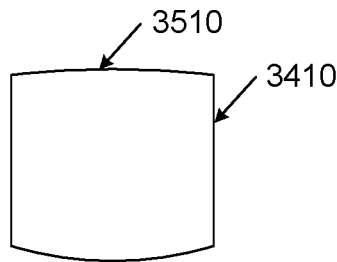
FIGS. 35A-C are diagrams illustrating a plan front view, plan side view and plan top view, respectively, in simplified form, of a hammer frame of the rocker hammer of FIGS. 34A-B.
Figure 35B:
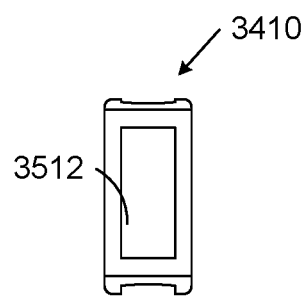
Figure 35C:
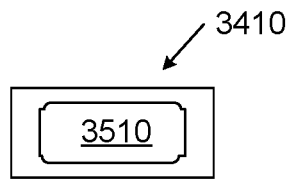

FIGS. 34A-B illustrates standalone plan views (plan front and plan top), in simplified form, of an exemplary implementation of the rocker hammer 227 of FIGS. 15 and 25, where this implementation of the rocker hammer includes a hammer frame 3410 and two string-contacting hammer elements 3412, 3414 that are securely disposed onto the hammer frame. FIGS. 35A-C illustrate standalone views (plan front, plan side and plan top views) of the hammer frame 3410 of FIG. 34. The hammer frame 3410 has a longitudinal channel 3510 with a generally rectangular cross-section. This channel 3510 interfaces with the distal portion of the rocker arm (221 in FIGS. 15 and 25), as will be described in more detail hereafter. The hammer frame also has a lateral channel 3512 with a generally rectangular cross-section. This lateral channel 3512 intersects the longitudinal channel 3510 at a right angle and interfaces with two hammer elements as will be described in more detail next.

FIGS. 36A-C illustrate standalone views (perspective back, perspective front and plan side views) of one implementation of the hammer elements 3412, 3414 of FIG. 34A-B. More particularly, in the exemplary implementation, each of the hammer elements 3412, 3414 has two T-shaped retaining tabs 3610, 3612 extending from their proximate side. A post section 3614 of each tab 3610, 3612 is made long enough so that when the hammer element (3412, 3414 in FIG. 34A-B) is installed in the lateral channel (3512 in FIGS. 35A-C) of the hammer frame (3410 in FIGS. 34A-B), it traverses the distance from the outside edge of the hammer frame to the frame's longitudinal channel (3510 in FIGS. 35A-C). As such, when the tabs 3610, 3612 are inserted into the lateral channel (3512 in FIGS. 35A-C) of the hammer frame (3410 in FIG. 34A-B), the crossbeam section 3616 of each tab 3610, 3612 resides completely within the hammer frame's longitudinal channel (3510 in FIGS. 35A-C). The length of each crossbeam section 3616 is made so that the crossbeams extend within the hammer frame's longitudinal channel (3510 in FIGS. 35A-C) from the proximal end of the channel to the distal end of the channel. Referring again to FIGS. 34A-B, a separate hammer element 3412 is installed on each side of the hammer frame 3410 in the foregoing manner. This configuration will retain the hammer element 3412 in position on the hammer frame 3410 so that the element extends outward from the frame. However, any other appropriate means for attaching the hammer elements to the hammer frame can be employed as well. In an exemplary implementation of the rocker hammer described herein the string-contacting hammer element is realized as a conventional overmold that is securely disposed onto the hammer frame using a conventional overmolding process. Referring again to FIGS. 36A-C, the hammer element 3412, 3414 is durable and resiliently flexible, and forms a string-contacting surface 3618 which is pressure-sensitive and is adapted to impinge upon the aforementioned given string or course of strings and adjustably urge this string or course toward the front surface of the elongated neck of a stringed musical instrument whenever the string-contacting member is in the home−1 or home+1 rotational orientation. By way of example but not limitation, in FIG. 3 string-contacting member 202 is illustrated to be in the home−1 rotational orientation and string-contacting member 204 is illustrated to be in the home+1 rotational orientation. Referring once again to FIGS. 36A-C, in one implementation, the each string-contacting hammer element 3412, 3414 includes an aperture 3620 that passes completely through a middle portion of the element. The existence of aperture 3620 in the string-contacting hammer element 3412, 3414 is advantageous in that it at least partially collapses whenever a force is applied to the string-contacting surface 3618, thereby enhancing the pressure sensitivity of the string-contacting surface and the ability of this surface to apply an appropriate amount of pressure to a given string or course of strings whenever a given string-contacting member is in the home−1 or home+1 rotational orientation.

As best seen in FIG. 14 or 24, the rocker hammer 227 is installed on the distal portion of the rocker arm 203. The distal portion of the rocker arm housing 1410 or 2410 has a peripheral rim 1430 or 2430 on each side and thinner inner portion 1434 or 2432 in between the rims. Referring also to FIGS. 36A-C, an inside surface 3622 of each crossbeam section 3616 of the tabs 3610, 3612 rides on one of the peripheral rims 1430 or 2430 of the rocker arm housing 1410 or 2410. The durable and resiliently flexible nature of the hammer elements 3412, 3414 results in the crossbeam section 3616 of the tabs 3610, 3612 slidably gripping the peripheral rims 1430 or 2430 of the rocker arm housing 1410 or 2410 in a manner that maintains the current longitudinal position of the rocker hammer 227 on the distal portion of the rocker arm housing, but also allows the user to use one or more fingers to change/adjust the longitudinal position of the rocker hammer on the distal portion of the rocker arm housing at will. This ability of the user to alter the longitudinal position of the rocker hammer 227 on the distal portion of the rocker arm housing 1410 or 2410 allows the user to individually adjust (e.g., fine-tune) the home−1 or home+1 rotational orientation for each of the string-contacting members to be either closer to or farther away from the home-fret (126 in FIG. 1A). The user's ability to make such an adjustment on each of the string-contacting members is advantageous for various reasons including the following. It allows the user to easily and quickly adapt the tuning apparatus to accommodate stringed musical instruments having a wide variety of actions and string gauges. It also allows the user to easily and quickly adapt the tuning apparatus to accommodate variations in the spacing between adjacent frets, and variations in the dimensions of each of the frets, that can exist on a given instrument and between different instruments. It also allows the user to easily and quickly change the intonation of a given string or course of strings in both the home−1 and home+1 orientations, regardless of where the tuning apparatus is located on the elongated neck of the instrument.

2.5 Assembly

Referring to the perspective assembled view of the tuning apparatus 200 in FIG. 37, the plan views of the cam clamp assembly 218 in FIGS. 4A-B, and the perspective exploded view of the tuning apparatus 200 in FIG. 38, one exemplary implementation of the assembly of the tuning apparatus will now be described. The cam clamp shaft 414 is inserted into the two-pronged fork-like structure of the cam handle 412 such that it extends through each of the circular apertures (716, 718 in FIGS. 7A-B). The fine-threaded proximal portion (510 in FIG. 5) of the cam clamp screw shaft 410 is threaded into and through the fine-threaded through-hole (810 in FIGS. 8A-C) of the cam clamp shaft 414 until the fine-threaded proximal portion of cam clamp screw shaft is contained within the fine-threaded through-hole of the cam clamp shaft and the knurled proximal end (512 of FIG. 5) of the cam clamp screw shaft extends out of the cam clamp shaft. Once assembled as described above, the cam handle 412, cam clamp shaft 414 and cam clamp screw shaft 410 are held together as a single unit. The cam clamp seat 416 is installed onto the middle longitudinal section (514 in FIG. 5) of the cam clamp screw shaft 410 such that the middle longitudinal section extends through the through-hole (910 in FIGS. 9A-B) of the cam clamp seat and the curved surface of the cam clamp seat's cutout (912 in FIGS. 9A-B) interfaces with the peripheral surface of the prongs (712, 714 in FIGS. 7A-B) of the cam handle 412. The optional cam clamp washer (not shown) can also be installed onto the middle longitudinal section (514 in FIG. 5) of the cam clamp screw shaft 410 such that the middle longitudinal section extends through the central hole (1010 in FIGS. 10A-B) of the washer. The flat distal-facing side of the cam clamp seat 416 would but against the proximal-facing side of the cam clamp washer. The proximal portion (612 in FIG. 6) of the rocker arm shaft 418 is screwed onto the threaded distal end (516 in FIG. 5) of the cam clamp screw shaft 410 via the rocker arm shaft's longitudinal threaded hole (424 in FIGS. 4A-B). In one implementation, when the rocker arm shaft 418 is fully threaded onto the cam clamp screw shaft 410, the proximal end of the rocker arm shaft will butt against the distal end of the middle longitudinal section (514 in FIG. 5) of the cam clamp screw shaft 410. The proximal clamp 216 is installed onto the rocker arm shaft 418 via its through-hole (1110 in FIGS. 11A-B), such that the longitudinal flattened area (610 in FIG. 6) of the shaft aligns with the longitudinal flattened area (1112 in FIGS. 11A-B) of the proximal clamp, and the proximal end of the proximal clamp 216 butts against the distal-facing side of the cam clamp washer (if included). In the foregoing configuration, most or all of the length of the through-hole (1110 in FIGS. 11A-B) of the proximal clamp 216 will be filled with the rocker arm shaft 418. The flattened area (1112 in FIGS. 11A-B) of the proximal clamp's through-hole (1110 in FIGS. 11A-B) and the flattened area (610 in FIG. 6) of the rocker arm shaft 418 interface to allow the proximal clamp 216 to slide on the rocker arm shaft 418 in the longitudinal direction, but not rotate independently of each other so that radial alignment is maintained.

Figure 37:
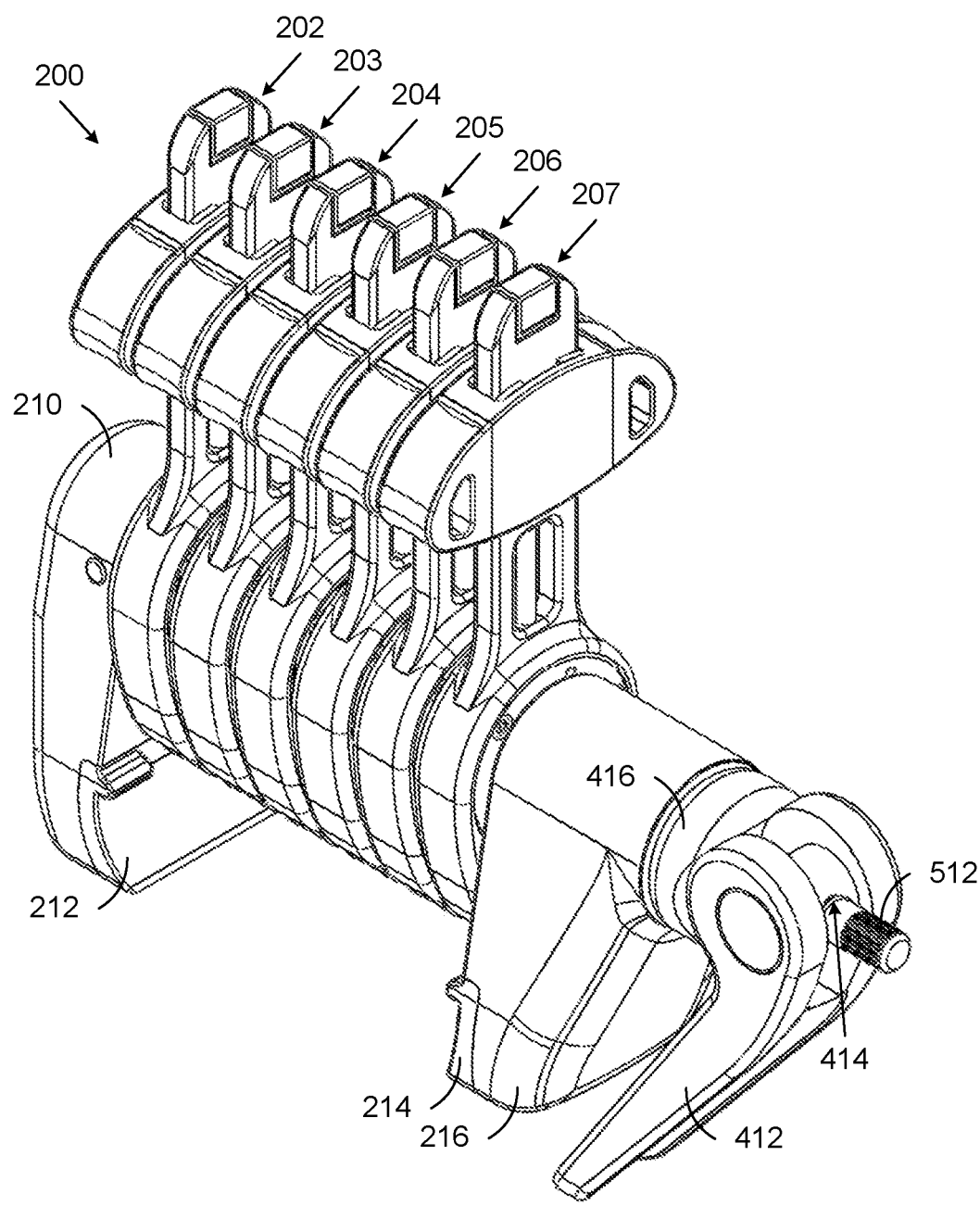
FIG. 37 is a diagram illustrating a perspective assembled view, in simplified form, of one implementation of the tuning apparatus that includes a neck gripping assembly and a plurality of string-contacting members, where each of the string-contacting members is in a home rotational orientation.
Figure 38:
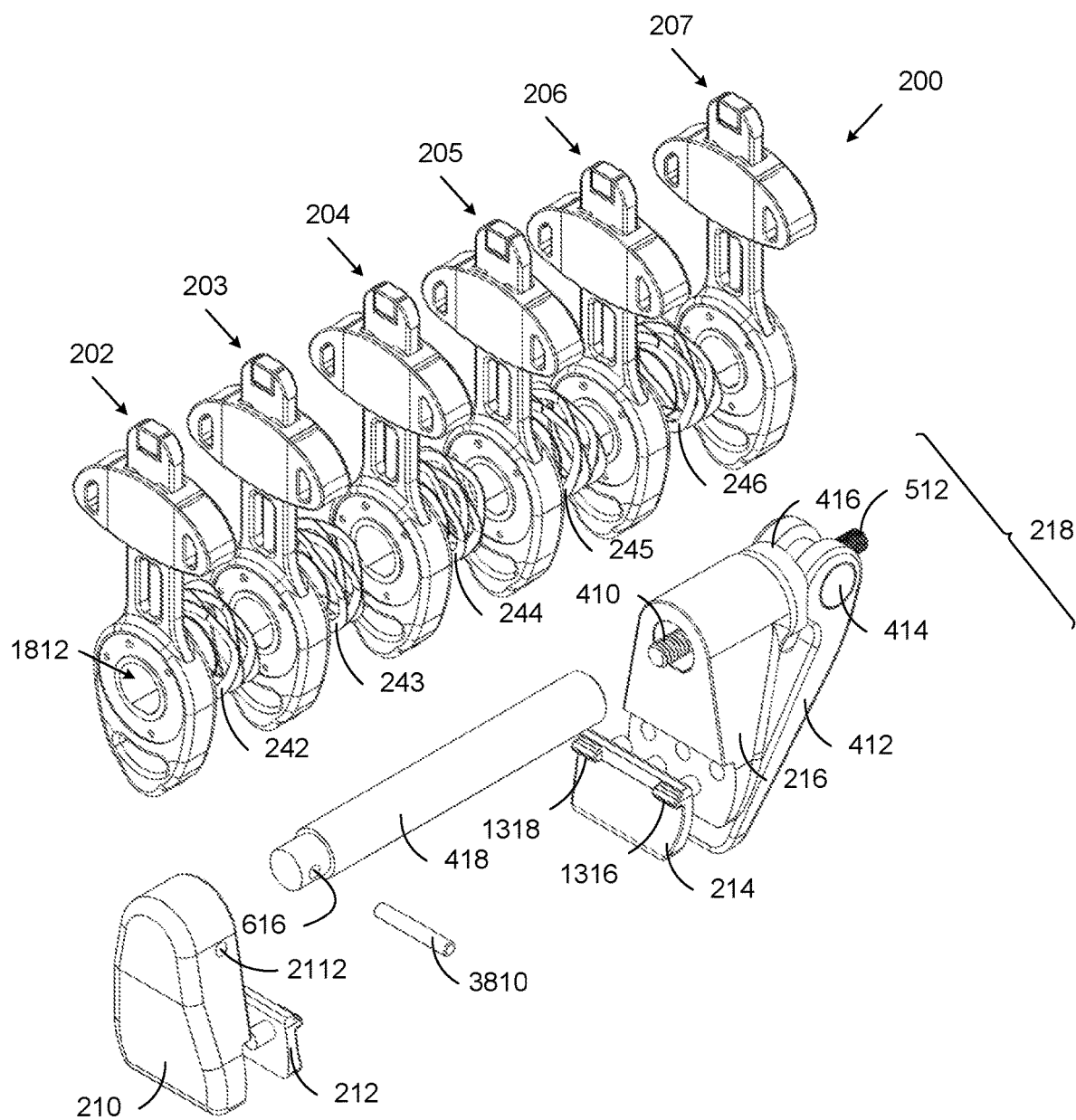
FIG. 38 is a diagram illustrating a perspective partially exploded view, in simplified form, of the tuning apparatus of FIG. 37.

Referring again to the perspective assembled view of the tuning apparatus 200 in FIG. 37, the plan views of the cam clamp assembly 218 in FIGS. 4A-B, and the perspective exploded view of the tuning apparatus 200 in FIG. 38, in one exemplary implementation of the assembly of the tuning apparatus, the string-contacting members 202-207 (six in this example) are each assembled onto the proximal portion (612 in FIG. 6) of the rocker arm shaft 418 such that the longitudinal flattened portion (610 in FIG. 6) of the proximal end of the rocker arm shaft interfaces with the flat section (1814 in FIGS. 18A-B) of the gear hub's aperture 1812 in each of the string-contacting members. In one implementation, interspersed between the distal side of the proximal clamp 216 and the proximal-most string-contacting member 207, as well as between each of the string-contacting members 202-207, and between the distal-most string-contacting members 202 and the distal clamp 210, wave springs 212, 214 and 242-246 are installed on the rocker arm shaft 418. The purpose and operation of these wave springs 212, 214 and 242-246 will be described in more detail hereafter. The distal clamp 210 is installed onto the distal portion (614 in FIG. 6) of the rocker arm shaft 48 via its blind hole (1210 in FIGS. 12A-B), such that the through-hole 616 of the rocker arm shaft 418 aligns with the through-hole 1212 of the distal clamp. The clamp pin 3810 is then press fit into these through-holes 616, 1212 such that it extends from one side of the distal clamp 210, through the rocker arm shaft 418, to the other side of the distal clamp. This ensures that the distal clamp 210 and rocker arm shaft 418 cannot rotate independently of each other, thus maintaining radial alignment. It is also noted that the location and orientation of the blind hole (1210 in FIGS. 12A-B) and through-hole 1212 of the distal clamp 210 is such that the outward facing sides of the grip inserts 212, 214 of the distal and proximal clamps 210, 216 face each other and are in rotational alignment about the rocker arm shaft 418.

2.6 String-Contacting Member Spacing

Referring again to FIGS. 2, 37 and 38, and as will now be described in more detail, the string-contacting member spacing of the tuning apparatus 200 is adapted to slidably adjust the location of the string-contacting members 202-207 as a group (more particularly, slidably adjust the location of the string-contacting members 202-207 as a group along the longitudinal axis of the rocker arm shaft 418) so as to substantially center the plane of rotation of each of the string-contacting members (e.g., member 203) over a different string (e.g., string 131) or course of strings, and thus center the string-contacting member's pressure-sensitive home string-contacting surface (1712 in FIGS. 17A-B), home+1 string-contacting surface (3618 in FIGS. 36A-C), and home−1 string-contacting surface (3618 in FIGS. 36A-C) over the different string/course. The string-contacting member spacing adjustment mechanism accomplishes the foregoing task by automatically maintaining a substantially equal spacing between each different adjacent pair of string-contacting members 202-207, and optionally between the distal and proximal clamps 210, 216 and string-contacting members 202, 207. More particularly, the string-contacting member spacing adjustment mechanism includes an optional distal wave spring (not shown), an optional proximal wave spring (not shown), and a number of non-optional inter-member wave springs (five in the illustrated implementation, namely inter-member wave springs 242-246), where this number is one less than the total number of string-contacting members 202-207. The wave-springs are ring-shaped and have an aperture with a diameter that is slightly larger than the outer diameter of the tube-shaped projections (1816, 1818 in FIGS. 18A-B or 2816, 2818 in FIGS. 28A-B) of the gear hub (1514 in FIG. 15 or 2514 in FIG. 25). This allows the proximal-facing side of the distal wave spring (if included) to be slidably and rotatably disposed onto the outside surface of the distal-facing tube-shaped projection (1816 in FIGS. 18A-B or 2816 in FIGS. 28A-B) of the distal-most string contacting member 202. The distal-facing side of the distal wave spring (if included) buts against a proximal-facing surface of the distal clamp 210. The distal-facing side of the proximal wave spring (if included) is slidably and rotatably disposed onto the outside surface of the proximal-facing tube-shaped projection (1818 in FIGS. 18A-B or 2818 in FIGS. 28A-B) of the proximal-most string contacting member 207. The proximal-facing side of the proximal wave spring (if included) buts against a distal-facing surface of the proximal clamp 216. Distal-facing side of each inter-member wave springs 242-246 is slidably and rotatably disposed onto the outside surface of the proximal-facing tube-shaped projection (1818 in FIGS. 18A-B or 2818 in FIGS. 28A-B) of a different string contacting member 202-206, and the proximal-facing side of each inter-member wave springs 242-246 is slidably and rotatably disposed onto the outside surface of the distal-facing tube-shaped projection (1816 in FIGS. 18A-B or 2816 in FIGS. 28A-B) of a different string contacting member 203-207. In an exemplary implementation of the tuning apparatus 200 described herein, a conventional Lee Spring Company spring part number LWM1202005795 is used as the wave-springs.

As will be described in more detail hereafter, when the tuning apparatus 200 is installed onto the neck of a stringed musical instrument, the distal and proximal clamps 210, 216 are initially adjusted to fit the width of the neck by rotating the cam handle 412, which either extends the rocker arm shaft 418 out of the proximal clamp 216 or retracts it into the proximal clamp depending on which direction the cam handle is rotated. This initial adjustment has the effect of setting a length of the of the rocker arm shaft 418 between the distal and proximal clamps 210, 216. The wave-springs 242-246 react to this setting of the rocker arm shaft length by expanding when the length between the distal and proximal clamps 210, 216 is increased and contracting when the length between the distal and proximal clamps is decreased. Since all the wave-springs 242-246 are the same, they will exert a longitudinal force against the string contacting members 202-207 which results in the same distance being maintained between each string contacting members. As the strings or course of strings on typical string musical instruments are separated by equal distances across the front surface of the neck of the instrument, the wave-springs 242-246 will automatically align the string contacting members 202-207 with the strings or course of strings. In addition, if the previously described distal and proximal wave springs are included, they will automatically set the distance between the proximal clamp 216 and the proximal-most string contacting member 207, and between the distal clamp 210 and the distal-most string contacting member 202. It is noted that the distal and proximal wave springs are optional as the distance from the outside edges of the front surface of the neck and the string or course of strings on both side of the neck is often such that the first and last string contacting members with align with the first and last string or course of strings without any wave spring being necessary. The optional distal and proximal wave springs are employed on those stringed musical instruments where the foregoing configuration is not the case.

7. Operation

In one exemplary implementation, the tuning apparatus 200 depicted in FIGS. 2, 37 and 38 among others, is operated as follows. First the tuning apparatus 200 is installed onto the neck 114 of a stringed instrument. In general, the clamp assembly 218 of the tuning apparatus 200 is adapted to removably attach to a desired longitudinal position on the elongated neck 114 of the stringed musical instrument. In other words, the neck-gripping means serves to removably attach the tuning apparatus to the neck 114. One possible example, among many others, of such a desired longitudinal position is indicated by line H—H in FIG. 1A.

The previously described dual-action cam clamp assembly is advantageous as it facilitates a quick and easy initial setup for use on a stringed musical instrument, and thereafter allows the tuning apparatus to be removed or moved to a new location on the neck of the instrument with just a flip of the cam clamp handle. To begin the initial installation of the tuning apparatus 200 onto the neck 114 of a stringed instrument, the distal and proximal clamps 210, 216 of the tuning apparatus are placed above the sides of the neck of the stringed musical instrument with the rocker arm shaft 418 perpendicularly overlying the strings of the instrument at a longitudinal position along the neck approximately midway between the home fret (126 in FIG. 1A) and home−1 fret (128 in FIG. 1A). Referring to FIGS. 39A-B, the cam clamp assembly is placed in its disengaged position and rotated about the longitudinal axis of the cam clamp screw shaft 410 in a direction that separates the distal and proximal clamps (210, 216 in FIGS. 2, 37, 38) or brings them closer together, as required, to set the clamps so that they both just touch the opposite sides of the neck 114 of the stringed musical instrument with the shelf-like projections 1316, 1318 of the neck-contacting surface of the grip inserts 212, 214 resting on the edges of the face of the neck of the stringed musical instrument. At this point, an attempt is made to rotate the cam clamp into its engaged position (as shown in FIGS. 40A-B). If the cam handle 412 is easy to rotate in its engaged position, but the user feels it is not securely engaged, or if the cam handle is too difficult for the user to rotate in its engaged position, then a fine adjustment is made using the fine adjustment stub 512. Generally, the fine adjustment stub 512 is rotated in one direction to tighten the cam handle action and the opposite direction to loosen the cam handle action. It is noted that rotating the fine adjustment stub 512 causes the cam clamp screw shaft 410 to extend or retract the rocker arm shaft 418, but just slightly owing to the fine threads on the threaded longitudinal section 510 of the cam clamp screw shaft 410. Typically, this fine-tuning adjustment will not significantly change the initial setting of the clamp spacing, and so no further fitting is necessary. Once the fine-tuning adjustment has been made, the cam handle 412 is rotated into its engaged position and the user determines if the cam handle action is now satisfactory. If not, the fine-tuning procedure is repeated. Once the fine tuning is satisfactorily, the initial set-up of the cam clamping assembly 218 is complete. This initial setup process need not be repeated unless the tuning apparatus 200 is used on a different stringed musical instrument. The simple and quick one-time initial setup is advantageous, as is the consequence that the tuning apparatus can be released from the neck of the instrument by simply rotating the cam handle 412 into its disengaged position. The tuning apparatus 200 can then be removed, or moved to a new location on the neck of the instrument and resecured to the neck by rotating the cam handle 412 into its engaged position. This advantageous relocating of the tuning apparatus 200 allows the user to, for example, swiftly reconfigure the stringed musical instrument with a new tuning in a minimum amount of time.

Referring again to FIGS. 1A, 2, 37 and 38 (among other figures in the accompanying drawings), once the tuning apparatus 200 is installed onto the neck 114 of the stringed instrument, the string-contacting members 202-207 are placed in their desired positions. In general, each of the string-contacting members 202-207 is rotatably supported by the clamp assembly 218 and is adapted to rotate thereon independently of the other string-contacting members. In other words, each of the string-depressing means rotates on the neck-gripping means independently of the other string-depressing means. This rotation occurs along a plane that is substantially parallel to the longitudinal axis of the neck 114, and hence is substantially parallel to either a given string (e.g., string 131) or a course of strings (not shown). More particularly, each of the string-contacting members 202-207 operates as a longitudinal cam. A user can employ one or more fingers to change/adjust the rotational orientation of a string-contacting member (e.g., member 203). As described previously, one of the frets (e.g., 126) is considered to be a home fret. Another one of the frets is considered to be a home−1 fret (e.g., 128), where the home−1 fret is adjacent to the home fret on the headstock 116 end of the neck 114. Yet another one of the frets is considered to be a home+1 fret (e.g., 102), where the home+1 fret is adjacent to the home fret on a side thereof that is opposite the home−1 fret. In addition, a user can change/adjust the longitudinal position of the rocker hammer (e.g., hammer 227) of each string-contacting member (e.g., member 203) by sliding the hammer along the distal portion of the rocker arm (e.g., arm 221). These changes/adjustment will now be described in more detail.

Referring again to FIGS. 1A, 2, 37 and 38 (among other figures in the accompanying drawings), each of the string-contacting members 202-207 is adapted to adjustably impinge upon and urge the given string (e.g., string 131) or course of strings toward a user-selectable one of three-different longitudinal positions on the front surface 122 of the elongated neck 114. In other words, each of the string-depressing means generally serves to adjustably impinge upon and urge either a given string or a course of strings of the instrument toward a user-selectable one of three different longitudinal positions on the front surface of the neck. As described previously, the first of these positions is a home position. The second of these positions is a home−1 position that is closer to the headstock 116 end of the neck 114 than the home position. The third of these positions is a home+1 position that is farther from the headstock 116 end of the neck 114 than the home position. In an exemplary implementation of the tuning apparatus 200 described herein, in the aforementioned case where the tuning apparatus is removably attached to the longitudinal position on the neck 114 indicated by line H—H, the home position for each of the string-contacting members 202-207 can generally also be indicated by line H—H. An exemplary home−1 position for each of the string-contacting members 202-207 can be indicated by line H−1—H−1. An exemplary home+1 position for each of the string-contacting members 202-207 can be indicated by line H+1—H+1. The pressure-sensitive home string-contacting surface (1712 in FIGS. 17A-B) of each of the string-contacting members (e.g., member 203) will apply an appropriate amount of pressure to the given string or course of strings whenever the string-contacting member is in the home rotational orientation. The home string-contacting surface (1712 in FIGS. 17A-B) is pressure-sensitive, and is adapted to impinge upon the given string or course of strings and urge this string or course toward the home position on the front surface 122 of the elongated neck 114 (e.g., the position indicated by line H—H in FIG. 1A) whenever the string-contacting member is retainably but releasably engaged into the home rotational orientation so as to depress the string or course onto the home fret (e.g., fret 126). The pressure-sensitive home string-contacting surface (1712 in FIGS. 17A-B) of each of the string-contacting members is sized to apply an appropriate amount of pressure to the given string or course of strings whenever the string-contacting member is in the home rotational orientation. By way of example but not limitation, in FIG. 3 string-contacting member 203 is illustrated to be in the home rotational orientation.

Referring again to FIGS. 1A, 2, 37 and 38 (among other figures in the accompanying drawings), and as described heretofore, the durable and resiliently flexible string-contacting hammer elements (3412, 3414 in FIGS. 34A-B) that are securely disposed onto the hammer frame (3410 in FIGS. 34A-B) of the rocker hammer (e.g., hammer 227) of each of the string-contacting members (e.g., member 203) includes both a home+1 string-contacting surface and a home−1 string-contacting surface. The home−1 string-contacting surface is pressure-sensitive, and is adapted to impinge upon the given string or course of strings and urge this string or course toward the home−1 position on the front surface 122 of the elongated neck 114 (e.g., the position indicated by line H−1—H−1 in FIG. 1A) whenever the string-contacting member is retainably but releasably engaged into the home−1 rotational orientation so as to depress the string or course onto the home−1 fret 128. The pressure-sensitive home−1 string-contacting surface of each of the string-contacting members will apply an appropriate amount of pressure to the given string or course of strings whenever the string-contacting member is in the home−1 rotational orientation, where this pressure can also be adjusted (e.g., fine-tuned) by the user as will also be described in more detail hereafter. By way of example but not limitation, in FIG. 3 string-contacting member 202 is illustrated to be in the home−1 rotational orientation. The home+1 string-contacting surface is also pressure-sensitive, and is adapted to impinge upon the given string or course of strings and urge this string or course toward the home+1 position on the front surface 122 of the neck 114 (e.g., the position indicated by line H+1—H+1 in FIG. 1A) whenever the string-contacting member is retainably but releasably engaged into the home+1 rotational orientation so as to depress the string or course onto the home+1 fret 102. The pressure-sensitive home+1 string-contacting surface of each of the string-contacting members will apply an appropriate amount of pressure to the given string or course of strings whenever the string-contacting member is in the home+1 rotational orientation, where this pressure can also be adjusted (e.g., fine-tuned) by the user as will be described in more detail hereafter. By way of example but not limitation, in FIG. 3 string-contacting member 204 is illustrated to be in the home+1 rotational orientation.

Referring again to FIGS. 1A, 2, 37 and 38 (among other figures in the accompanying drawings), whenever the user wishes to rotate a given string-contacting member (e.g., member 203) from a current rotation position (e.g., the home−1 rotational orientation, the headstock-side open-string rotational orientation, the home rotational orientation, the bridge-side open-string rotational orientation, or the home+1 rotational orientation) to another rotational position, the user activates the release mechanism (1416 in FIGS. 14 and 15, or 2416 in FIGS. 24 and 25) of the string-contacting member. In the case of the pull release configuration, activating the release mechanism (1416 in FIGS. 14 and 15) involves pulling the pull release button (1426 in FIGS. 14 and 15) in a distal direction. This retracts the teeth (2110 in FIGS. 21A-B) of the pull pawl (1418 in FIGS. 14 and 15) from the teeth (1810 in FIGS. 18A-B) of the gear hub (1514 in FIGS. 15 and 18A-B), thereby allowing the string-contacting member (e.g., member 203) to rotate about the rocker arm shaft 418. While maintaining the pull release button (1426 in FIGS. 14 and 15) in its activated position, the user rotates the string-contacting member (e.g., member 203) into the desired new rotational position. Once the string-contacting member (e.g., member 203) has been rotated into its desired new rotational position (which in the case of the home−1 rotational orientation or the home rotational orientation or the home+1 rotational orientation is when one of the string-contacting hammer elements (3412, 3414 in FIGS. 34A-B) is in full contact with a string or course of strings), the user releases the pull release button (1426 in FIGS. 14 and 15). This causes the teeth (2110 in FIGS. 21A-B) of the pull pawl (1418 in FIGS. 14 and 15) to engage with the teeth (1810 in FIGS. 18A-B) of the gear hub (1514 in FIGS. 15 and 18A-B), thereby preventing the string-contacting member (e.g., member 203) from rotating further about the rocker arm shaft 418 and serving to retainably but releasably engage the string-contacting member into the desired rotational position. This easy-to-adjust pull release configuration is also advantageous as it allows a user to swiftly reconfigure the stringed musical instrument with a new tuning in a minimum of time. In the case of the push release configuration, activating the release mechanism (2416 in FIGS. 24 and 25) involves pushing the push release button (2426 in FIGS. 24 and 25) in a proximal direction. This retracts the teeth (3110 in FIGS. 31A-B) of the push pawl (2418 in FIGS. 24 and 25) from the teeth (2810 in FIGS. 28A-B) of the gear hub (2514 in FIGS. 25 and 28A-B), thereby allowing the string-contacting member (e.g., member 203) to rotate about the rocker arm shaft 418. While maintaining the push release button (2426 in FIGS. 24 and 25) in its activated position, the user rotates the string-contacting member (e.g., member 203) into the desired new rotational position. Once the string-contacting member (e.g., member 203) has been rotated into its desired new rotational position (which in the case of the home−1 rotational orientation or the home rotational orientation or the home+1 rotational orientation is when one of the string-contacting hammer elements (3412, 3414 in FIGS. 34A-B) is in full contact with a string or course of strings), the user releases the push release button (2426 in FIGS. 24 and 25). This causes the teeth (3110 in FIGS. 31A-B) of the push pawl (2418 in FIGS. 24 and 25) to engage with the teeth (2810 in FIGS. 28A-B) of the gear hub (2514 in FIGS. 25 and 28A-B), thereby preventing the string-contacting member (e.g., member 203) from rotating further about the rocker arm shaft 418 and serving to retainably but releasably engage the string-contacting member into the desired rotational position. This easy-to-adjust push release configuration is also advantageous as it allows a user to swiftly reconfigure the stringed musical instrument with a new tuning in a minimum of time.

Each of the string-contacting members will apply an appropriate amount of pressure to the given string or course of strings when the string-contacting hammer element (3412 or 3414 in FIGS. 34A-B) or string-contacting tip element (1412 in FIGS. 17A-B or 2412 in FIGS. 27A-B) is in full contact with the string or course of strings. This is at least in part due to the pressure-sensitive nature of the home, home−1 and home+1 string-contacting surfaces since the amount of pressure that is applied to the given string or course of strings is automatically adjusted so as to reliably depress the string/course onto a given fret without distorting the tuning of the string/course. This ensures that the given string or course of strings remains securely "fretted" while the user is playing the instrument in any of a variety of playing styles (e.g., the given string/course will not "buzz"). However, in one implementation, the pressure applied by a string-contacting hammer element (3412 or 3414 in FIGS. 34A-B) in the home−1 or home+1 rotational orientations can also be adjusted (e.g., fine-tuned) by the user to ensure a desired sound quality is obtained. More particularly, prior to a string-contacting member (e.g., member 203) being placed in the home−1 rotational orientation or the home+1 rotational orientation, the user slides the rocker hammer (e.g., hammer 227) to a location along the distal portion of the rocker arm (e.g., arm 221) that will place the string-contacting hammer element (3412 or 3414 in FIGS. 34A-B), which contacts the string or course of strings, close to the home fret 126. Once the string-contacting member (e.g., member 203) is engaged into the home−1 rotational orientation or the home+1 rotational orientation, the user slides the hammer (e.g., hammer 227) in a direction away from the home fret, thereby increasing the pressure on the underlying string or course of strings, until the desired sound quality is obtained. This ability to individually adjust the amount of pressure that the string-contacting members 202-207 apply to the strings/courses 130-135 allows the user to easily and quickly adapt the tuning apparatus implementations described herein to accommodate instruments having a wide variety of actions and string gauges.

2.8 Materials

It is noted that the tuning apparatus implementations described herein can be made from a wide variety of different materials. For example, the parts of the neck gripping assembly (except the grip inserts), rocker arm housing, the parts of the indexing mechanism, the parts of the release mechanism (both the push and pull configurations), and the rocker hammer frame can each be made from any of a variety of rigid and durable materials such as stainless steel, titanium, aluminum, brass, or other types of metals, or metal alloys, or ceramic, or plastic, or plastic composites, among other types of rigid and durable materials. The clamp grip inserts, string contacting member tip, and the sting-contacting hammer elements can each be made from any of a variety of flexible but relatively stiff materials such as EPDM (ethylene propylene diene monomer) rubber, or nitrile butadiene rubber (NBR), or the like.

3.0 Additional Implementations

While the tuning apparatus has been described by specific reference to implementations thereof, it is understood that variations and modifications thereof can be made without departing from the true spirit and scope of the apparatus. For example, while the cam clamp screw shaft has been described as having circular cross-section with a flat area, and various parts that interface with the shaft (e.g., the gear hub and the proximal clamp) have been described with similar cross-sectional shaped holes, other rotation inhibiting cross-sectional shapes are also feasible—such as a regular convex polygonal cross-sectional shape, or an octagon, among others). In addition, while various through-holes have been described as having a circular cross-sectional shape, as well as the parts that interface with these holes (e.g., dowel pins, pull shaft, push shaft, and so on), other cross-sectional shapes are also feasible such as a square, rectangle, triangle, oval, and so on).

Figure 41A:
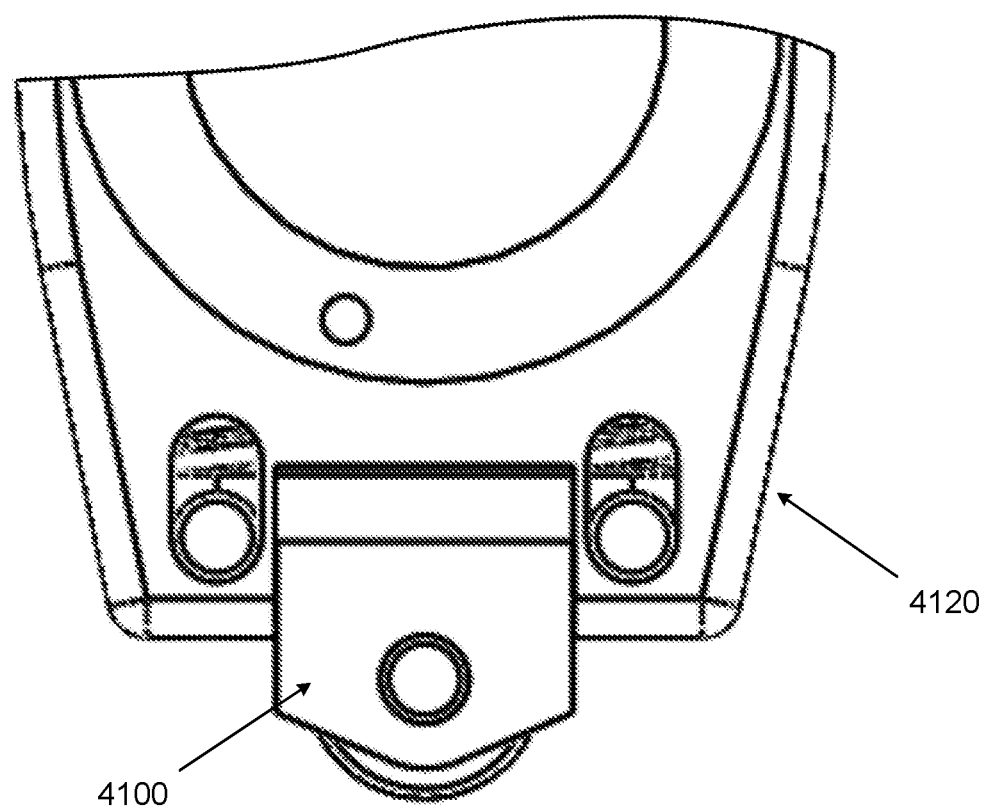
FIG. 41A-C are diagrams illustrating a proximal portion of a rocker arm housing where
Figure 41B:
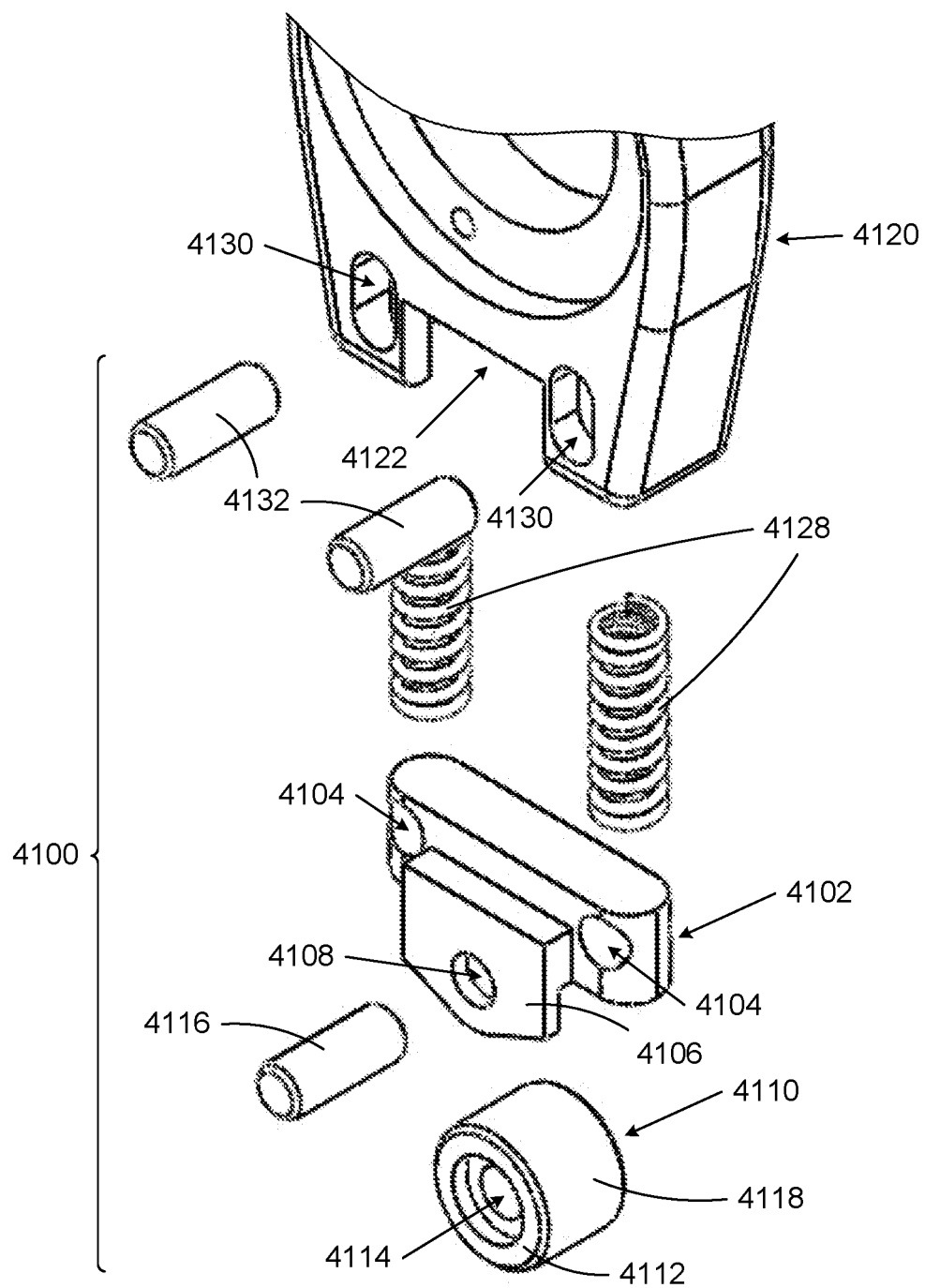
Figure 41C:
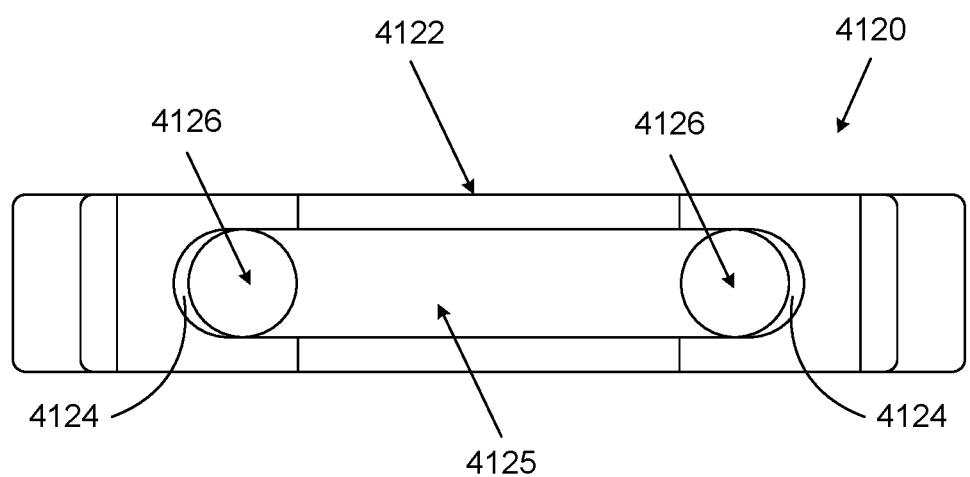

Further, in an alternate implementation of the rocker arm (e.g., 221 in FIG. 2), the string contacting tip element (e.g., 1412 in FIGS. 14 and 2412 in FIG. 24) takes the form of a wheel mechanism 4100 shown in FIGS. 41A-B. In addition, the proximal end of the rocker arm housing (e.g., 1410 in FIGS. 14 and 2410 in FIG. 24) is modified as shown in FIGS. 41A-C to accommodate the wheel mechanism 4100. In the following description of the alternate implementation of the rocker arm, directional terms such as top, bottom, left side, right side, front, back, upward, downward, and so on refer to the orientation of the rocker arm as shown in FIGS. 41A-B.

Referring to FIGS. 41A-B, in one implementation, the wheel mechanism 4100 includes a wheel carriage 4102 that in one implementation has a rectangular shape with rounded ends on the left and right sides and a guide pin through-hole 4104 oriented from front to back adjacent each rounded end. A pair of wheel axle tabs 4106 extend downward from the front and back sides of the wheel carriage 4102. Each tab 4106 has an axle hole 4108 that is oriented in a front to back direction and co-axial with each other. A disk-shaped wheel 4110 with a central hub 4112 and axle through-hole 4114 is installed on the wheel carriage 4102 such that the axle through-hole 4114 is positioned co-axially with the axle holes 4108 of the wheel carriage. A cylindrical axle 4116 is installed through the axle holes 4108 and the wheel's axle through-hole 4114. The axle 4116 has a diameter that forms a jam fit with the axle holes 4108 and a sliding fit with the central hub 4112 of the wheel 4110 such that the wheel is held within the wheel axle tabs 4106 of the wheel carriage by the axle 4116 but is able to freely rotate about the axle. To this end, it is noted that the diameter of the wheel 4110 is such that it does not touch the interior surfaces of the wheel carriage 4102, and the width of the wheel is such that it does not touch the interior walls of the wheel axle tabs 4106. A string-contacting tire 4118 is installed on the wheel's central hub 4112, and in one implementation is made from a durable and resiliently flexible material such as EPDM rubber, or NBR, or the like. In addition, the axle holes 4108 are located on the wheel axle tabs so that the wheel 4110 extends downward past the distal ends of the tabs, as shown in FIG. 41A.

FIGS. 41B-C best illustrate the modified proximal section of the rocker arm housing 4120, which in one implementation has a rectangular-shaped cutout 4122 with longitudinally oriented rounded slots 4124 located on the left and right sides of the cutout. The cutout 4122 and rounded slots 4124 are open to the proximal end of the rocker arm housing 4120, and are sized and shaped to interface with the wheel carriage 4102 and wheel axle tabs 4106 but are slightly larger so that the wheel carriage and wheel axle tabs can slide longitudinally in the cutout and rounded slots. It is noted that the front to back distance from the outside surfaces of the tabs 4106 is such that it matches the front to back thickness of the proximal end of the rocker arm housing 4120 so that they are flush with the front and back surfaces of the housing. In addition, the rounded slots 4124 and a rectangular shaped pocket 4125 extend longitudinally into the proximal section of the rocker arm housing 4120 a distance that allows the top end of the wheel carriage 4102 above the tabs 4108 (when installed in the housing) to retract from a fully extended condition into the rocker arm housing to a fully retracted condition without bottoming out. In other words, the rounded slots 4124 and rectangular shaped pocket 4125 form a space within the rocker arm housing that matches the shape of the top of the wheel carriage 4102, except slightly larger so that the wheel carriage can freely slide in and out of the space. A biasing element is also included that urges the wheel mechanism in a direction away from the proximal end of the rocker arm. In one implementation, the biasing element takes the form of a pair of coil springs 4128. More particularly, a blind spring hole 4126 extends upward into the rocker arm housing 4120 from the bottom of each rounded slot 4124 and terminates before reaching the aperture (1610 in FIGS. 16A-B and 2610 in FIGS. 26A-B) in the proximal portion of the rocker arm housing. The diameter of the spring holes 4126 is the same as the front to back dimension of the rounded slots 4124. This allows a spring 4128 having a slightly smaller diameter than the spring holes 4126 to be installed into each spring hole and extend out of the spring hole and through the rounded slot 4124 without interference when the wheel mechanism 4100 is not in its fully retracted condition. A movement limiting element is also included that limits the distance the wheel mechanism extends in the direction away from the proximal end of the rocker arm and the distance the wheel mechanism retracts toward the proximal end of the rocker arm. In one implementation, the movement limiting element takes the form of a pair of guide pins 4132. More particularly, there is a guide slot 4130 in the form an oblong hole through the rocker arm housing 4120 on either side of the cutout 4122 which are oriented in a front to back direction. In one version, each guide slot 4130 intersects one of the spring holes 4126 inside the body of the rocker arm housing 4120. A guide pin 4132 is installed in each guide slot 4130 and passes through the guide pin through-hole 4104 of the wheel carriage 4102. The diameter of the guide pins 4132 and guide pin through-holes 4104, and the width of the guide slots 4130, is such that a jam fit is formed between the guide pins and their associated guide pin through-hole, and a sliding fit is formed between the guide pins and their associated guide slots. It is also noted that when installed, the guide pins 4132 are just long enough to extend from the front face of the rocker arm housing 4120 to the back face of the housing. The foregoing configuration allows the wheel mechanism 4100 to slide longitudinally into and out of the rocker arm housing 4120. However, the wheel mechanism 4100 cannot extend further than the point where the guide pins 4132 contact the bottom ends of the guide slots 4130 and cannot retract any further than the point where the guide pins contact the top ends of the guide slots. As such, this configuration holds the wheel mechanism 4100 onto the proximal end of the rocker arm housing 4120 against the force of the springs 4128 that push on the top surface of the wheel carriage 4102, and which would otherwise push the wheel mechanism out of the rocker arm housing. This configuration also limits the distance that the wheel mechanism 4100 can retract into the rocker arm housing 4120.

The exterior surface of the previously described tire 4118 of the wheel 4110 forms a home string-contacting surface which is pressure-sensitive owing to the flexibility of the tire and the springs 4128 and is adapted to impinge upon the aforementioned given string or course of strings and adjustably urge this string or course toward the home position on the front surface of the elongated neck (e.g., the position indicated by line H—H in FIG. 1A) whenever the string-contacting member is in the home rotational orientation so as to depress the string or course onto the home fret (e.g., fret 126 in FIG. 1A). By way of example but not limitation, in FIG. 3 string-contacting member 203 is illustrated to be in the home rotational orientation. By way of further example, in FIG. 2 all six of the string-contacting members 202-207 are illustrated to be in the home rotational orientation, where the home string-contacting surface of the string-contacting member of the rocker arm 220 of string-contacting member 202 is impinging upon string 130 and adjustably urging it toward the home position on the front surface of the neck 114, and similarly for the other string-contacting members. In operation, when a string-contacting member (e.g., 203 of FIG. 2) is rotated into the home rotational orientation, the tire 4118 of the wheel 4110 makes contact with a string or course of strings and rotates as the string-contacting member is further rotated. This rotation of the wheel 4110 is advantageous as it prevents friction between the tire 4118 and the sting or strings, which could cause the tire to wear prematurely. Once the string-contacting member is in the home rotational orientation, the tire 4118 of the wheel 4110 is pushed down onto the string or strings by the springs 4128 with enough force to depress them onto the home fret with an appropriate amount of pressure.

It is also noted that any or all of the aforementioned implementations throughout the description may be used in any combination desired to form additional hybrid implementations. In addition, although the tuning apparatus implementations have been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What has been described above includes example implementations. It is, of course, not possible to describe every conceivable combination of components or methodologies for purposes of describing the claimed subject matter, but one of ordinary skill in the art may recognize that many further combinations and permutations are possible. Accordingly, the claimed subject matter is intended to embrace all such alterations, modifications, and variations that fall within the spirit and scope of the appended claims. In regard to the various functions performed by the above described components and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter.

Wherefore, what is claimed is:

1. A tuning apparatus for a musical instrument comprising an elongated neck comprising a front surface over which a plurality of strings is stretched, comprising:
   a neck-gripping assembly which is adapted to removably attach to a desired longitudinal position on the neck of the musical instrument, said neck-gripping assembly comprising,
   a first clamp with a neck-protecting grip insert,
   a second clamp with a neck-protecting grip insert,
   a dual action cam clamp assembly comprising,
      a two-part shaft comprising a cam clamp screw shaft with a first threaded longitudinal section forming a distal portion of the cam clamp screw shaft and a rocker arm shaft with a longitudinal threaded hole in a proximal section thereof which interfaces with the first threaded longitudinal section of the cam clamp screw shaft, wherein whenever the cam clamp screw shaft is rotated in a first direction a distal end of the rocker arm shaft extends away from the cam clamp screw shaft and whenever the cam clamp screw shaft is rotated in a second direction the distal end of the rocker arm shaft retracts toward the cam clamp screw shaft, and wherein the first clamp is disposed onto the proximal section of the rocker arm shaft and does not extend or retract with the rocker arm shaft when the cam clamp screw shaft is rotated, and wherein the second clamp is disposed onto a distal section of the rocker arm shaft and does extend or retract with the rocker arm shaft when the cam clamp screw shaft is rotated, a cam handle that when rotated in a plane perpendicular to a longitudinal axis of the two-part shaft causes the cam clamp screw shaft to rotate about its longitudinal axis which extends or retracts the second clamp thereby increasing or decreasing the distance between the first and second clamps depending on the direction of rotation, and which when the cam handle is rotated in a plane parallel to the longitudinal axis of the two-part shaft causes the first clamp to slide longitudinally along the two-part shaft and increase or decrease the distance between the first and second clamps depending on the direction of rotation; and a plurality of string-contacting members,
each of the string-contacting members being rotatably supported by the rocker arm shaft,
each of the string-contacting members being adapted to rotate about the longitudinal axis of the two-part shaft independently of the other string-contacting members,
each of the string-contacting members also being adapted to impinge upon and urge either a different string or course of strings toward a user-selectable one of three different longitudinal impinging positions on said front surface or not impinge upon and urge a string or course of strings whenever the string-contacting member is placed in user-selectable longitudinal open positions, said three different longitudinal impinging positions comprising a home position, a home−1 position that is closer to a headstock end of the neck than the home position, and a home+1 position that is farther from the headstock end of the neck than the home position, and said longitudinal open position comprises longitudinal positions in-between the home−1 position and the home position or in-between the home position and the home+1 position.

2. The tuning apparatus of claim 1, wherein the cam clamp screw shaft comprises a second threaded longitudinal section formed on a proximal portion of the cam clamp screw shaft, wherein the threads on the second threaded longitudinal section are finer that the threads on the first threaded longitudinal section of the cam clamp screw shaft.

3. The tuning apparatus of claim 2, wherein the cam handle comprises a fork-shaped cam section and an elongated gripping section that extends away from the fork-shaped cam section, and wherein the fork-shaped cam section has two disk-shaped prongs each with a circular aperture, said circular apertures having a common central axis.

4. The tuning apparatus of claim 3, wherein the dual action cam clamp assembly further comprises a cam clamp shaft that connects the cam clamp screw shaft to the cam handle, wherein the cam clamp shaft extends between and through each of the circular apertures of the fork-shaped cam section of the cam handle, said cam clamp shaft having a circular cross-section with diameter that allows the cam clamp shaft to rotate about its longitudinal axis within the circular apertures of the fork-shaped cam section of the cam handle, and wherein the cam clamp shaft comprises a threaded through-hole that extends through the cam clamp shaft and has a central axis that intersects and is perpendicular to the longitudinal axis of the cam clamp shaft, and wherein the threads of the cam clamp shaft threaded through-hole are sized to mesh with the second threaded longitudinal section of the cam clamp screw shaft.

5. The tuning apparatus of claim 4, wherein the second threaded longitudinal section of the cam clamp screw shaft is threaded into the cam clamp shaft threaded through-hole.

6. The tuning apparatus of claim 5, wherein the common central axis of the circular apertures in the fork-shaped cam section of the cam handle is offset from the center of each disk-shaped prong of the fork-shaped cam section of the cam handle resulting in a distance from the common central axis of the circular apertures to a front face of each disk-shaped prong being larger than a distance from the common central axis of the circular apertures to a back face of each disk-shaped prong.

7. The tuning apparatus of claim 6, wherein the dual action cam clamp assembly further comprises a cam clamp seat comprising:

a through-hole which is slidably interfaced with a middle section of the cam clamp screw shaft which has a circular cross-sectional shape and is located between the first and second threaded longitudinal sections of the cam clamp screw shaft; and a cutout having a circular curved surface that is slidably interfaced with the disk-shaped prongs of the fork-shaped cam section of the cam handle, and wherein, whenever the cam handle is rotated about the cam clamp shaft in said plane parallel to the longitudinal axis of the two-part shaft using the elongated gripping section of the cam handle, from an engaged position wherein the front face of each disk-shaped prong of the fork-shaped cam section of the cam handle is in contact with the cam clamp seat cutout, into a disengaged position wherein the back face of each disk-shaped prong of the fork-shaped cam section of the cam handle is in contact with the cam clamp seat cutout, the two-part shaft is pushed a distance equal to the difference between the distance from the common central axis of the circular apertures to a front face of each disk-shaped prong and the distance from the common central axis of the circular apertures to a back face of each disk-shaped prong thereby causing the first clamp to slide longitudinally along the two-part shaft and increase a distance between the first and second clamps enough to allow the tuning apparatus to be removed from the neck of the stringed musical instrument or moved along the neck of the stringed musical instrument to a new location on the neck, and wherein, whenever the cam handle is rotated about the cam clamp shaft in said plane parallel to the longitudinal axis of the two-part shaft using the elongated gripping section of the cam handle, from the disengaged position into the engaged position, the two-part shaft is pulled a distance equal to the difference between the distance from the common central axis of the circular apertures to a front face of each disk-shaped prong and the distance from the common central axis of the circular apertures to a back face of each disk-shaped prong thereby causing the first clamp to slide longitudinally along the two-part shaft and decrease a distance between the first and second clamps enough to secure the tuning apparatus to the neck of the stringed musical instrument.

8. The tuning apparatus of claim 7, wherein the dual action cam clamp assembly further comprises a cam clamp washer disposed between to a back side of the cam clamp seat that faces away from the cam clamp handle and a side of the first clamp that faces toward the back side of the cam clamp seat, wherein the cam clamp washer facilitates the rotation of the cam handle in said plane perpendicular to a longitudinal axis of the two-part shaft, and wherein the cam clamp washer comprises a central hole which slidably interfaces with the cam clamp screw shaft.

9. The tuning apparatus of claim 7, wherein the proximal end of the cam clamp screw shaft forms a fine adjustment stub, wherein whenever the fine adjustment stub is rotated in a first direction the distal end of the rocker arm shaft extends away from the cam clamp screw shaft a small distance owing to the finer threads on the second threaded longitudinal section of the cam clamp screw shaft relative to the courser threads on the first threaded longitudinal section of the cam clamp screw shaft resulting in a lessening of the force required to rotate the cam handle in the plane parallel to the longitudinal axis of the two-part shaft from the disengaged position into the engaged position, and wherein whenever the fine adjustment stub is rotated in a second direction the distal end of the rocker arm shaft retracts toward the cam clamp screw shaft a small distance owing to the finer threads on the second threaded longitudinal section of the cam clamp screw shaft relative to the courser threads on the first threaded longitudinal section of the cam clamp screw shaft resulting in an increase in the force required to rotate the cam handle in the plane parallel to the longitudinal axis of the two-part shaft from the disengaged position into the engaged position.

10. The tuning apparatus of claim 1, wherein the first clamp comprises a longitudinal through-hole that has a non-cylindrical cross-section and a cross-sectional size that allows the rocker arm shaft which has a corresponding non-cylindrical cross-section to slide longitudinally within the first clamp through-hole, but does not allow the first clamp to rotate about a longitudinal axis of the rocker arm shaft, and wherein the second clamp comprises a longitudinal blind hole that has a fastening feature which prevents the rocker arm shaft from sliding longitudinally within the second clamp blind hole or rotating about a longitudinal axis of the rocker arm shaft, the first clamp longitudinal through-hole and second clamp longitudinal blind hole in combination allowing the second clamp to move away from or closer to the first clamp whenever the cam clamp screw shaft is rotated in a first or second direction, respectively, while preventing relative rotation between the two clamps.

11. A tuning apparatus for a musical instrument comprising an elongated neck comprising a front surface over which a plurality of strings is stretched, comprising:
 a neck-gripping assembly which is adapted to removably attach to a desired longitudinal position on the neck of the musical instrument and which comprises a rocker arm shaft; and
 a plurality of string-contacting members,
  each of the string-contacting members comprising a rocker arm and rocker hammer, wherein the rocker arm is rotatably supported by the rocker arm shaft at a proximal portion of the rocker arm,
  the rocker arm comprising,
   a string-contacting tip element disposed on a proximal end of the rocker arm,
   an elongated distal portion on which the rocker hammer is slidably disposed, said rocker hammer having a pair of string-contacting hammer elements that are on opposite sides of the rocker hammer and oriented in a traverse relationship to the elongated distal portion of the rocker arm,
   a release mechanism having a pull release, said pull release being engaged by pulling a pull release button disposed at a distal end of the elongated distal portion of the rocker arm in a distal direction which allows the rocker arm to be rotated about a longitudinal axis of the rocker arm shaft independently of the other string-contacting members, and which when disengaged by releasing the pull release button results in the rocker arm being rotationally locked in place at its current rotational position, and
  each of the string-contacting members also being adapted to impinge upon and urge either a different string or course of strings toward a user-selectable one of three different longitudinal impinging positions on said front surface or not impinge upon and urge a string or course of strings whenever the string-contacting member is placed in user-selectable longitudinal open positions, said three different longitudinal impinging positions comprising a home position in which the string-contacting tip element is in contact with a string or course of strings, a home−1 position that is closer to a headstock end of the neck than the home position and in which one of the string-contacting hammer elements is in contact with the string or course of strings, and a home+1 position that is farther from the headstock end of the neck than the home position and in which the other string-contacting hammer element is in contact with the string or course of strings, and said longitudinal open positions comprising longitudinal positions in-between the home−1 position and the home position or in-between the home position and the home+1 position.

12. The tuning apparatus of claim 11, wherein the rocker arm further comprises an indexing mechanism that is disposed in a proximal portion of the rocker arm and which interfaces with the rocker arm shaft via a disk-shaped gear hub having gear teeth projecting outward from a periphery of the gear hub.

13. The tuning apparatus of claim 12, wherein the release mechanism of the rocker arm further comprises a pull shaft that is longitudinally slidable in a longitudinal channel formed in the elongated distal portion of the rocker arm, said pull shaft being connected at a distal end to the pull release button and at a proximal end to a pull pawl, said pull pawl comprising gear teeth whose size and configuration are adapted to mesh with the gear hub gear teeth when the pull release is disengaged thereby rotationally locking the rocker arm in place at its current rotational position, and wherein the size and configuration of the pull pawl is adapted to allow the pull pawl gear teeth to uncouple from and clear the gear hub gear teeth when the pull release is engaged thereby allowing the rocker arm to freely rotate about the gear hub.

14. The tuning apparatus of claim 13, wherein the proximal portion of the rocker arm further comprises a notch adjacent the gear hub which connects at a distal end of the notch to the longitudinal channel formed in the elongated distal portion of the rocker arm, and in which the pull pawl resides and is longitudinally slidable therein.

15. The tuning apparatus of claim 14, wherein the proximal end of the longitudinal channel formed in the elongated distal portion of the rocker arm comprises a larger-diameter channel section that opens into the rocker arm notch and in which a compression spring resides, said compression spring surrounds a portion of the pull shaft, abuts the pull pawl on the proximal end of the spring and a distal wall of the larger-diameter channel section on the distal end of the spring, and wherein the compression spring applies a longitudinal force that urges the pull pawl gear teeth to mesh with the gear teeth of the gear hub when the pull release is disengaged.

16. A tuning apparatus for a musical instrument comprising an elongated neck comprising a front surface over which a plurality of strings is stretched, comprising:
 a neck-gripping assembly which is adapted to removably attach to a desired longitudinal position on the neck of the musical instrument and which comprises a rocker arm shaft; and
 a plurality of string-contacting members,
  each of the string-contacting members comprising a rocker arm and a rocker hammer, wherein the rocker arm is rotatably supported by the rocker arm shaft at a proximal portion of the rocker arm,
  the rocker arm comprising,
   a string-contacting tip element disposed on a proximal end of the rocker arm,
   an elongated distal portion on which the rocker hammer is slidably disposed, said rocker hammer having a pair of string-contacting hammer elements that are on opposite sides of the rocker hammer and oriented in a traverse relationship to the elongated distal portion of the rocker arm,
   a release mechanism having a push release, said push release being engaged by pushing a push release button disposed at a distal end of the elongated distal portion of the rocker arm in a proximal direction which allows the rocker arm to be rotated about a longitudinal axis of the rocker arm shaft independently of the other string-contacting members, and which when disengaged by releasing the push release button results in the rocker arm being rotationally locked in place at its current rotational position, and
  each of the string-contacting members being adapted to impinge upon and urge either a different string or course of strings toward a user-selectable one of three different longitudinal impinging positions on said front surface or not impinge upon and urge a string or course of strings whenever the string-contacting member is placed in user-selectable longitudinal open positions, said three different longitudinal impinging positions comprising a home position in which the string-contacting tip element is in contact with a string or course of strings, a home−1 position that is closer to a headstock end of the neck than the home position and in which one of the string-contacting hammer elements is in contact with the string or course of strings, and a home+1 position that is farther from the headstock end of the neck than the home position and in which the other string-contacting hammer element is in contact with the string or course of strings, and said longitudinal open positions comprising longitudinal positions in-between the home−1 position and the home position or in-between the home position and the home+1 position.

17. The tuning apparatus of claim 16, wherein the rocker arm further comprises an indexing mechanism that is disposed in a proximal portion of the rocker arm and which interfaces with the rocker arm shaft via a disk-shaped gear hub having gear teeth projecting outward from a periphery of the gear hub.

18. The tuning apparatus of claim 17, wherein the release mechanism of the rocker arm further comprises a push shaft that is longitudinally slidable in a longitudinal channel formed in the elongated distal portion of the rocker arm, said push shaft being connected at a distal end to the push release button and in contact at a proximal end with a push pawl, said push pawl comprising gear teeth whose size and configuration are adapted to mesh with the gear hub gear teeth when the push release is disengaged thereby rotationally locking the rocker arm in place at its current rotational position, and wherein the size and configuration of the push pawl is adapted to allow the push pawl gear teeth to uncouple from and clear the gear hub gear teeth when the push release is engaged thereby allowing the rocker arm to freely rotate about the gear hub.

19. The tuning apparatus of claim 18, wherein the proximal portion of the rocker arm further comprises a notch adjacent the gear hub which connects to a proximal end of the longitudinal channel formed in the elongated distal portion of the rocker arm, and in which the push pawl resides, said push pawl having an elongated shape with the gear teeth disposed at one end of an inward facing surface and a pivot near a middle section, such that whenever a proximal tip of the push shaft, which is in contact with an outward facing surface of the push pawl on the end of the push pawl opposite that having the gear teeth, is extended into the notch by pushing the push release button to engage the push release, the push pawl is caused to pivot in a manner that results in the push pawl gear teeth uncoupling from and clearing the gear hub gear teeth.

20. The tuning apparatus of claim 19, wherein the push pawl further comprises a blind hole in the outward facing surface on the same end as the gear teeth and in which a compression spring resides, said compression spring abuts a bottom end of the push pawl blind hole on a proximal end of the spring and a wall of the notch in the proximal portion of the rocker arm on a distal end of the spring, and wherein the compression spring applies a longitudinal force that urges the push pawl gear teeth to mesh with the gear teeth of the gear hub when the push release is disengaged.

21. A tuning apparatus for a musical instrument comprising an elongated neck comprising a front surface over which a plurality of strings is stretched, comprising:
 a neck-gripping assembly which is adapted to removably attach to a desired longitudinal position on the neck of the musical instrument and which comprises a rocker arm shaft; and
 a plurality of string-contacting members,
  each of the string-contacting members comprising a rocker arm and a rocker hammer, wherein the rocker arm is rotatably supported by the rocker arm shaft at a proximal portion of the rocker arm,
  the rocker arm comprising,
   a string-contacting tip element disposed on a proximal end of the rocker arm, which comprises a wheel mechanism that whenever the rocker arm is rotated to place the string-contacting tip element into a home position, the wheel mechanism contacts and rolls along a string or course of strings and once the string-contacting tip element is in the home position, the wheel mechanism is urged toward and applies pressure on the string or course of strings,
   an elongated distal portion on which the rocker hammer is slidably disposed, said rocker hammer having a pair of string-contacting hammer elements that are on opposite sides of the rocker hammer and oriented in a traverse relationship to the elongated distal portion of the rocker arm, a release mechanism which when engaged allows the rocker arm to be rotated about a longitudinal axis of the rocker arm shaft independently of the other string-contacting members, and which when disengaged results in the rocker arm being rotationally locked in place at its current rotational position, and each of the string-contacting members being adapted to impinge upon and urge either a different string or course of strings toward a user-selectable one of three different longitudinal impinging positions on said front surface or not impinge upon and urge a string or course of strings whenever the string-contacting member is placed in user-selectable longitudinal open positions, said three different longitudinal impinging positions comprising said home position in which the string-contacting tip element is in contact with a string or course of strings, a home−1 position that is closer to a headstock end of the neck than the home position and in which one of the string-contacting hammer elements is in contact with the string or course of strings, and a home+1 position that is farther from the headstock end of the neck than the home position and in which the other string-contacting hammer element is in contact with the string or course of strings, and said longitudinal open positions comprising longitudinal positions in-between the home−1 position and the home position or in-between the home position and the home+1 position.

22. The tuning apparatus of claim 21, wherein the wheel mechanism of the string-contacting tip element disposed on the proximal end of the rocker arm, comprises:

a wheel carriage comprising wheel axle tabs;

a disk-shaped wheel comprising a central hub surrounded by a tire made from a durable and resiliently flexible material; wherein the wheel is installed on the wheel carriage via the wheel axle tabs and an axle sized to allow the wheel to rotate about the axle and said wheel carriage being sized to allow the wheel to rotate freely without interference and to extend past an end of the wheel axle tabs; and wherein the proximal end of the rocker arm comprises internal spaces into which the wheel carriage and at least part of the wheel axle tabs reside, said rocker arm internal spaces, wheel carriage and wheel axle tabs being sized to allow longitudinal movement of the wheel carriage and wheel axle tabs within the rocker arm internal spaces so as to extend the wheel away from the proximal end of the rocker arm and retract the wheel toward the proximal end of the rocker arm.

23. The tuning apparatus of claim 22, wherein the rocker arm further comprises:

a biasing element which urges the wheel mechanism in a direction away from the proximal end of the rocker arm;

a movement limiting element which limits the distance the wheel mechanism extends in the direction away from the proximal end of the rocker arm and the distance the wheel mechanism retracts toward the proximal end of the rocker arm; and wherein whenever the rocker arm is rotated to place the string-contacting tip element into said home position, the tire contacts and rolls along a string or course of strings as the wheel mechanism retracts toward the proximal end of the rocker arm, and once the string-contacting tip element is in the home position, the biasing element urges the wheel mechanism away from the proximal end of the rocker arm so that the wheel applies a force on the string or course of strings.

\* \* \* \* \*